US012548136B2

(12) United States Patent
Nouranian et al.

(10) Patent No.: US 12,548,136 B2
(45) Date of Patent: Feb. 10, 2026

(54) MONITORING AN OPERATING CYCLE OF HEAVY EQUIPMENT

(71) Applicant: MOTION METRICS INTERNATIONAL CORP., Vancouver (CA)

(72) Inventors: Saman Nouranian, North Vancouver (CA); Seyed Mehran Pestehei, Vancouver (CA); Vibudh Agrawal, Vancouver (CA); Fatemeh Taheri Dezaki, Vancouver (CA); Samareh Samadi Arakhsh Bahar, North Vancouver (CA); Muzhi Tang, Coquitlam (CA); Glen Richard Floyd Turner, Richmond (CA); Shahram Tafazoli Bilandi, Vancouver (CA)

(73) Assignee: MOTION METRICS INTERNATIONAL CORP., Vancouver (CA)

( * ) Notice: Subject to any disclaimer, the term of this patent is extended or adjusted under 35 U.S.C. 154(b) by 451 days.

(21) Appl. No.: 17/986,891

(22) Filed: Nov. 15, 2022

(65) Prior Publication Data

US 2024/0161262 A1 May 16, 2024

(51) Int. Cl.
*G06T 7/00* (2017.01)
*G06T 7/11* (2017.01)
(Continued)

(52) U.S. Cl.
CPC ............. *G06T 7/0004* (2013.01); *G06T 7/11* (2017.01); *G06V 10/764* (2022.01); *G06V 10/82* (2022.01);
(Continued)

(58) Field of Classification Search
CPC .................. G06T 7/0004; G06T 7/11; G06T 2207/10016; G06T 2207/20081;
(Continued)

(56) References Cited

U.S. PATENT DOCUMENTS

| 6,085,583 A | 7/2000 | Cannon et al. |
| 7,669,354 B2 | 3/2010 | Aebischer et al. |

(Continued)

FOREIGN PATENT DOCUMENTS

| CA | 1139702 A | * 1/1983 | ......... G01N 21/3563 |
| CN | 1286395 A | 3/2001 | |

(Continued)

OTHER PUBLICATIONS

Xiao, et al., "Simple Baselines for Human Pose Estimation and Tracking", In Proceedings of the European Conference on Computer Vision (ECCV), Aug. 21, 2018, 16 Pages.

(Continued)

*Primary Examiner* — Mia M Thomas
(74) *Attorney, Agent, or Firm* — Palmer Dzurella

(57) ABSTRACT

A method and system are provided for monitoring operations of heavy equipment having an operating implement configured to excavate a load from a mine face. The method involves: capturing a plurality of images during an operating cycle of the heavy equipment; processing the plurality of images through an activity classifier model, the activity classifier model including a neural network having been configured and trained for generating an activity label based on a sequence of images in the plurality of images, the activity label associating the sequence of images with at least one stage of a plurality of stages making up the operating cycle; and performing at least one analysis using the sequence of images associated with the at least one stage, the at least one analysis including an analysis of the oper- (Continued)

ating implement, an analysis of the load, and/or an analysis of the mine face.

19 Claims, 26 Drawing Sheets

(51) Int. Cl.
*G06V 10/764* (2022.01)
*G06V 10/82* (2022.01)
*G06V 20/70* (2022.01)

(52) U.S. Cl.
CPC .... *G06V 20/70* (2022.01); *G06T 2207/10016* (2013.01); *G06T 2207/20081* (2013.01); *G06T 2207/20084* (2013.01); *G06T 2207/30164* (2013.01)

(58) Field of Classification Search
CPC .......... G06T 2207/20084; G06T 2207/30164; G06V 10/764; G06V 10/82; G06V 20/70; G06V 20/56; G06N 3/045; G06N 3/082; E02F 9/261
See application file for complete search history.

(56) References Cited

U.S. PATENT DOCUMENTS

| | | | |
|---|---|---|---|
| 9,196,084 B2 | 11/2015 | Boardman et al. | |
| 10,208,459 B2 | 2/2019 | Matsuo et al. | |
| 10,733,752 B2 | 8/2020 | Hageman et al. | |
| 10,762,635 B2* | 9/2020 | Yan | G06T 7/143 |
| 10,783,610 B2* | 9/2020 | Tafazoli Bilandi | G06N 3/045 |
| 10,982,409 B2 | 4/2021 | Sherlock et al. | |
| 11,062,061 B2 | 7/2021 | Martinsson et al. | |
| 12,423,823 B2* | 9/2025 | Tafazoli Bilandi | G06T 7/593 |
| 2010/0059667 A1* | 3/2010 | Ferguson | G01N 23/005 |
| | | | 250/255 |
| 2012/0098654 A1* | 4/2012 | Ebert | E02F 9/28 |
| | | | 340/438 |
| 2018/0100291 A1 | 4/2018 | Bewley et al. | |
| 2018/0120098 A1 | 5/2018 | Matsuo et al. | |
| 2018/0174291 A1 | 6/2018 | Asada et al. | |
| 2020/0134573 A1* | 4/2020 | Vickers | G06F 16/29 |
| 2020/0273176 A1* | 8/2020 | Takeda | G06T 7/194 |
| 2020/0325655 A1 | 10/2020 | Hageman et al. | |
| 2021/0279659 A1* | 9/2021 | Torttila | G06T 7/13 |
| 2021/0331695 A1* | 10/2021 | Ramakrishnan | G06V 10/803 |
| 2022/0122347 A1* | 4/2022 | Bhatt | G06V 10/95 |
| 2022/0156915 A1* | 5/2022 | Ranca | G06F 18/231 |
| 2022/0277551 A1* | 9/2022 | Li | G06Q 30/08 |
| 2022/0358775 A1* | 11/2022 | Hantehzadeh | G06T 3/18 |
| 2023/0003918 A1* | 1/2023 | Job | G06T 7/0008 |
| 2023/0160182 A1* | 5/2023 | Thomsson | G01J 3/2823 |
| | | | 348/148 |
| 2023/0252638 A1* | 8/2023 | Hotson | G06V 10/7747 |
| | | | 382/157 |
| 2024/0141624 A1* | 5/2024 | Torttila | G06T 7/70 |
| 2024/0241524 A1* | 7/2024 | Oppolzer | G06Q 10/087 |
| 2025/0046060 A1* | 2/2025 | Zhang | G06N 3/045 |

FOREIGN PATENT DOCUMENTS

| | | |
|---|---|---|
| CN | 101940093 B | 1/2013 |
| CN | 102980512 A | 3/2013 |
| CN | 104680585 A | 6/2015 |
| CN | 106044663 B | 12/2018 |
| CN | 109680738 A | 4/2019 |
| CN | 109948189 A | 6/2019 |
| CN | 109682447 B | 6/2021 |
| CN | 113216312 A | 8/2021 |
| CN | 112819882 B | 11/2021 |
| DE | 112019000630 T5 | 10/2020 |
| EP | 3748087 A3 | 4/2021 |
| JP | 2000283734 A | 10/2000 |
| JP | 2008241300 A | 10/2008 |
| JP | 5108350 B2 | 12/2012 |
| WO | 2017100903 A1 | 6/2017 |
| WO | 2018136889 A1 | 7/2018 |
| WO | 2019227194 A1 | 12/2019 |
| WO | 2022093525 A1 | 5/2022 |
| WO | WO-2025101270 A1 * | 5/2025 ............... G06T 3/40 |

OTHER PUBLICATIONS

Tran, et al., "A Closer Look at Spatiotemporal Convolutions for Action Recognition", In Proceedings of the IEEE Conference on Computer Vision and Pattern Recognition, Jun. 18, 2018, pp. 6450-6459.

Fu, et al., "Deep Ordinal Regression Network for Monocular Depth Estimation", In Proceedings of the IEEE Conference on Computer Vision and Pattern Recognition, Jun. 18, 2018, pp. 2002-2011.

Liu, et al., "Electric Shovel Teeth Missing Detection Method Based on Deep Learning", In Computational Intelligence and Neuroscience, Nov. 2021, 13 pages.

* cited by examiner

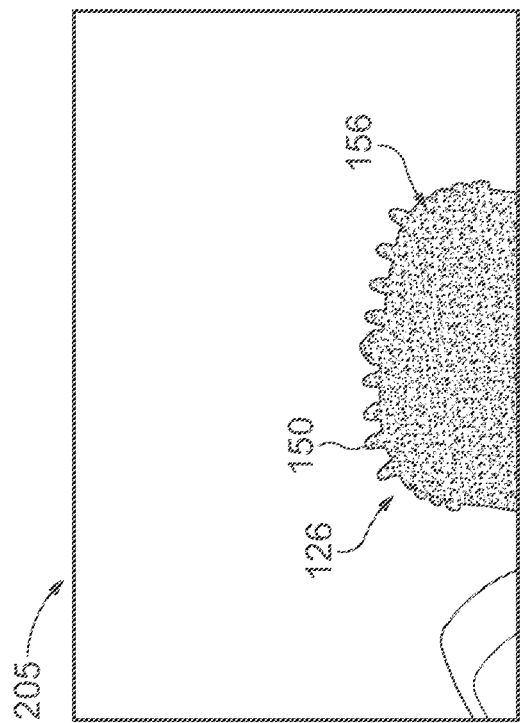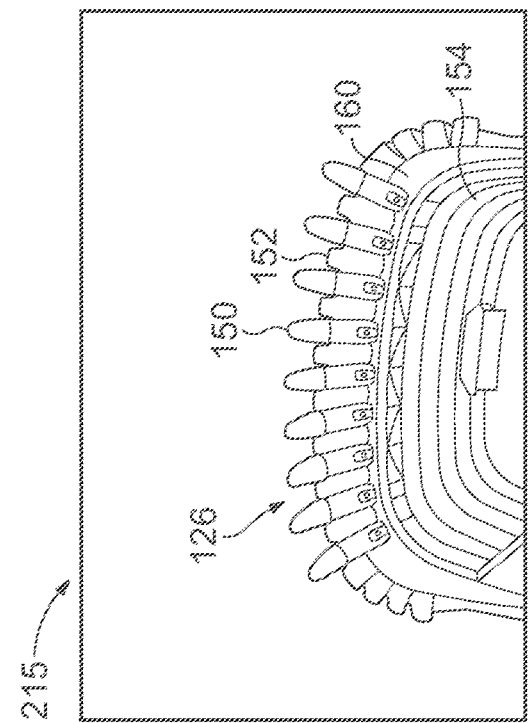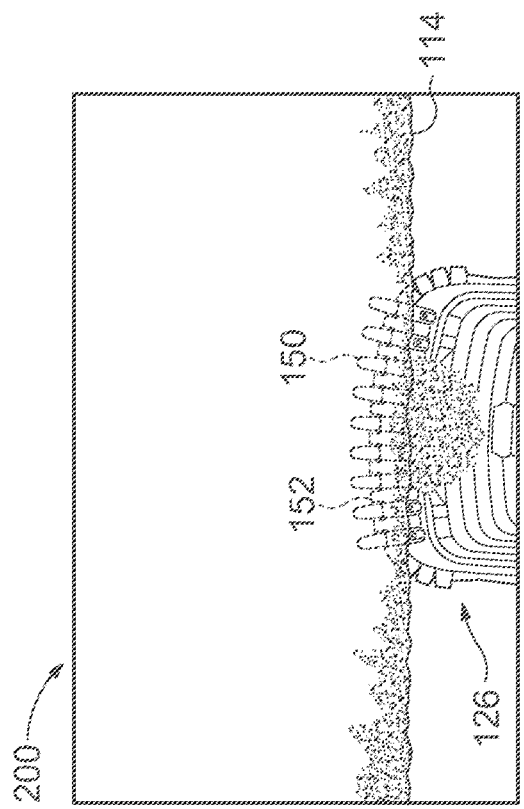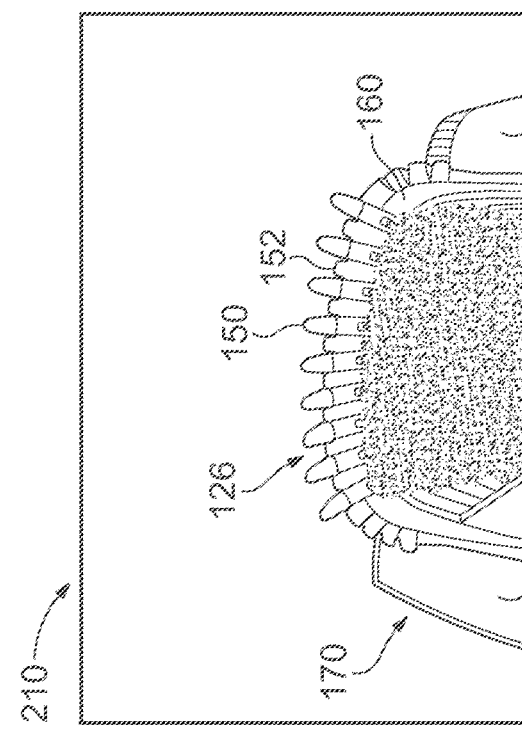

MONITORING AN OPERATING CYCLE OF HEAVY EQUIPMENT

FIELD OF THE INVENTION

This disclosure relates generally to monitoring operations of heavy equipment having an operating implement configured to excavate a load from a mining face, and more specifically for performing analysis on one or more of the operating implement, the load and the mine face based on a sequence of images retrieved during a particular stage of an operating cycle of the heavy equipment.

BACKGROUND OF THE INVENTION

Heavy equipment such as mining shovels and excavators are used to excavate earthen material from a mine face and to dump such earthen material into a haul truck or onto a conveyor for transportation to a processing location. Due to the large size and capital cost of such heavy equipment, monitoring the operation of the heavy equipment can be an important aspect of mining operations.

For example, wear of components of operating implements of the heavy equipment can reduce digging performance during excavation. Such components include teeth and shrouds attached to buckets. A detached tooth or detached shroud falling into an earthen material load for example can cause damage to comminution equipment during later processing of the earthen material load. Further, the earthen material load may include large boulders which can also result in damage to the comminution equipment during later processing or to the haul truck during dumping.

SUMMARY OF THE INVENTION

In one example, there is provided a method for monitoring operations of heavy equipment having an operating implement configured to excavate a load from a mine face. The method comprises: capturing a plurality of images during an operating cycle of the heavy equipment and processing the plurality of images through an activity classifier model implemented on a processor circuit. The activity classifier model includes a neural network having been configured and trained for generating an activity label based on a sequence of images in the plurality of images. The activity label associates the sequence of images with at least one stage of a plurality of stages making up the operating cycle. The method further comprises: performing at least one analysis using the sequence of images associated with the at least one stage, the at least one analysis including an analysis of the operating implement, an analysis of the load, and/or an analysis of the mine face.

In another example, there is provided a computer-readable storage medium storing instructions which, when executed by at least one processor of a processor circuit, causes the at least one processor to at least process a plurality of images captured during an operating cycle of a heavy equipment through an activity classifier model implemented on the processor circuit. The activity classifier model including a neural network having been configured and trained for generating an activity label based on a sequence of images in the plurality of images. The activity label associates the sequence of images with at least one stage of a plurality of stages making up the operating cycle The instructions further cause the at least one processor to at least perform at least one analysis using the sequence of images associated with the at least one stage, the at least one analysis including an analysis of an operating implement of the heavy equipment, an analysis of a load excavated from a mine face by the heavy equipment, and/or an analysis of the mine face.

In another example, there is provided a computer system comprising at least one processor of a processor circuit. The at least one processor is configured to at least process a plurality of images captured during an operating cycle of a heavy equipment through an activity classifier model implemented on the processor circuit. The activity classifier model includes a neural network having been configured and trained for generating an activity label based on a sequence of images in the plurality of images. The activity label associates the sequence of images with at least one stage of a plurality of stages making up the operating cycle. The at least one processor is further configured to at least perform at least one analysis using the sequence of images associated with the at least one stage, the at least one analysis including an analysis of an operating implement of the heavy equipment, an analysis of a load excavated from a mine face by the heavy equipment, and/or an analysis of the mine face.

In another example, there is provided a method for monitoring operations of heavy equipment having an operating implement configured to excavate a load from a mine face. The method comprises: capturing a plurality of images during an operating cycle of the heavy equipment; and processing the plurality of images through an activity classifier model implemented on a processor circuit, the activity classifier model including a neural network having been configured and trained for generating an activity label based on a sequence of images in the plurality of images. The activity label associates the sequence of images with at least one stage of a plurality of stages making up the operating cycle. The method further comprises: performing at least one analysis using the sequence of images associated with the at least one stage, the at least one analysis including of an analysis of the operating implement, an analysis of the load, and/or an analysis of the mine face; aggregating results of the at least one analysis performed using the sequence of images associated with the at least one stage over a plurality of operating cycles; and generating at least one aggregated metric characterizing the at least one stage over the plurality of operating cycles based on the aggregated results of the at least one analysis.

In another example, there is provided a computer-readable storage medium storing instructions which, when executed by at least one processor of a processor circuit, causes the at least one processor to at least process a plurality of images captured during an operating cycle of a heavy equipment through an activity classifier model implemented on the processor circuit. The activity classifier model includes a neural network having been configured and trained for generating an activity label based on a sequence of images in the plurality of images. The activity label associates the sequence of images with at least one stage of a plurality of stages making up the operating cycle. The instructions further cause the at least one processor to at least perform at least one analysis using the sequence of images associated with the at least one stage. The at least one analysis includes an analysis of an operating implement of the heavy equipment, an analysis of a load excavated from a mine face by the heavy equipment, and/or an analysis of the mine face. The instructions further cause the at least one processor to at least: aggregate results of the at least one analysis performed using the sequence of images associated with the at least one stage over a plurality of operating cycles; and generate at least one aggregated metric characterizing the at least one stage over the plurality of operating cycles based on the aggregated results of the at least one analysis.

In another example, there is provided a computer system comprising at least one processor of a processor circuit. The at least one processor is configured to at least process a plurality of images captured during an operating cycle of a heavy equipment through an activity classifier model implemented on the processor circuit. The activity classifier model includes a neural network having been configured and trained for generating an activity label based on a sequence of images in the plurality of images. The activity label associates the sequence of images with at least one stage of a plurality of stages making up the operating cycle. The at least one processor is further configured to perform at least one analysis using the sequence of images associated with the at least one stage. The at least one analysis including an analysis of an operating implement of the heavy equipment, an analysis of a load excavated from a mine face by the heavy equipment, and/or an analysis of the mine face. The at least one processor is further configured to: aggregate results of the at least one analysis performed using the sequence of images associated with the at least one stage over a plurality of operating cycles; and generate at least one aggregated metric characterizing the at least one stage over the plurality of operating cycles based on the aggregated results of the at least one analysis.

Other aspects and features will become apparent to those ordinarily skilled in the art upon review of the following description of specific disclosed examples in conjunction with the accompanying figures.

BRIEF DESCRIPTION OF THE DRAWINGS

In drawings which illustrate disclosed examples,

FIGS. 8A-D are example images or frames of the field-of-view of an image capture system of the system of FIG. 1 while the mining shovel is in an excavate stage, the swing full stage, the dump stage, and the swing empty stage respectively in accordance with one example;

DETAILED DESCRIPTION

Figure 1:
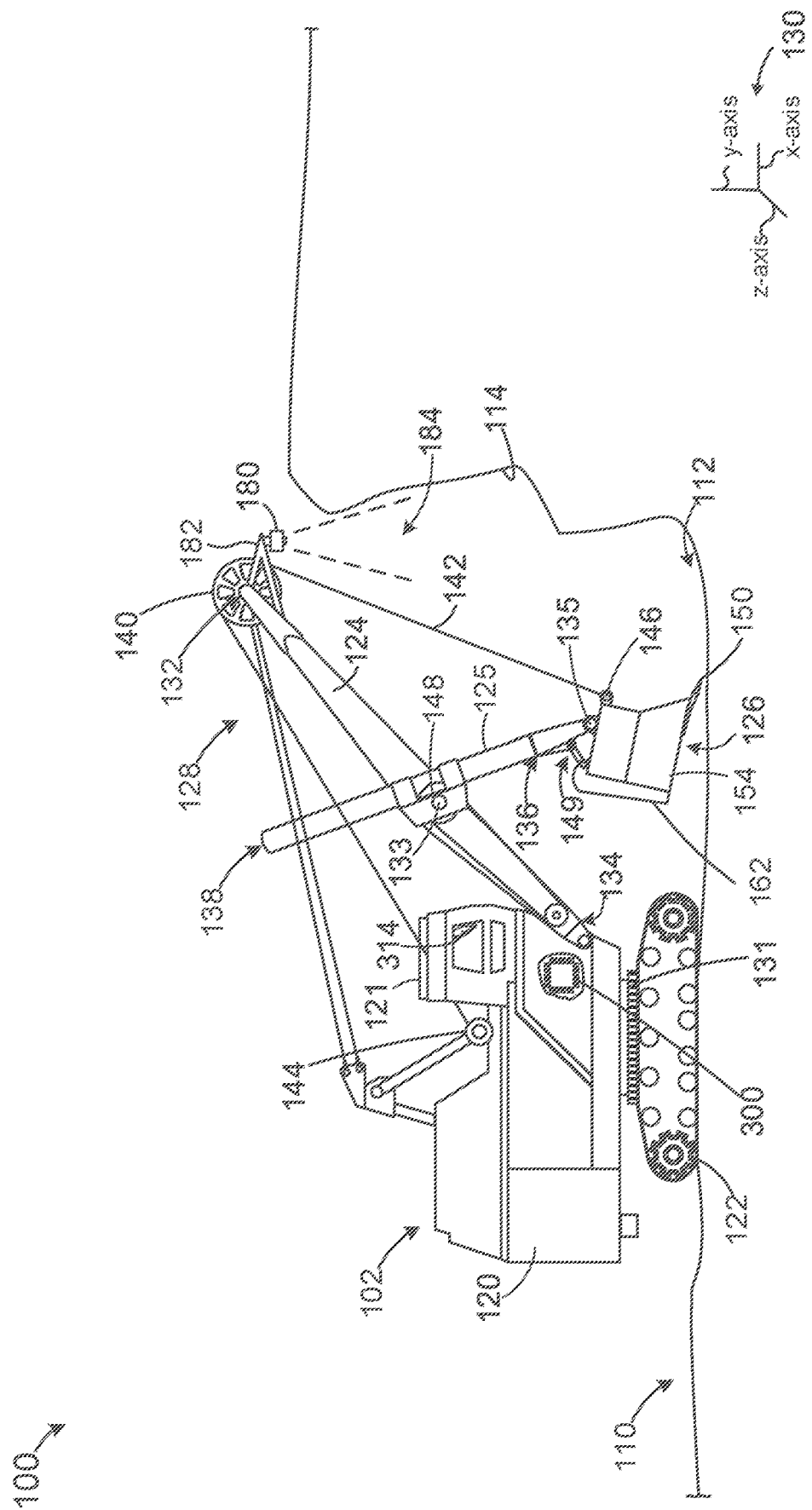
FIG. 1 is a schematic view of a system for monitoring an operating cycle of a mining shovel, with the mining shovel in an engage substage in accordance with one example.

Referring to FIG. 1, a system for monitoring an operating cycle of heavy equipment is shown at 100. In the example shown, the heavy equipment is a mining shovel 102 generally configured for excavating earthen material from a mine face or work bench 114 or other earthen material pile in an open pit mine shown generally at 110. Another example of the heavy equipment is a hydraulic face shovel 950 shown in FIG. 23 for example. In other examples, the heavy equipment may be any other type of equipment which engages the mine face 114 or any other type of equipment designed to transfer loads from one location to another, such as a dragline shovel, a backhoe excavator, or wheel loader for example.

Mining Shovel

In one example, the mining shovel 102 includes a frame 120 pivotably mounted on a track 122, a boom 124 mounted to the frame 120, a handle 125 pivotably mounted to the boom 124, an operating implement 126 mounted to the handle 125, and a control mechanism shown generally at 128 for controlling the mining shovel 102 to perform an excavate operation of the mine face 114 or a dump operation of a load 156 (shown in FIG. 3) excavated from the mine face 114 or the earthen material pile. The track 122 enables the mining shovel 102 to traverse across the open pit mine 110. The frame 120 has a power source (not shown) for powering the track 122 and the control mechanism 128 and an operator station 121 for housing an operator. The operator may be autonomous, semi-autonomous, or non-autonomous. The pivotal mounting 131 between the frame 120 and the track 122 allows the frame 120 to rotate about a y-axis of a coordinate axes 130 relative to the track 122.

The boom 124 has a distal end 132 and a proximal end 134. The distal end 132 may be fixedly mounted (or pivotably mounted in some examples) to the frame 120 such that rotation and movement of the frame 120 translates into corresponding rotation and movement of the boom 124. The pivotal mounting 133 between the boom 124 and the handle 125 is generally at a midway point between the distal and proximal ends 132 and 134 of the boom 124. Similarly, the handle 125 has a distal end 136 and a proximal end 138. The pivotal mounting 133 between the boom 124 and the handle 125 may allow the handle 125 to rotate about a z-axis of the coordinate axes 130 relative to the boom 124 and also may allow a mounting point between the boom 124 and the handle 125 to translate along a length of the handle 125 between the distal and proximal ends 136 and 138 of the handle 125. The operating implement 126 may be pivotally mounted to the distal end 136 of the handle 125. Rotation and movement of the handle 125 generally translates into corresponding rotation and movement of the operating implement 126; however, the pivotal mounting 135 between the handle 125 and the operating implement 126 may also allow the operating implement 126 to rotate about the z-axis of the coordinate axes 130 relative to the handle 125. In other examples, the mining shovel 102 may include additional, fewer, or alternative components which may be coupled to each other via other mountings.

In the example shown in FIG. 1, the mining shovel 102 is a cable-based shovel, and the control mechanism 128 may include a motorized pulley 140 coupled to the distal end 132 of the boom 124, at least one cable 142 having a first end coupled to the frame 120 via a frame motorized spool 144 and a second end coupled to the operating implement 126 via an implement motorized spool 146, a motorized pivot 148 as the pivotal mounting 133 between the boom 124 and the handle 125, and a door control mechanism 149 of a bottom wall 162 of a load container 154. The frame motorized spool 144 and implement motorized spool 146 may allow the operating implement 126 to rotate by reeling in and spooling out the at least one cable 142 during different stages of the operating cycle of the mining shovel 102 as described below. The motorized pivot 148 may allow the mounting point between the boom 124 and the handle 125 to translate along the length of the handle 125 between the distal and proximal ends 136 and 138 of the handle 125. The motorized pulley 140 may support the extension and retraction of the at least one cable 142 and the translation of the handle 125. The door control mechanism 149 may open and close a bottom wall 162 of the load container 154 as described below. In the example shown in FIG. 23, hydraulic excavator 950 is a hydraulic-based shovel, and may have a control mechanism 128' including a plurality of hydraulic actuators.

Figure 2:
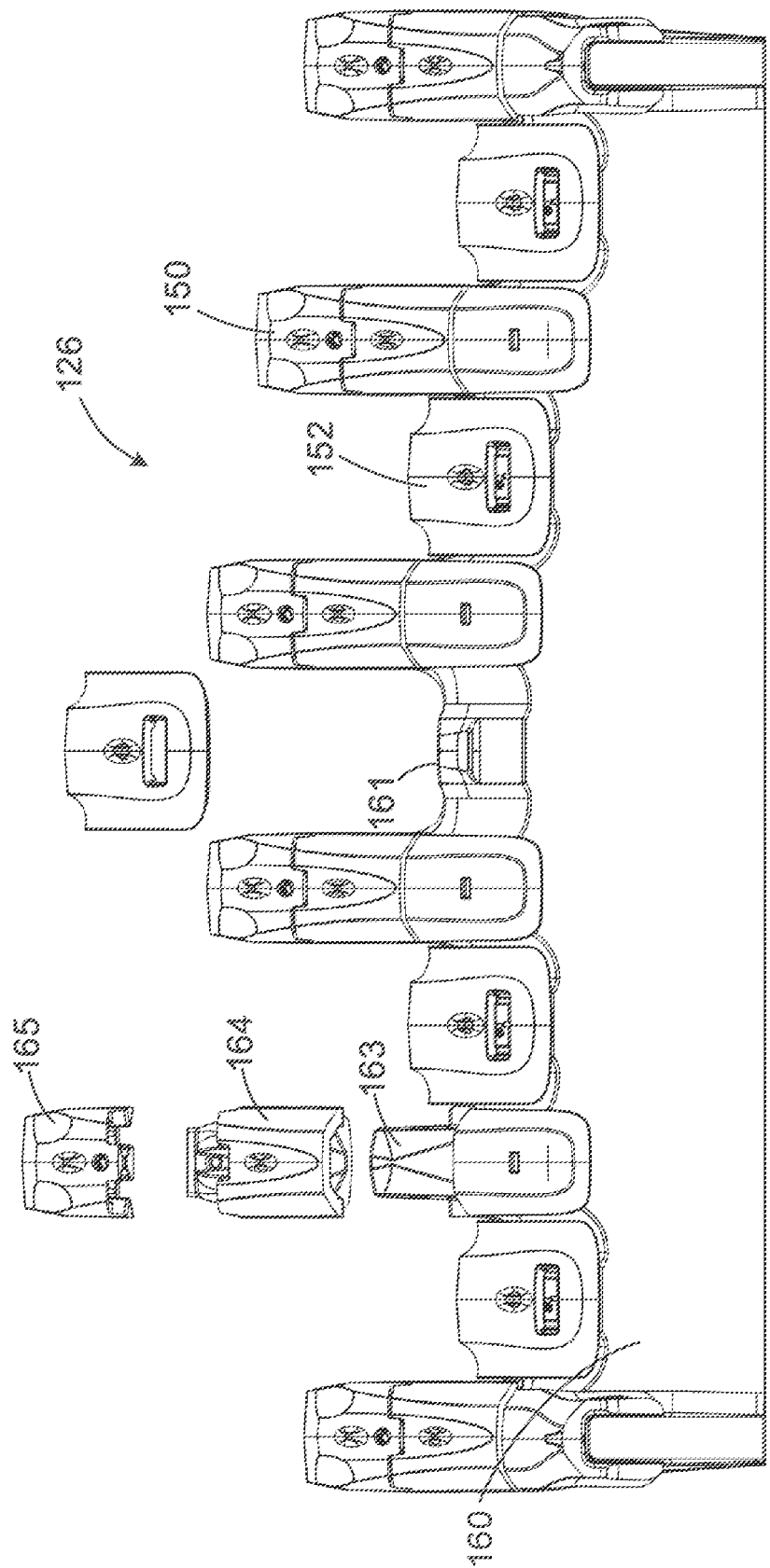
FIG. 2 is a plan view of an operating implement of the mining shovel of FIG. 1 in accordance with one example.

Referring to FIGS. 1 and 2, the operating implement 126 may include a plurality of ground engaging teeth 150, a plurality of ground engaging lip shrouds 152 and a load container 154. In other examples, and depending on the function of the heavy equipment and the type of earthen material to be excavated from the mine face 114 or the earthen material pile, the operating implement 126 may include additional, fewer, or alternative components. The load container 154 includes a lip 160, a rear wall, and the openable bottom wall 162 pivotably mounted to the rear wall and operable to be opened and closed by the door control mechanism 149. The teeth 150 and the shrouds 152 are coupled to a leading edge 161 of the lip 160. In the example shown, each tooth of the teeth 150 includes an intermediate adapter 164 and a tip 165. The intermediate adapters 164, the tips 165 and the shrouds 152 are wearable parts of the operating implement 126 that may be replaced. During an excavate stage of the mining shovel 102, the teeth 150 and shrouds 152 engage the mine face 114 and capture earthen material into the load container 154 as a load 156. The teeth 150 and shrouds 152 protect the leading edge 161 of the lip 160 from wear due to contact with mine face 114. The load container 154 supports the load 156 until the openable bottom wall 162 pivotably opens relative to the rear wall of the load container 154 to dump the load 156 during a dumping stage.

Operating Cycle

In operation, the operator within the operator station 121 of the frame 120 will cause the mining shovel 102 to go through a series of activities which make up an operating cycle of the mining shovel 102. The operating cycle may include at least the following stages: (1) excavate stage, (2) swing full stage, (3) dump stage, (4) swing empty stage, and (5) idle stage. The series of activities may be repeated for a plurality of operating cycles of the mining shovel 102. For example, the mine shovel 102 may perform a first excavate stage to initiate a first operating cycle, and then continue to a first swing full stage, a first dump stage and a first swing empty stage to complete the first operating cycle, and then back to a second excavate stage to initiate a second operating cycle. In other examples, the operating cycle of the mining shovel 102 may include additional, fewer or alternative stages. For example, in certain situations, the operating cycle may comprise bench cleaning subcycle which includes only (1) the excavate stage and (2) the dump stage.

Excavate Stage

Figure 3:
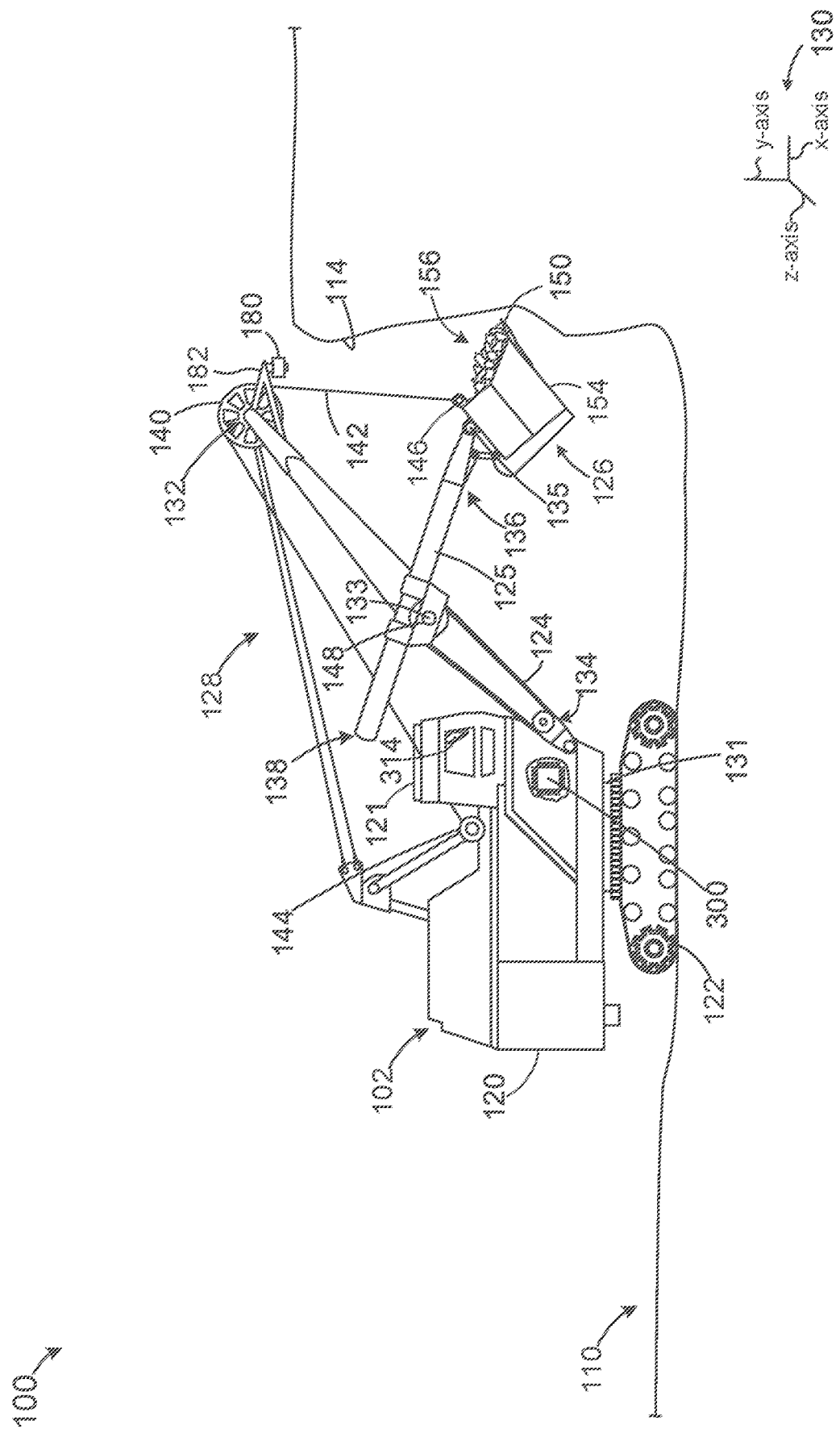
FIG. 3 is a schematic view of the system of FIG. 1, with the mining shovel in an excavate substage in accordance with one example.
Figure 4:
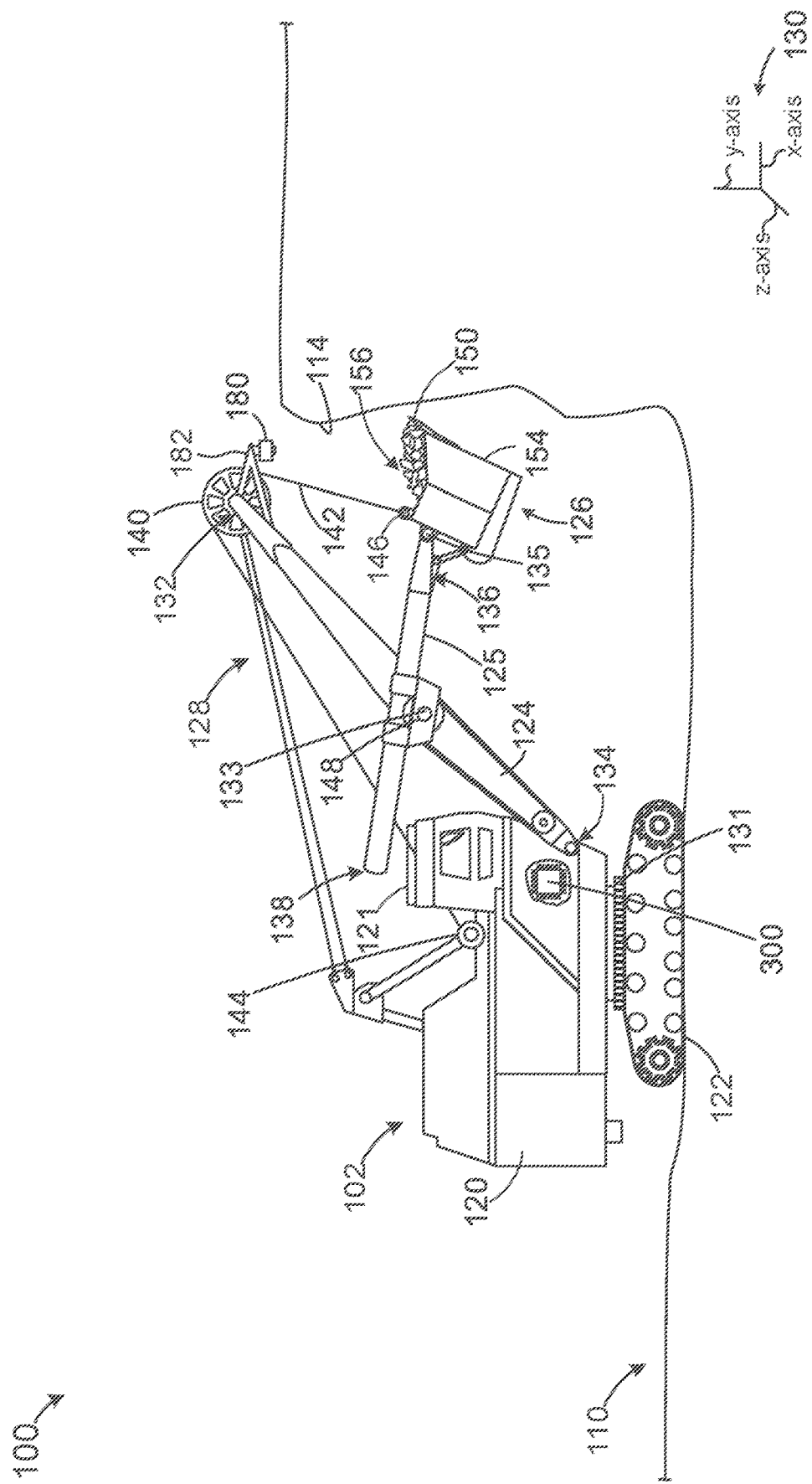
FIG. 4 is a schematic view of the system of FIG. 1, with the mining shovel in a release substage in accordance with one example.

Referring to FIGS. 1, 3 and 4, during the excavate stage, the operator will control the mining shovel 102 to excavate earthen material from the mine face 114. The excavate stage itself may include at least the following substages: (a) engage substage, (b) excavate substage and (c) release substage.

During the engage substage, the handle 125 is positioned in a lowered configuration shown in FIG. 1 (with a small angle relative to the y-axis and a large angle relative to an x-axis of the coordinate axes 130) such that the load container 154 is positioned toward the mine face 114. To transition to the lowered configuration, the operator may control the mining shovel 102 to cause at least one of the frame and implement motorized spools 144 and 146 to extend the at least one cable 142 to lower the operating implement 126, while causing the motorized pulley 140 to translate the mounting point between the boom 124 and the handle 125 towards the proximal end 138 of the handle 125.

During the excavate substage, the handle 125 transitions from the lowered configuration shown in FIG. 1 to a substantially horizontal configuration shown in FIG. 3 (with a large angle relative to the y-axis and a small angle relative to the x-axis), which extends the operating implement 126 into the mine face 114 to excavate the earthen material therefrom. To transition to the substantially horizontal configuration, the operator may control the mining shovel 102 to cause at least one of the frame and implement motorized spools 144 and 146 to retract the at least one cable 142 to raise the operating implement 126, while causing the motorized pulley 140 to translate the mounting point between the boom 124 and the handle 125 towards the distal end 136 of the handle 125.

During the release substage, the handle 125 is positioned in a raised configuration shown in FIG. 4 (again with a large angle relative to the y-axis and a small, but larger than that of the substantially horizontal configuration shown in FIG. 3, angle relative to the x-axis) to maintain the load 156 in the load container 154. To transition to the raised configuration, the operator may control the mining shovel 102 to cause at least one of the frame and implement motorized spools 144 and 146 to further retract the at least one cable 142 to further raise the operating implement 126, while causing the motorized pulley 140 to further translate the mounting point between the boom 124 and the handle 125 towards the distal end 136 of the handle 125.

Swing Full Stage

Figure 5:
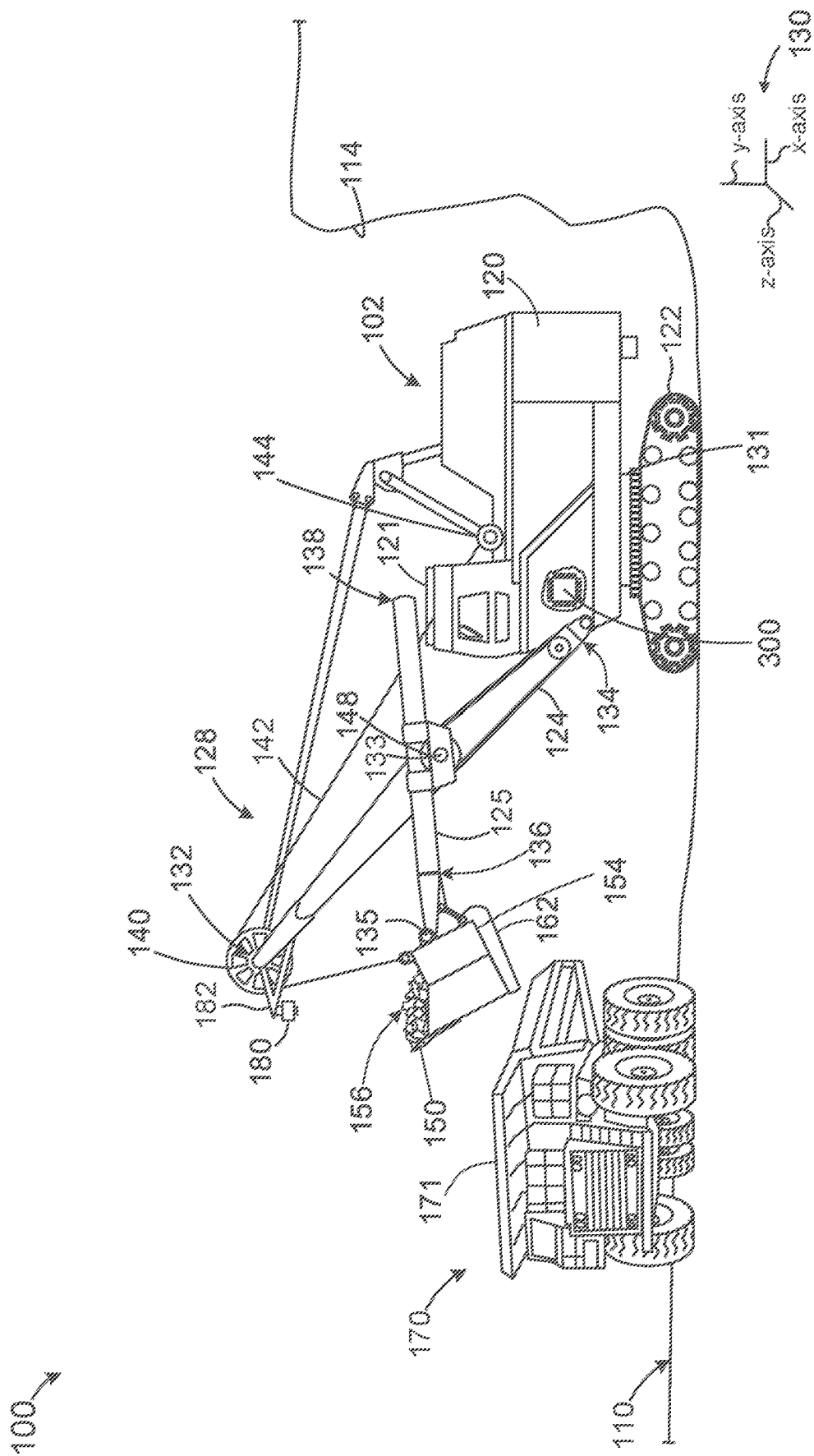
FIG. 5 is a schematic view of the system of FIG. 1, after the mining shovel has completed a swing full stage in accordance with one example.

The swing full stage occurs after the excavate stage when the load 156 is within the load container 154. Referring to FIG. 5, during the swing full stage, the operator may control the mining shovel 102 to rotate the load container 154 laterally away from the mine face 114 and towards a desired dump location. This may be done by rotating the frame 120 relative to the track 122 about the y-axis until the load container 154 containing the load 156 is positioned above the desired dump location. In the example shown in FIG. 5, the desired dump location is a truck bed 171 of a haul truck 170. In such examples, the operator may also control additional components of the control mechanism 128 or the track 122, or an operator of the haul truck 170 may control the positioning of the haul truck 170, to fine-tune the relative positions of the load container 154 and the truck bed 171. In other examples, the desired dump location is another location in the open pit mine 110, such as a conveyor belt or another earthen material pile. In such examples, the operator may also control additional components of the control mechanism 128 or the track 122 to fine-tune the relative positions of the load container 154 and the desired dump location.

Dump Stage

Figure 6:
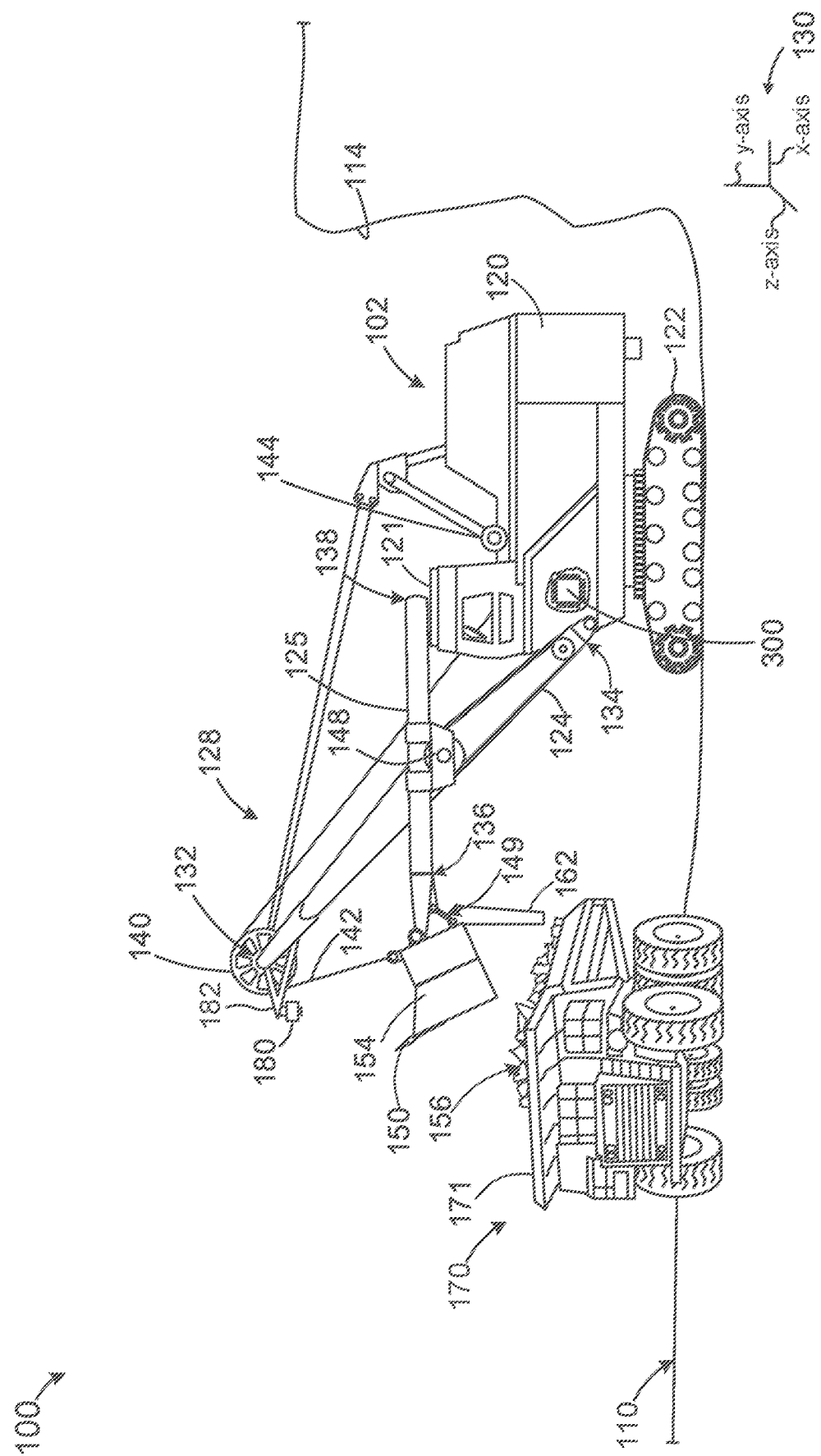
FIG. 6 is a schematic view of the system of FIG. 1, after the mining shovel has completed a dump stage in accordance with one example.

The dump stage may occur after the swing full stage when the load 156 within the load container 154 is positioned above the desired dump location. Referring to FIGS. 5 and 6, during the dump stage, the operator may control the mining shovel 102 to unload the load 156 from the load container 154 to the desired dump location. For example, the operator may control the door control mechanism 149 to open the bottom wall 162 of the load container 154. Additionally or alternatively, the operator may cause at least one of the frame and implement motorized spools 144 and 146 to extend the at least one cable 142 to rotate the load container 154 about the z-axis relative to the handle 125 to a dump position to unload the load 156.

Swing Empty Stage

Figure 7:
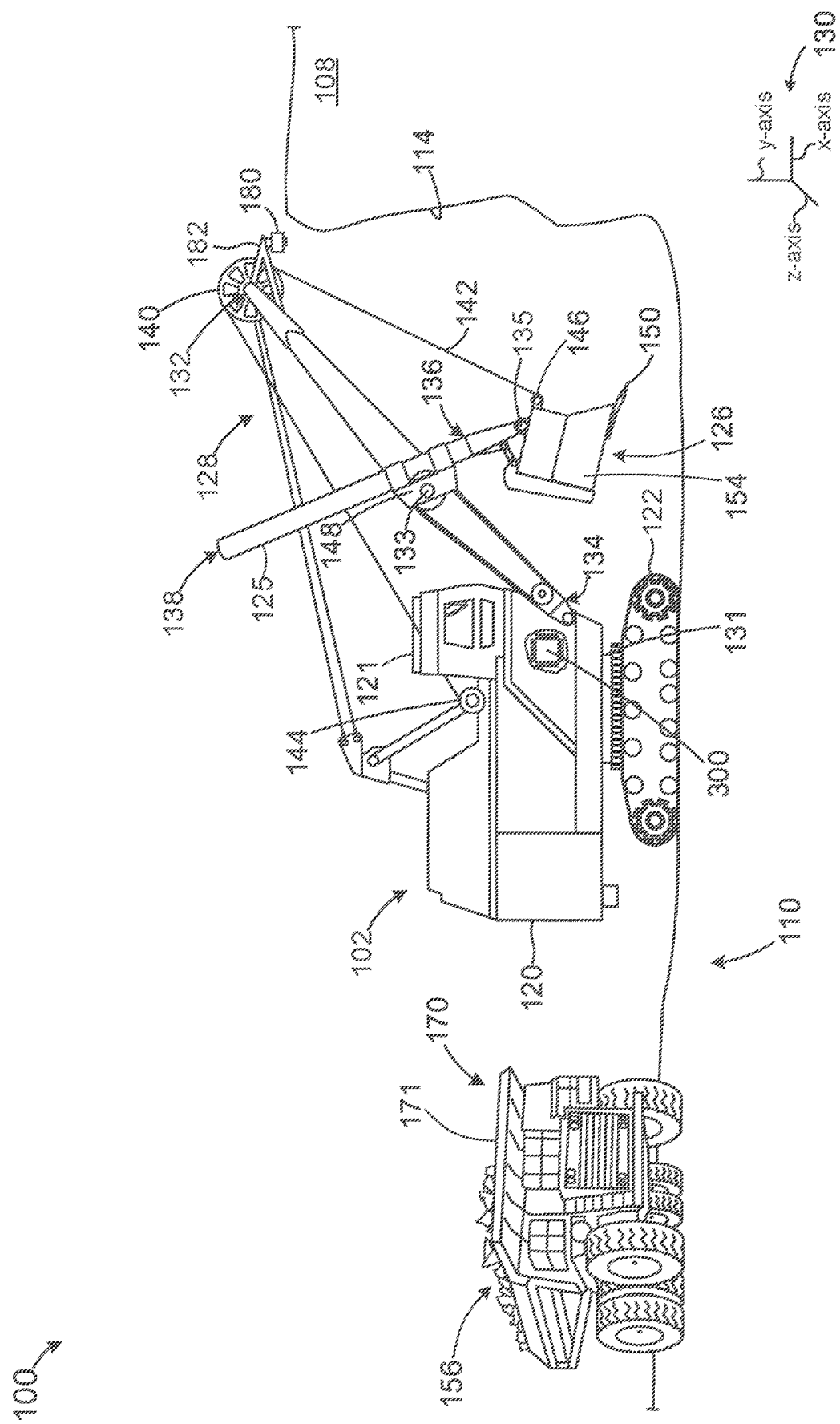
FIG. 7 is a schematic view of the system of FIG. 1, after the mining shovel has completed a swing empty stage in accordance with one example.

The swing empty stage may occur after the dump stage when the load 156 is unloaded and the load container 154 is emptied. Referring to FIGS. 6 and 7, during the swing empty stage, the operator may control the mining shovel 102 to rotate the now empty load container 154 laterally away from the desired dump location and towards another position proximate the mine face 114 to extract the earthen material therefrom in a subsequent excavate stage. The operator may initially control the door control mechanism 149 to close the bottom wall 162, and/or cause at least one of the frame and implement motorized spools 144 and 146 to retract the at least one cable 142 back from the dump position. Then, the operator may rotate the frame 120 relative to the track 122 about the y-axis until the operating implement 160 is positioned proximate the mine face 114 again. The operator may also control the track 122 to move the entire frame 120 to fine-tune the relative positions of the operating implement 126 and the mine face 114 for the next excavate stage.

Idle Stage

During each stage of the operating cycle, between the stages of the operating cycle or between a plurality of operating cycles, the operator may cause the mining shovel 102 to idle, not perform any specific activities which form the stages of the operating cycle described above, and/or be still. During the idle stage, the operator may be waiting for other equipment or personnel to be properly positioned. For example, during the dump stage, the operator may cause the mining shovel 102 to idle while waiting for the operator of the haul truck 170 to position the truck bed 171 below the load container 154. In another example, during the excavate stage, the operator may cause the mining shovel 102 to idle while waiting for personnel to reach a safe location.

Image Capture System

Figure 23:
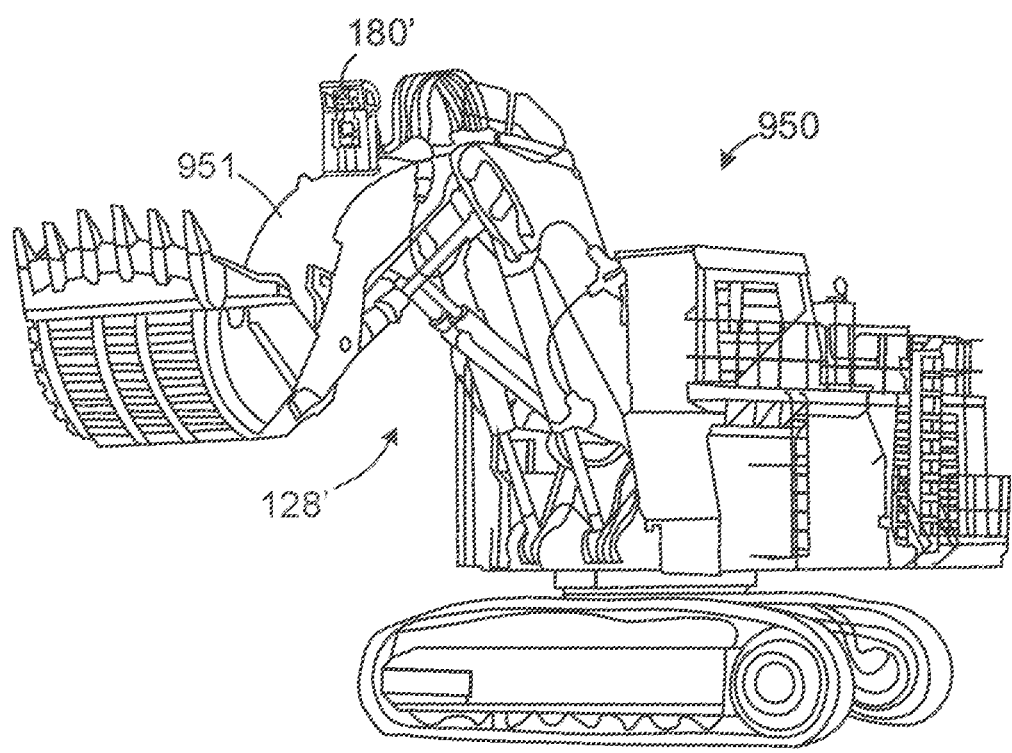
FIG. 23 is a perspective view of a system for monitoring an operating cycle of a hydraulic excavator in accordance with one example.

Still referring to FIGS. 1 and 2-7, the monitoring system 100 includes an image capture system 180 mounted to the mining shovel 102 via a bracket 182 coupled to the boom 124, and may be proximate the motorized pulley 140. The image capture system 180 is generally positioned such that a field-of-view 184 of the image capture system 180 captures images and/or video of the operating implement 126 as data, and particularly the load container 154, the shrouds 152, the teeth 150, and the load 156 if any, and a portion of the mine face 114 lying behind the operating implement 126 during the various stages of the operating cycle described above. In other examples, the image capture system 180 may mounted to other locations or other components of the heavy equipment to capture the operating implement 126, the load 156 and a portion of the mine face 114 depending on the type of heavy equipment. Referring to FIG. 23, an image capture system 180' may be mounted to a handle 951 of the hydraulic face shovel 950. Additionally or alternatively, in other examples, the field-of-view 184 may be selected to capture other components of the heavy equipment or other background features associated with the open pit mine 110. For example, the field-of-view 184 may be selected to capture images and video of the mine face 114 or the earthen material pile, during and after each excavate stage, and the image capture system 180 may also be mounted at other locations or to other components of the heavy equipment depending on the desired field-of-view.

An example of an image or a frame of a video captured by the image capture system 180 during the excavate stage is shown at 200 in FIG. 8A, which captures a portion of the mine face 114 currently being excavated and the load 156 within the load container 154. An example of an image or a frame captured during the swing full stage is shown at 205 in FIG. 8B, which captures the load 156 within the load container 154 and a portion of the teeth 150 of the operating implement 126. An example of an image or a frame captured during the dump stage is shown at 210 in FIG. 8C, which captures the teeth 150, a portion of the shrouds 152 and a portion of the lip 160 of the operating implement 126, and a portion of the truck bed 171 of the haul truck 170. An example of an image or a frame captured during the swing empty stage is shown at 215 in FIG. 8D, which captures the teeth 150, the shrouds 152 and the lip 160 of the operating implement 126.

Figure 9:
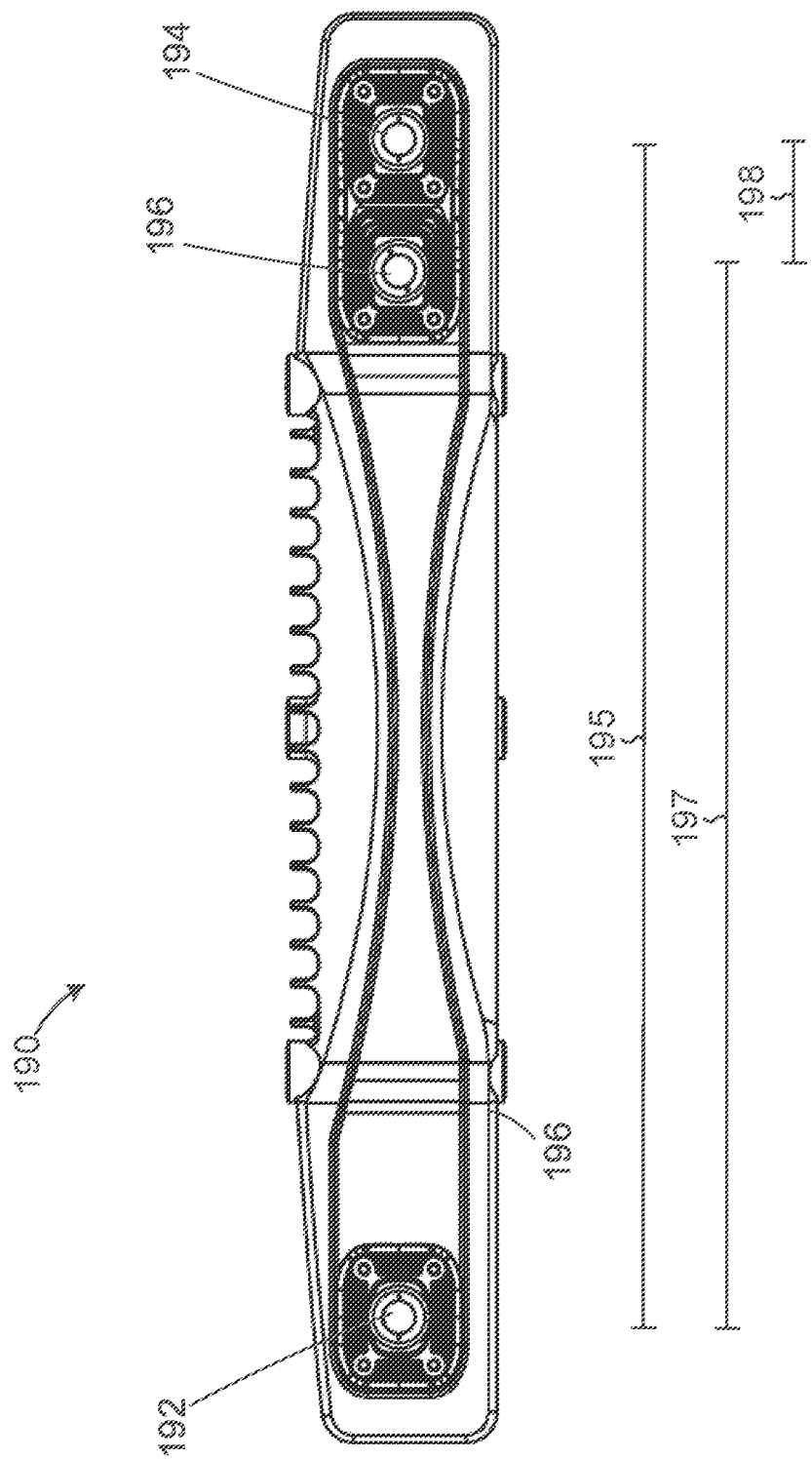
FIG. 9 is a front view of a stereoscopic camera which forms the image capture system of the system of FIG. 1 in accordance with one example.

In the example shown, the image capture system 180 may be implemented as a single stereoscopic camera which captures images or a video of the field-of-view 184 during the operating cycle of the mining shovel 102. An example of a stereoscopic camera is shown in FIG. 9 at 190, and may be the MultiSense S30 stereocamera from Carnegie Robotics, LLC. The stereoscopic camera 190 may be capable of using stereo-imaging to obtain a three-dimensional (3D) point cloud of the images and frames of the video. In the example shown, the stereoscopic camera 190 includes a first imager 192 and a second imager 194 mounted spaced apart by a first fixed distance 195 within a housing 196. The first and second imagers 192 and 194 capture first and second images of the field-of-view 184 from a slightly different perspective (such as left and right or up and down). Combining the first and second images from slightly different perspectives and knowing the fixed distance 195 can allow an internal edge processor of the stereoscopic camera 190 or an embedded processor circuit 300 (shown in FIG. 10) of the mining shovel 102 described below to calculate 3D coordinates for pixels associated with features found in both the first and second images and to estimate a depth value of that pixel relative to the stereoscopic camera 190. Additionally, in the example shown, the first and second imagers 192 and 194 may capture the first and second images in monochrome, and the image capture system 180 may further include a third imager 198 which captures a third image of the field-of-view 184 in colour (red, green and blue). The third imager 196 may be separated from the first imager 192 by a second fixed distance 197 and may be separated from the second imager 194 by a third fixed distance 198. FIGS. 8A-8B may represent the third image captured by the third imager 198 during the different stages of the operating cycle.

In examples where the stereoscopic camera 190 captures a video of the field-of-view 184, the video captured by one or more the first, second and third imagers 192, 194, 198 may be captured substantially continuously during the operating cycle. The video may be at a frame rate of up to 3 frames per second (FPS), a resolution height of 1920 pixels, and a resolution width of 1188 pixels. In other examples, the captured video may be up to 10 FPS, up to 30 FPS or up to 120 FPS and may have a resolution height ranging between 50 and 2000 pixels and a resolution length ranging between 50 and 3000 pixels. In examples where the stereoscopic camera 190 captures images, one or more of the first, second and third imagers 192, 194 and 198 may capture sequential images at specific time intervals to generate a plurality of sequential images at different points in time during the operating cycle. The time intervals between sequential images may be 20 seconds and the images may have a resolution height of 1920 pixels and a resolution width of 1200 pixels. In other embodiments, the time intervals may be 1 second, 5 seconds, 10 seconds, 30 seconds, 60 seconds, 90 seconds or 120 seconds and the images may have a resolution height ranging between 50 and 2000 pixels and a resolution length ranging between 50 and 3000 pixels. The frames of the video or the images of sequential images of the field-of-view 184, and any depth values calculated by the internal edge processor, may then be transmitted by the stereoscopic camera 190 to the processor circuit 300 for subsequent processing.

In the other examples, the image capture system 180 may be implemented as a single two-dimensional (2D) camera which captures sequential images or a video of the field-of-view 184 during the operating cycle of the mining shovel 102.

Processor Circuit

Figure 10:
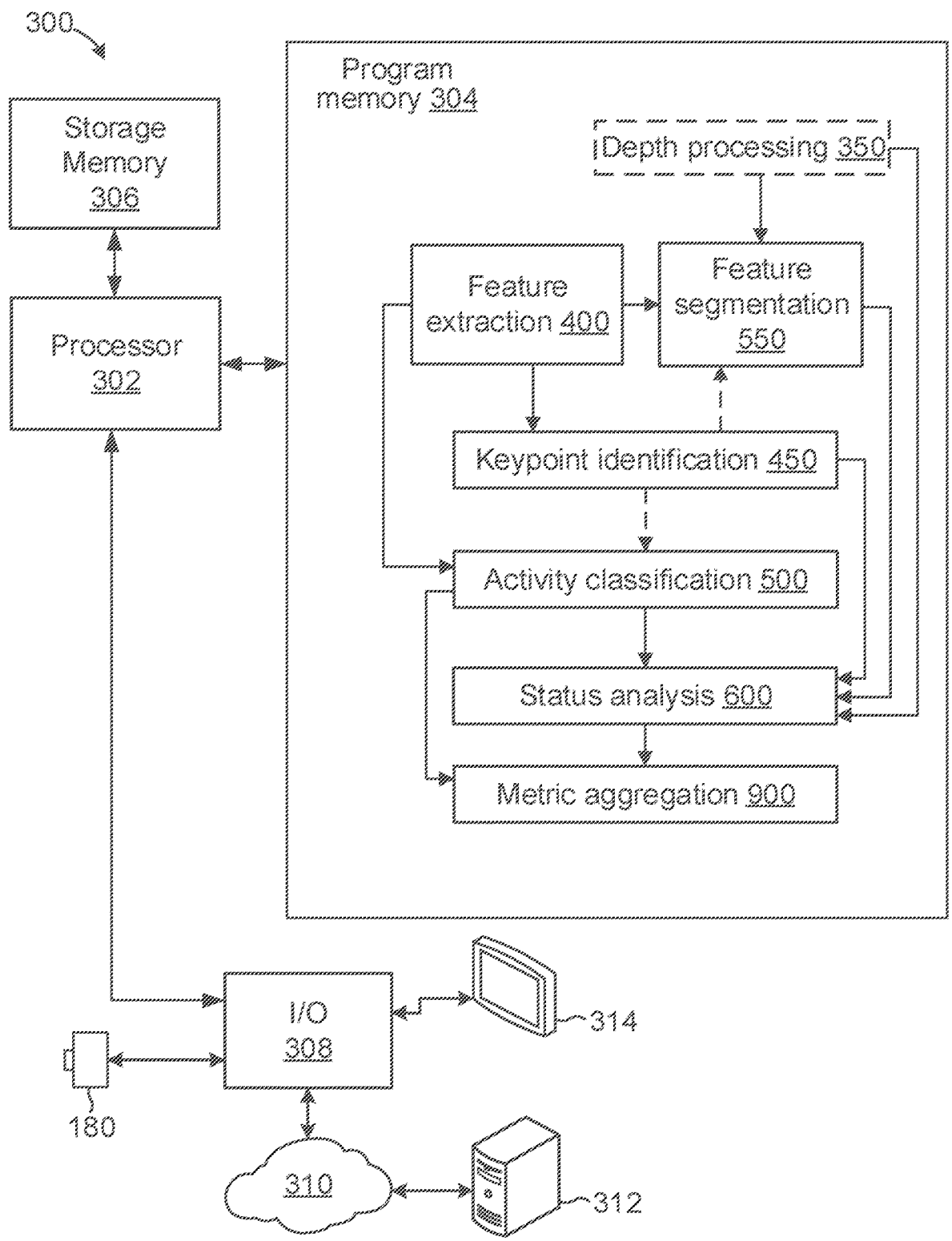
FIG. 10 is a block diagram of a processor circuit of an embedded processor of the system of FIG. 1 in accordance with one example.

The monitoring system 100 also includes the processor circuit 300, an example of which is shown in FIG. 10. Referring briefly back to FIGS. 1 and 2-7, in the illustrated example shown, the processor circuit 300 is embedded within the frame 120 of the mining shovel 102. However, in other examples, the processor circuit 300 may be located remote from the mining shovel 102, such as at a control center (not shown) of the open pit mine 110 for example. Referring now to FIG. 10, in the example shown, the processor circuit 300 includes at least one processor 302, a program memory 304, a storage memory 306, and an input/output (I/O) interface 308 all in communication with the processor 302. Other examples of the processor circuit 300 may include fewer, additional or alternative components.

The I/O interface 308 includes an interface for communicating information with other components of the monitoring system 100, such as with the image capture system 180, a server 312 located remote from the mining shovel 102 (such as at the control center of the open pit mine 110 for example) and/or an operator's computer system 314 located within the operator station 121 for example. Although only a single image capture system 180, a single server 312 and a single computer system 314 are shown in FIG. 10, the I/O interface 308 may allow the processor 302 to communicate with more than one image capture system 180, more than one server 312 or more than one computer system 314. In some examples, the processor 302 may communicate with the server 312 via a wireless network 310 and communicate with the image capture system 180 and the computer system 314 over a wired network. In other examples, the processor 302 may also communicate with one or more of the image capture system 180 and the computer system 314 over the wireless network 310. The I/O interface 308 may include any communication interface which enables the processor 302 to communicate with the external components described above, including specialized or standard I/O interface technologies such as channel, port-mapped, asynchronous for example.

The storage memory 306 stores information received or generated by the processor 302, such as the sequential images or the video from the image capture system 180 for example, and may generally function as an information or data store. The program memory 304 stores various blocks of code, including codes for directing the processor 302 to execute various functions, such as depth processing 350, feature extraction 400, keypoint identification 450, activity classification 500, status analysis 600 and metric aggregation 900 functions described below for example. The program memory 304 may also store database management system codes for managing data stores in the storage memory 306. In other examples, the program memory 304 may store additional or alternative blocks of code for directing the processor 302 to execute additional or alternative functions. The program and storage memories 304 and 306 may each be implemented as one or a combination of a random-access memory, a hard disk drive, flash memory, or phase-change memory, or any other computer-readable and/or -writable memory for example.

The processor 302 is configured to perform the functions stored in the program memory 304, and to receive and transmit information, including data and commands, with the image capture system 180, the server 312 and the computer system 314 via the I/O interface 308. In the example shown, the processor 302 may be optimized to perform image processing functions and may include a dedicated graphics processing unit (GPU) for accelerating image processing functions. In other examples, the processor circuit 300 may be partly or fully implemented using different hardware logic, which may include discrete logic circuits and/or an application specific integrated circuit, for example. In some examples, the processor 302 may be located within the frame 120 of the mining shovel 102, but the program or storage memories 304 and 306 may be remote from the mining shovel 102. In such examples, the processor 302 may communicate with the program and storage memories 304 and 306 via the wireless network 310, forming a cloud-based processor circuit.

In operation, the processor circuit 300 is generally configured to receive the image or video of the field-of-view 184 of the image capture system 180 and process the image or video to both (a) determine a current operating stage of the mining shovel 102 and (b) generate information regarding a status of the various components of the operating implement 126, the load 156 and the mine face 114. The processor 302 may begin these processing functions by receiving the images or video of the field-of-view 184 from the image capture system 180 at the I/O interface 308. The processor 302 may store the received images or video in the storage memory 306 before proceeding to subsequent functions described below.

Depth Processing

In some examples, the processor circuit 300 may receive depth values associated with images or frames captured by the image capture system 180 from an external source, such as directly from the edge processor of the stereoscopic camera 190. In such examples, the processor circuit 300 may not initiate any depth processing codes 350 or may only initiate a portion of the depth processing codes 350. However, in some situations, the processor circuit 300 may not receive any depth values from the edge processor or may receive depth values which are inaccurate. This may occur when one or both of the first and second imagers 192 and 194 are partially or fully obscured by dust or debris during operating cycles, have malfunctions due to extreme weather conditions, or dust and debris in the open pit mine 110 render the depth calculation by the edge processor inaccurate. In such examples, the processor circuit 300 may initiate its own depth processing codes 350 to estimate depth values for each pixel of each image or each frame received from the image capture system 180. The depth value is used in combination with the red, green and blue values of that pixel (combined "RBGD" values, [red, blue, green, depth] for example) in subsequent functions described below.

Figure 11:
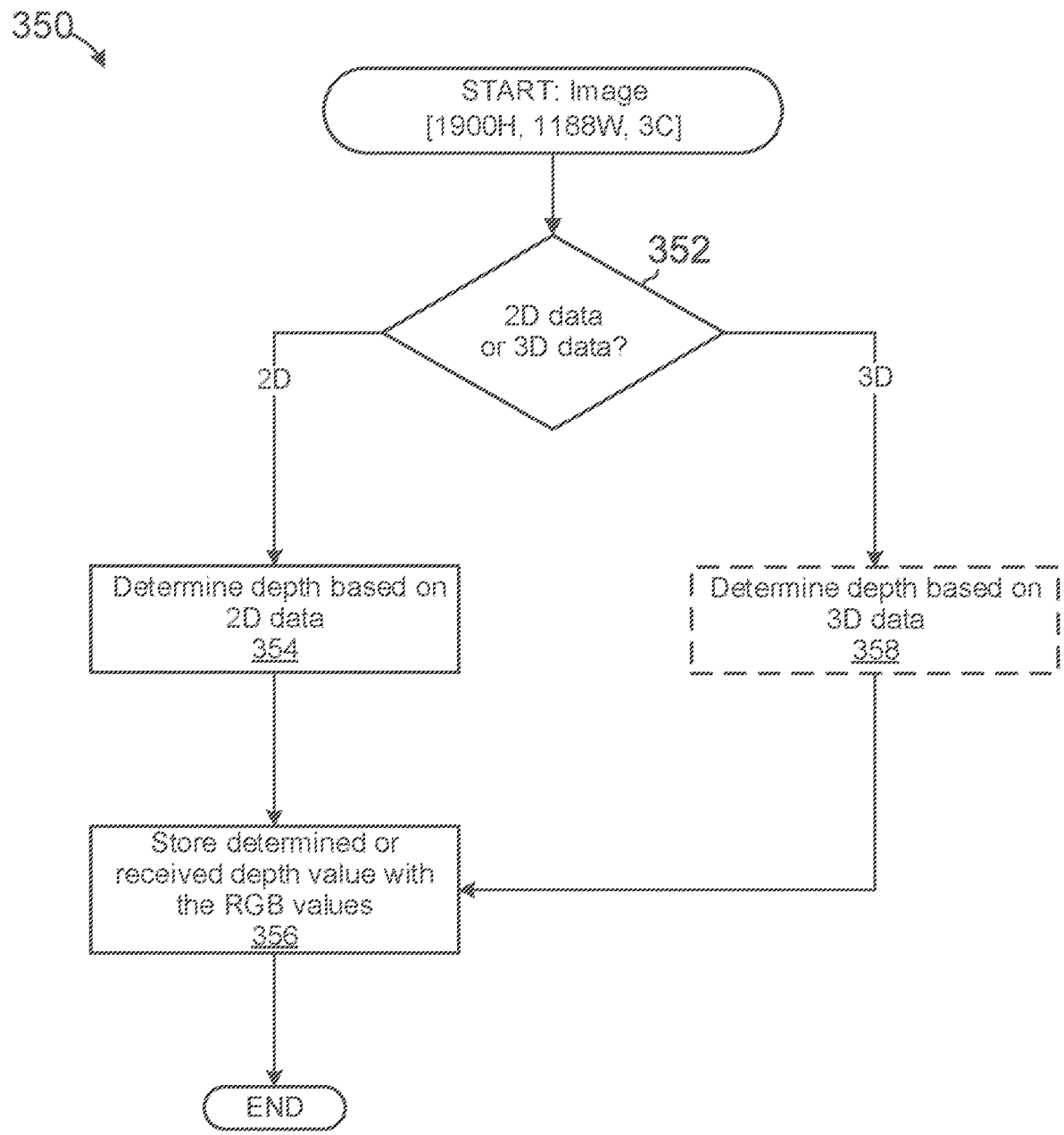
FIG. 11 is a process flowchart showing blocks of code for directing the processor circuit of FIG. 10 to perform depth estimation in accordance with one example.

In the example shown in FIG. 11, the depth processing codes 350 begin at block 352 which may include codes directing the processor 302 to determine whether the images of the received sequential images or the frames of the received video from the image capture system 180 includes 2D or 3D images or frames. For example, block 350 may direct the processor 302 to determine whether any depth values have been received from the image capture system 180. Alternatively or additionally, the processor 302 may determine whether one or more of a first image or frame captured by the first imager 192 or a second image or frame captured by the second imager 194 for particular point in time is missing from the received sequential images or the received video. If one of the first image or frame or the second image or frame is missing, the processor 302 may determine that the data received for that particular point in time is 2D data. Alternatively or additionally, the processor 302 may determine whether the image capture system 180 is a 2D camera or a stereoscopic camera.

If at block 352, the processor 302 determines that an initial image or frame is 2D data, the depth processing codes 350 may then continue to block 354, which includes codes directing the processor 302 to generate depth values for that initial image or frame. For example, block 352 may direct the processor 302 to retrieve at least one sequential image or frame before and/or after the initial image or frame and identify at least one common feature in each image or frame. The at least one sequential image or frame may include 20 sequential images or frames captured at $t_1, t_2, t_3 [ \ldots ] t_{20}$; in other embodiments, the at least one sequential image or frame may include anywhere between 2 and 200 sequential images or frames captured at between 2 and 200 sequential points in time. Features of an image or a frame may be identified and described using a variety of different descriptors known to one or ordinary skill in the art, including using corner points of the images or frames, a scale-invariant feature transform (SIFT) detector based on reference images of the operating implement 126, the load 156, or the mine face 114, or a speed up robust features (SURF) detector for example. The processor 302 may then track movement of the at least one common feature across the sequential images or frames to determine the depth of the pixels associated with the at least one common feature, based on estimating focal length relative to the image capture system 180 and radial distortion parameters for example.

Alternatively or additionally, block 354 may also direct the processor 302 to input the RBG values of at least one of the first image or frame captured by the first imager 192, the second image or frame captured by the second imager 194 and/or a third image or frame captured by the third imager 193 into a depth estimator model 355. The depth estimator model 355 may be trained with RBG values of two or more of: (a) first images or frames captured by the first imager 192, (b) second images or frames captured by the second imager 194 and (c) third images or frames captured by the third imager 196, and corresponding camera parameters such as the first fixed distance 195 between the first and second imagers 192 and 194, the second fixed distance 197 between the first and third imagers 192 and 196 and the third fixed distance 198 between the second and third imagers 194 and 196 for example. The above RBG values and camera parameters are inputted into a neural network of the depth estimator model 355 to iteratively generate and optimize coefficients which enable the neural network to estimate depth values based on an input of RBG values of one of: (a) the first image or frame captured by the first imager 192, (b) the second image or frame captured by the second imager 194 and (c) the third imager frame captured by the third imager 196. The depth estimator model 355 may be trained on the server 312 and the trained depth estimator model 355 may be locally stored in the storage memory 306.

The depth processing codes 350 then continue to block 356, which may include codes for directing the processor 302 to store the determined depth value in association with the red, green and blue values (the "RBG" values, [red, blue, green] for example) of each pixel for a particular image or frame. For example, block 356 may direct the processor 302 to stack, or fuse or concatenate the depth value to the RBG values to generate "RBGD" values. The depth processing codes 350 then end.

If at block 352, the processor 302 determines that the image or frame of the field-of-view 184 includes 3D data, the depth processing codes 350 may then continue to optional block 358, which may include codes directing the processor 302 to generate depth values based on the 3D data. For example, block 358 may direct the processor 302 to identify at least one common feature in each of the first image or frame captured by the first imager 192, the second image or frame captured by the second imager 194 or the third image or frame captured by the third imager 196 at a same point in time. Similar to block 354, features of an image or a frame may be identified and described using a variety of different descriptors known to one or ordinary skill in the art, including the SIFT detector or the SURF detector for example. The processor 302 may then calculate relative displacement between at least one common feature in the first image versus the second image to determine the depth of the pixel associated with the at least one common feature, based on the calculated relative displacement and the fixed distance 195 between the first and second imagers 192 and 194 for example. Additionally or alternatively, block 358 may direct the processor 302 to input the RBG values of both of the first image or frame and the second image or into the depth estimator model 355. The depth processing codes 350 may then continue to block 356 to store the depth value as described above.

In certain examples, the depth processing codes 350 may end directly after the processor 302 determines at block 352 that the image or frame includes 3D data, such as in embodiments where the depth value is provided by the edge processor of the stereoscopic camera 190 for example.

Feature Extraction Codes

Figure 12A:
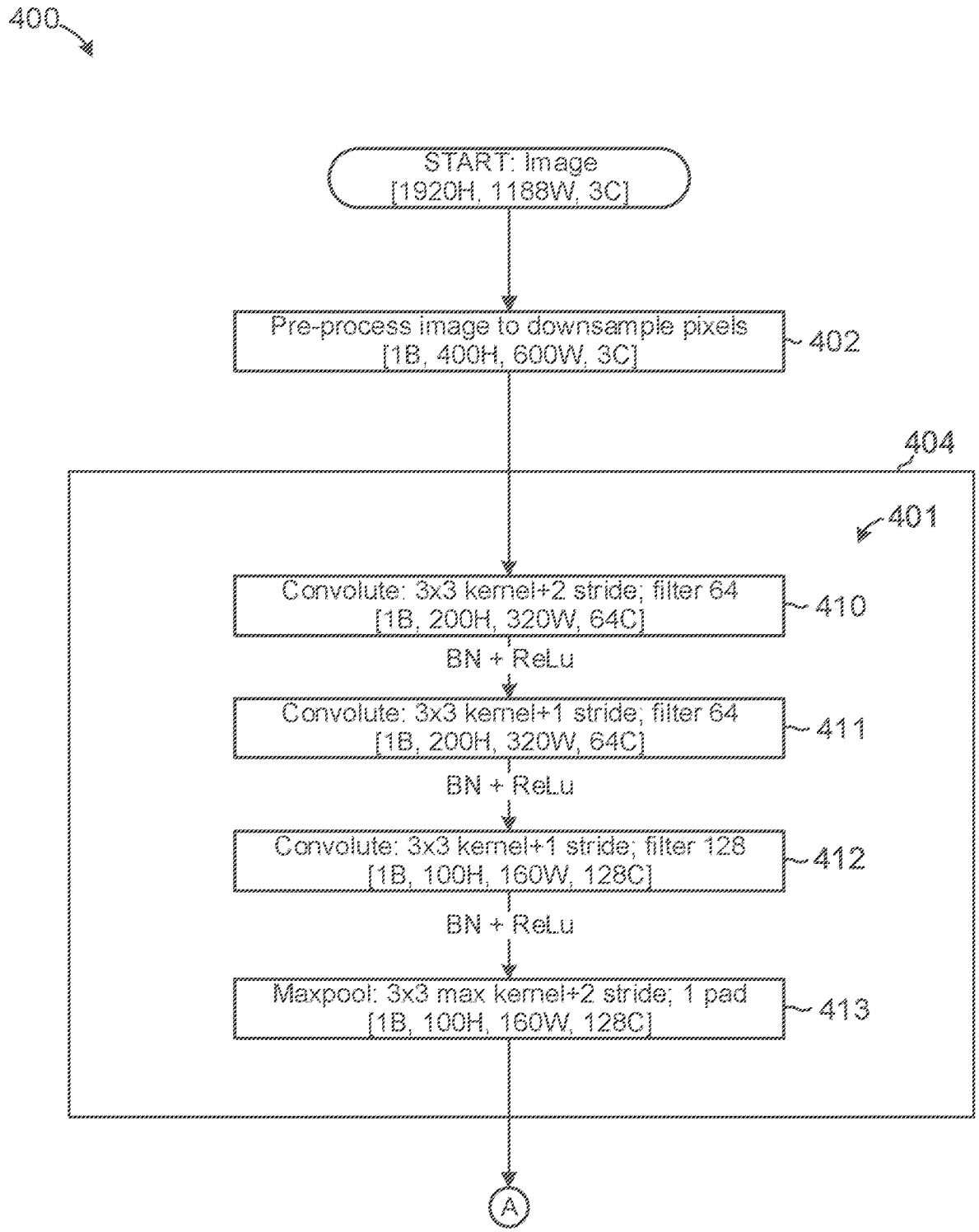
FIGS. 12A and 12B are process flowcharts showing blocks of code for directing the processor circuit of FIG. 10 to perform feature extraction in accordance with one example.
Figure 12B:
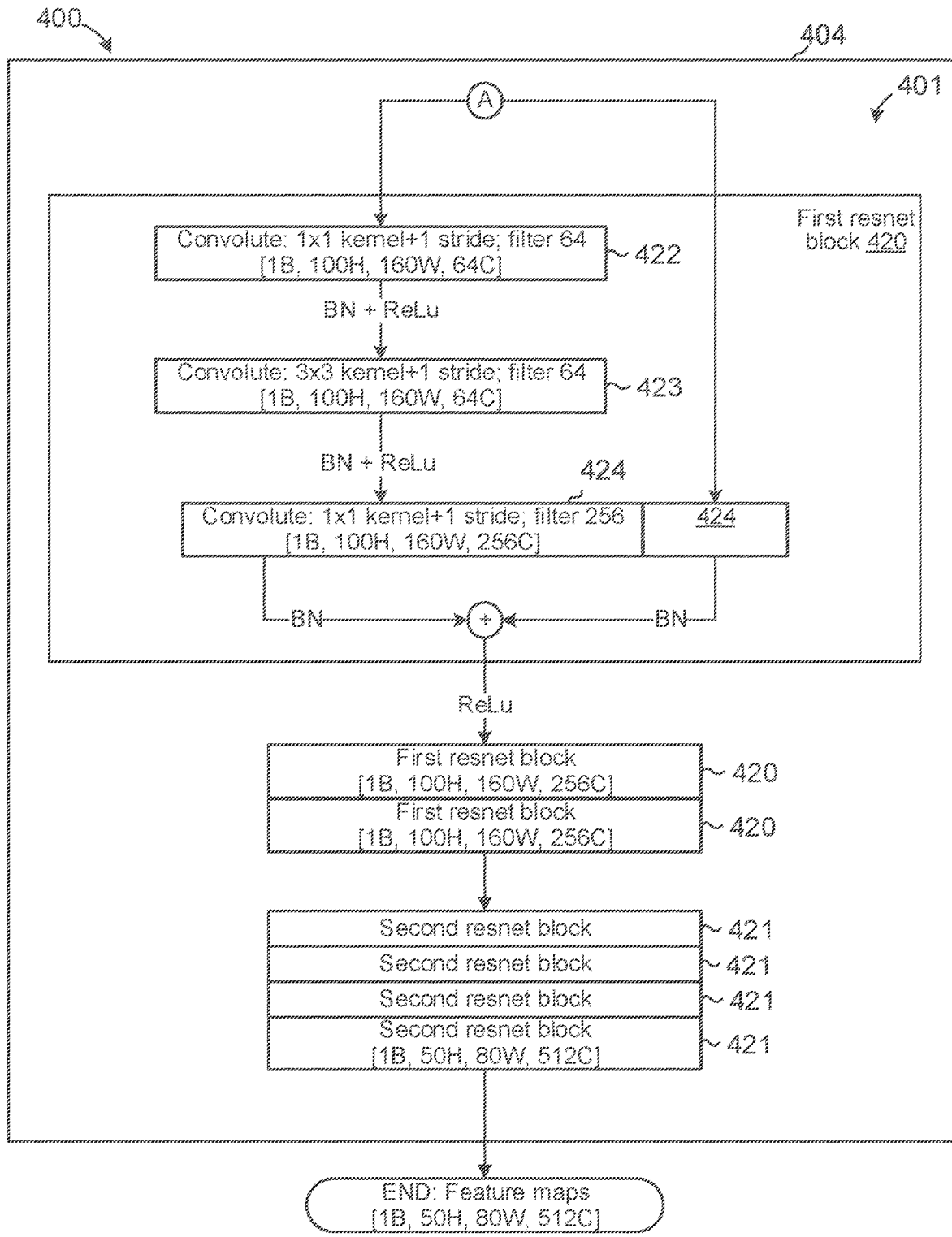

Upon receiving the sequential images or video captured by the image capture system 180, processor circuit 300 may initiate feature extraction codes stored in the program memory 304, an example of which is shown generally at 400 in FIGS. 12A and 12B. The feature extraction codes 400 generally include codes for transforming each image of the received sequential images or each frame of the received video into one or more feature maps operable to be used for subsequent keypoint identification, activity classification, feature segmentation and status analysis functions described below. The feature extraction codes 400 thus form a backbone encoder for subsequent functions of the processor circuit 300.

In the example shown in FIGS. 12A and 12B, the feature extraction codes 400 may begin at block 402, which includes codes directing the processor 302 to pre-process the image or frame. For example, block 402 may direct the processor 302 to downsample the received image or frame to a smaller resolution height and a smaller resolution width, such as by using box downsampling or bilinear downsampling for example. In the embodiment shown, the image of frame is downsampled to a resolution height of 400 pixels and a resolution width of 640 pixels; however, in other examples, the downsampled resolution height and width may be different.

The feature extraction codes 400 may then continue to block 404, which may include codes directing the processor 302 to process the RBG values of each pixel of the pre-processed image or frame using a feature extractor model 401 configured to output one or more feature maps representing that image or frame. Each feature map may represent and report on a different feature or patterns in the image or frame, such as straight lines, curved lines, horizontal lines, vertical lines, shadow, light and may emphasize different components of image or frame, such as the teeth 150, the shrouds 152, and the lip 160, the load 156 and the mine face 114 (or earthen materials pile) for example. Generally, the feature maps generated by feature extractor model 401 depend on convolutional layers described below, and are not initially specified. The feature extractor model 401 may originally derive from and be adapted from an existing feature extraction model, such as such as U-Net, DenseNet, Segnet, Autoencoder, ResNet for example.

Referring to FIGS. 12A, in the example shown, the feature extractor model 401 is based on the ResNet architecture and includes a first convolutional layer 410 which operates directly on the RBG values of each pixel of the image or frame. The first convolutional layer 410 may have kernel size of 3×3, stride of 2, filter size of 64 and may be followed by batch normalization (BN) and rectified linear activation function (ReLu) operations to generate a tensor shape of [1B, 200H, 320W, 64C]. The BN operation generally functions to normalize the output tensor of the first convolutional layer 410 before it is used as input for subsequent layers. The ReLu operation generates an activation function for the output tensor of the first convolutional layer 410 and can reduce premature convergence of the feature extractor model 401. The output tensor of the first convolutional layer 410 is inputted into a second convolutional layer 411 which may have kernel size of 3×3, stride of 1, filter size of 64, and may be followed by corresponding BN and ReLu operations to generate a tensor shape of [1B, 200H, 320W, 64C]. The output tensor of the second convolutional layer 411 is inputted into a third convolutional layer 412 which may have kernel size of 3×3, stride of 1, filter size of 128 and may be followed by corresponding BN and ReLu operations to generate a tensor shape of [1B, 200H, 320W, 128C]. A maxpooling layer 413 operates on the output tensor of the third convolutional layer 412 and may have pool kernel size of 3×3, stride of 1 and pad of 1 and provides a flattened tensor to input into subsequent resnet blocks.

Referring to FIG. 12B, the feature extractor model 401 further includes a first resnet block 420 and a second resnet block 421. The first resnet block 420 may include fourth, fifth and sixth 2D convolutional layers 422, 423 and 424. The fourth convolutional layer 422 initially operates on the output tensor of the maxpooling layer 413 and may have kernel size of 1×1, stride of 1, filter size of 64 and may be followed by corresponding BN and ReLU operations to generate a tensor of [1B, 100H, 160W, 64C]. The output tensor of the fourth convolutional layer 422 is inputted into the fifth convolutional layer 423 which may have kernel size of 3×3, stride of 1, filter size of 64 and may be followed by corresponding BN and ReLU operations to generate a tensor of [1B, 100H, 160W and 64C]. The sixth convolutional layer 424 operates on both the output tensor of the maxpooling layer 413 and the output tensor of the fifth convolutional layer 423, may have kernel size of 1×1, stride of 1, and filter size of 256 and may be followed by a corresponding BN operation to generate a tensor of [1B, 100H, 160W, 256C]. The output tensor of the sixth convolutional layer 424 based on the maxpooling layer 413 may be summed with the output tensor of the sixth convolutional layer 424 based on the fifth convolutional layer 423 and may be followed by a ReLu operation. The summed output tensor of the sixth convolutional layer 424 may be provided back to the fourth convolutional layer 422 and the sixth convolutional layer 424 to repeat the first resnet block 420. In the example shown, the first resnet block 420 is repeated two more times; however, in other examples, the first resnet block 420 may be repeated fewer or a greater number of times based on a depth required for the feature extractor model 401. The second resnet block 421 operates on the output tensor of the final iteration of the first resnet block 420 and may have a layer architecture substantially similar to the first resnet block 420 except that one of the corresponding fourth and fifth convolutional layers 422 and 423 of the second resnet block 421 may have filter size of 128 and stride of 2 to generate tensors of [1B, 50H, 80W, 128C]; while the corresponding sixth convolutional layer 424 of the second resnet block 421 may have filter size of 512 to generate a tensor of [1B, 50H, 80W, 512C]. In the example shown, the second resnet block 421 is repeated four times; however, in other examples, the second resnet block 421 may be repeated fewer or a greater number of times based on the depth required. The output tensor of the final iteration of the second resnet block 421 may be used for subsequent keypoint identification, activity classification, feature segmentation and status analysis functions described below.

Keypoint Identification Codes

Figure 13A:
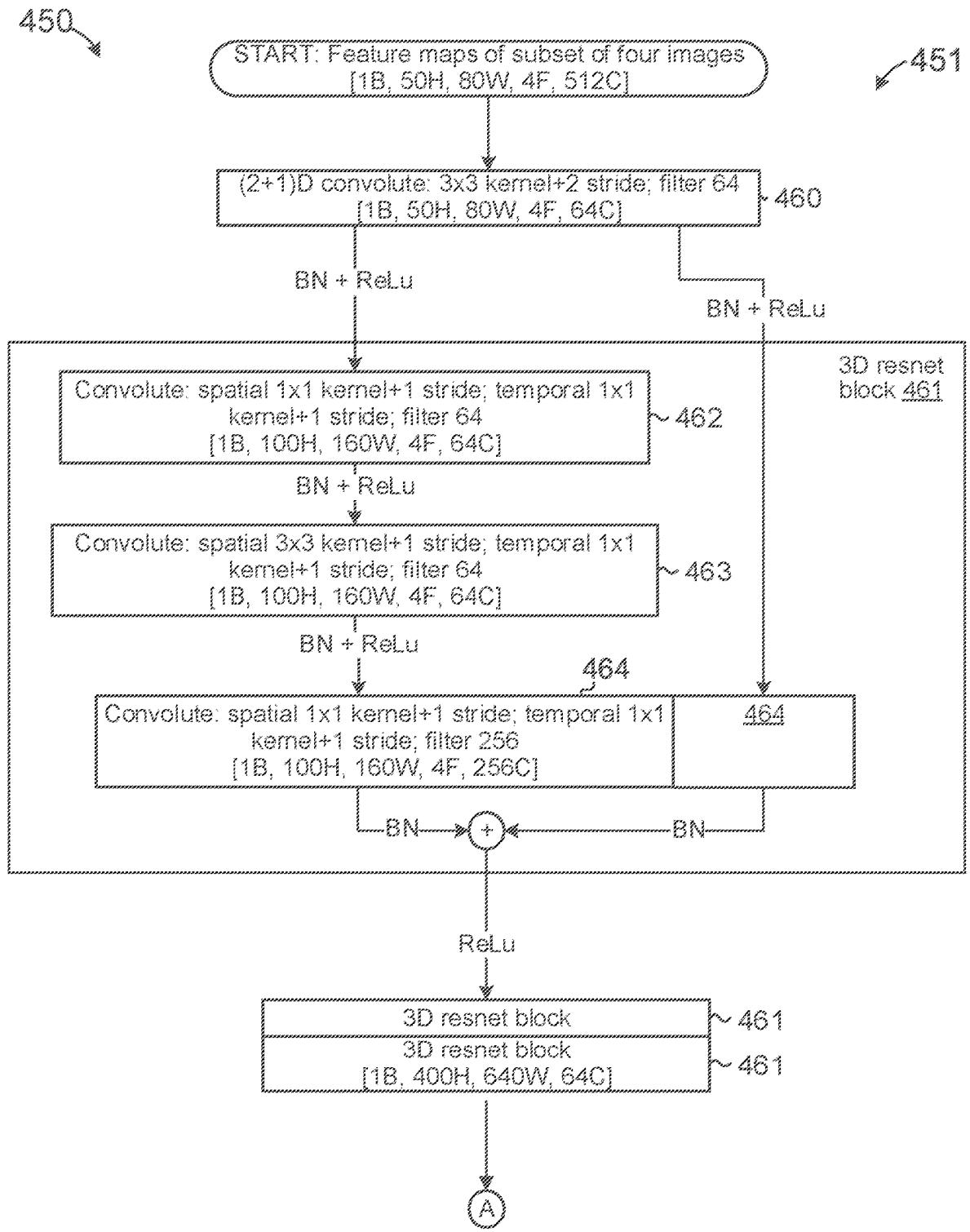
FIGS. 13A and 13B are process flowcharts showing blocks of code for directing the processor circuit of FIG. 10 to perform keypoint identification in accordance with one example.
Figure 13B:
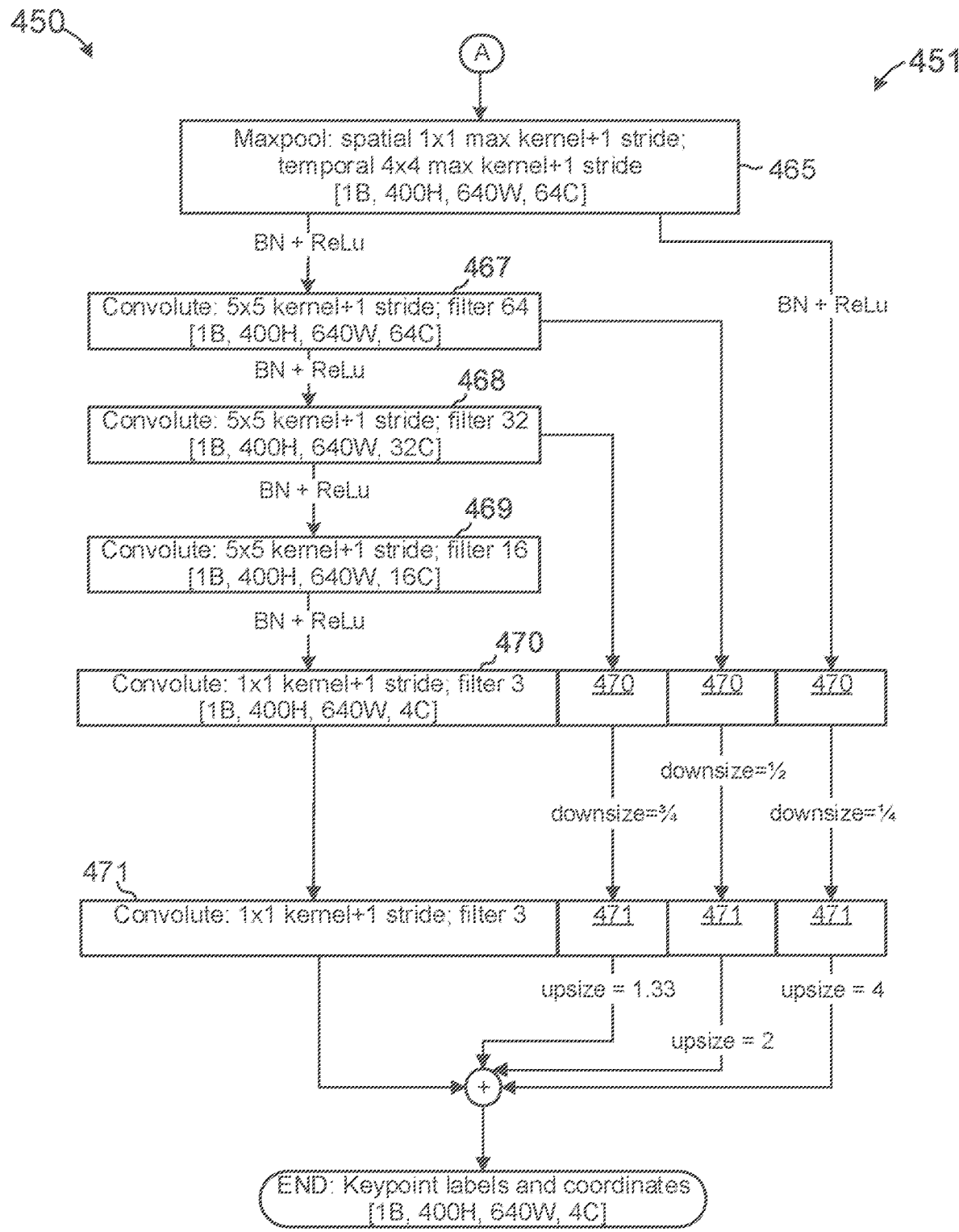

After the feature extraction codes 400 generate the feature maps for the images of the received sequential images or the frames of the received video, the processor circuit 300 may initiate keypoint identification codes stored in the program memory 304, an example of which is shown generally at 450 in FIG. 13A and FIG. 13B. The keypoint identification codes 450 include codes for identifying and classifying specific keypoints in images and frames to generate a keypoint skeleton operable to be used for subsequent activity classification and status analysis functions described below.

In the example shown in FIGS. 13A and 13B, the keypoint identification codes 450 may direct the processor 302 to retrieve a subset of images or frames captured over a period of time by the image capture system 180. For example, the keypoint identification codes 450 may direct the processor 302 to sample four sequential images or frames captured at four sequential points in time $t_1$, $t_2$, $t_3$ and $t_4$. Alternatively, the keypoint identification codes 450 may direct the processor 302 to sample between 2 and 200 sequential images or frames correspondingly captured at between 2 and 200 sequential points in time. The keypoint identification codes 450 may then direct the processor 302 input the feature maps (generated by the feature extraction codes 400) corresponding to this subset of images or frames into a keypoint identifier model 451 configured to output keypoint coordinates and keypoint labels for different keypoints in the subset of images or frames. As used herein, "keypoints" are computer-generated labels for at least one pixel of the image or frame which function to label components of a feature of the image or frame. The keypoint labels outputted by the keypoint identifier model 451 generally include keypoints associated with the operating implement 126, including, without limitation, "tooth top", "tooth bottom", "shroud left", "shroud right" and "shroud top". In some examples, the keypoint labels may also include "shroud bottom". The keypoint coordinates outputted by the keypoint identifier model 451 may include the x and y coordinates of at least one pixel corresponding to the identified keypoint in each image or frame.

Figure 14:
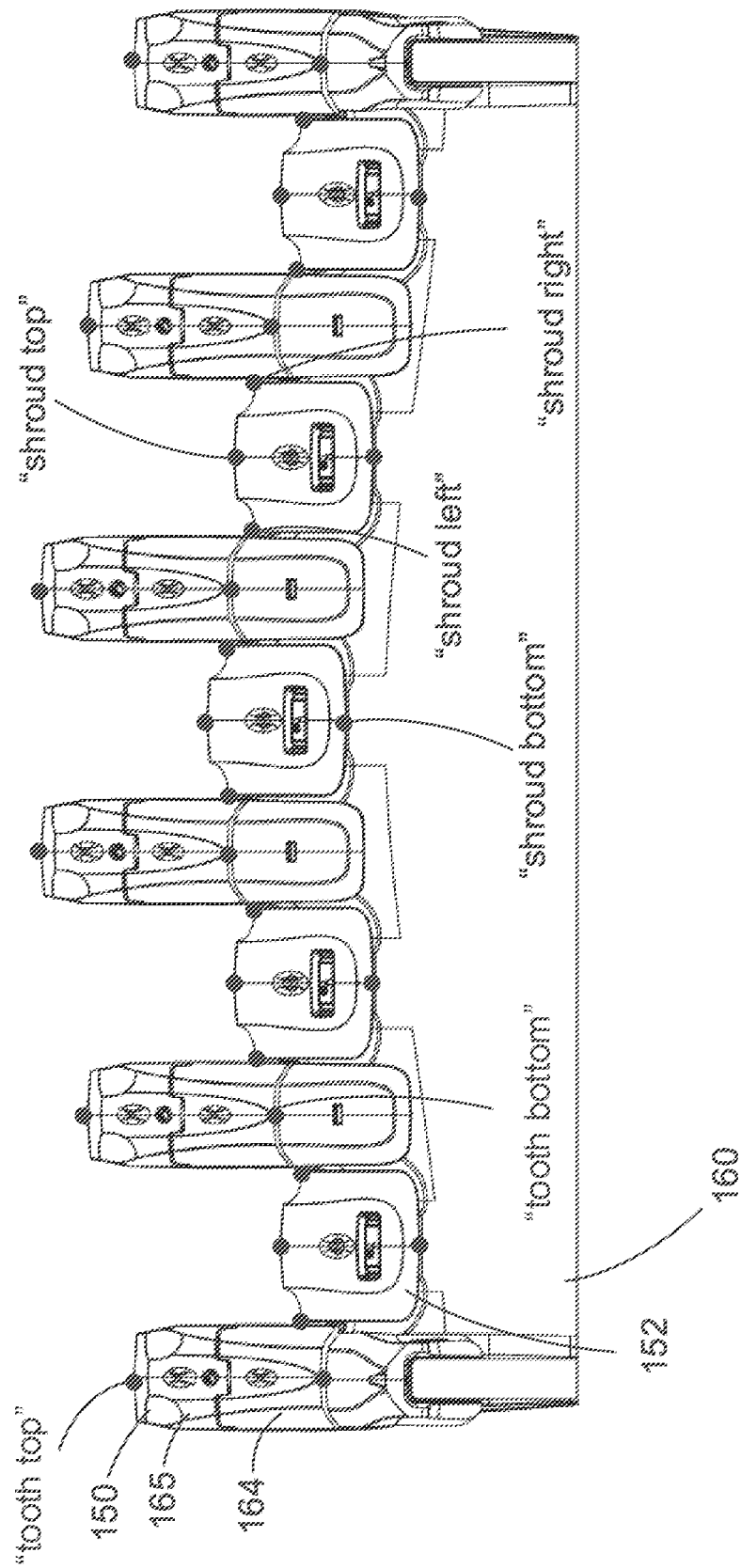
FIG. 14 is a schematic representation of keypoints identified by the keypoint identification code of FIGS. 13A and 13B in accordance with one example.

Referring to FIG. 14, the keypoint label "tooth top" may represent a center of a leading edge of the tip 165 of each tooth of the teeth 150 of the operating implement 126, while the keypoint label "tooth bottom" may represent a center of a trailing edge of the intermediate adapter 164 of each tooth. In some examples, the keypoint labels "tooth top" and "tooth bottom" may be divided into unique keypoint labels associated with individual tooth of the teeth 150. In such examples, the keypoint labels may include "tooth top 1", "tooth top 2", "tooth top 3" up to "tooth top n", and "tooth bottom 1", "tooth bottom 2", "tooth bottom 3" up to "tooth bottom n", where n is the number of teeth making up the plurality of teeth 150.

The keypoint label "shroud left" may represent a left side of a leading edge of a shroud of the shrouds 152, while the keypoint label "shroud right" may represent a right side of the leading edge of the shroud. The keypoint label "shroud top" may represent a center of the leading edge of the shroud, and in examples including the keypoint label "shroud bottom", this keypoint label may represent a center of a trailing edge of the shroud. In some examples, the keypoint labels "shroud left", "shroud right", "shroud top" and optionally "shroud bottom" may be divided into unique keypoint labels associated with individual shrouds of the shrouds 152. In such examples, the keypoint labels may include "shroud left 1", "shroud left 2", "shroud left 3" up to "shroud left m"; "shroud right 1", "shroud right 2", "shroud right 3" up to "shroud right m"; "shroud top 1", "shroud top 2", "shroud top 3" up to "shroud top m" and "shroud bottom 1", "shroud bottom 2", "shroud bottom 3" up to "shroud bottom m", where m is the number of shrouds making up the plurality of shrouds 152.

The keypoint identifier model 451 may be trained with the RBG values of each pixel of training images or frames, where the training images or frames are further keypoint ground annotated with at least the keypoint labels "tooth top", "tooth bottom", "shroud left", "shroud right", "shroud top" (and optionally "shroud bottom), x and y coordinates of the keypoints, and optionally the visibility of the keypoint (such as with [keypoint label, x, y, z, visibility] for example). The above RBG values and keypoint ground annotations are inputted into the feature extraction codes 400 to generate one or more feature maps (output tensor of [1B, 50H, 80W, 512C]). The feature maps are inputted into a neural network of the keypoint identifier model 451 to iteratively generate and optimize coefficients which enable the neural network to identify keypoint labels and generate corresponding keypoint coordinates for different subsets of images or frames based on an input including the feature maps of the subset of images or frames (and based on an initial input of the RBG values of pixels of the subset of images or frames). The keypoint identifier model 451 may also be trained to generate the keypoint labels and keypoint coordinates based on alternative or additional inputs, such as the depth value of each pixel (such as the depth value generated by the depth estimation codes 350 for example) or displacement of common features across the subset of images or frames (similar to block 354 of the depth processing codes 350 for example); in such examples, the training images or frames may also be labelled with the depth values or displacement values. In some examples, the keypoint identifier model 451 may originally derive from and be adapted from an existing keypoint identifier model such as KeypointNet, Keypoint RCNN, or PoseNet described in Bin XIAO et al., *Simple Baselines for Human Pose Estimation and Tracking*, arXiv: 1804.06208 [cs.CV] (2018), incorporated by reference herein. The keypoint identifier model 451 may be trained on the server 312 and the trained keypoint identifier model 451 locally stored in the storage memory 306.

Referring back to FIGS. 13A and 13B, in the example shown, the keypoint identifier model 451 includes a first (2+1)D convolutional layer 460 which operates directly on the feature maps of the subset of four images or frames generated by the feature extraction codes 400. The first convolutional layer 460 may perform an initial spatial 2D convolution on each of the four images with a spatial kernel size of 1×1, stride of 1, filter size of 64, and may then perform a temporal 1D convolution on the combination of the four images with a temporal kernel size of 1×1, stride of 1, filter size of 64, but other configurations are possible. The (2+1)D convolution may then be followed by corresponding BN and ReLu operations as described above to generate a tensor of [1B, 50H, 80W, 4F, 64C].

The output tensor of the first convolutional layer 460 may be inputted into a 3D resnet block 461. In the example shown, the 3D resnet block 461 may include second, third and fourth 3D convolutional layers 462, 463 and 464. The second convolutional layer 462 initially operates on the output tensor of the first convolutional layer 460 and may have spatial kernel size of 1×1 and stride of 1, temporal kernel size of 1×1 and stride of 1, and filter size of 64 and may be followed by corresponding BN and ReLU operations to generate a tensor of [1B, 100H, 160W, 4F, 64C]. The third convolutional layer 463 operates on the output tensor of the second convolutional layer 462 and may have spatial kernel size of 3×3 and stride of 1, temporal kernel size of 1×1 and stride of 1, and filter size of 64 and may be followed by corresponding BN and ReLU operations to generate a tensor of [1B, 100H, 160W, 4F and 64C]. The fourth convolutional layer 464 operates on both the output tensor of the first convolutional layer 460 and the output tensor of the third convolutional layer 463, and may have spatial kernel size of 1×1 and stride of 1, temporal kernel size of 1×1 and stride 1, and filter size of 256 and may be followed by a corresponding BN operation to generate a tensor of [1B, 100H, 160W, 4F, 256C]. The output tensor of the fourth convolutional layer 464 based on the third convolutional layer 463 is summed with the output tensor of the fourth convolutional layer 464 based on the first convolutional layer 460 and is followed by a ReLu operation. The summed output tensor of the fourth convolutional layers 464 may be provided back to the second convolutional layer 462 and the fourth convolutional layer 464 to repeat the 3D resnet block 461. In the example shown, the 3D resnet block 461 is repeated two more times; however, in other examples, the 3D resnet block 461 may be repeated fewer or a greater number of times based on a depth required for the keypoint identifier model 451. The final iteration of the 3D resnet block 461 may generate an output tensor of [1B, 400H, 640W, 64C].

Referring now to FIG. 13B, the output tensor of the final iteration of the 3D resnet block 461 may be inputted into a maxpooling layer 465 to combine the four images or frames and reduce the dimensionality of the tensor shape from four dimensions (4D) ([B, H, W, F, C]) to 3D ([B, H, W, C], dropping the F frame parameter). The maxpooling layer 465 may have pool kernel size of 1×1, stride of 1 and pool of 4 and may be followed by corresponding BN and ReLU operations to generate a tensor of [1B, 400H, 640W, 64C].

The flattened output tensor of the maxpooling layer 465 is then provided to both a fifth convolutional layer 467 and an eighth convolutional layer 470. The fifth convolutional layer 467 may have kernel size of 5×5, stride of 1, filter size of 64 and may be followed by corresponding BN and ReLU operations to generate an output tensor of [1B, 400H, 640W, 64C]. The eighth convolutional layer 470 may have kernel size of 1×1, stride of 1, and filter size of 3 to generate a tensor of [1B, 400H, 640W, 4C]. The output tensor of the eighth convolutional layer 470 based on the maxpooling layer 465 may then be downsized by a ¼ resizing operation to generate a first ¼ channel. The resizing operation is similar to the BN operation and generally enables the keypoint identifier model 451 to better calculate distance between data (such as between pixels identified as keypoints versus those which are not; pixels classified with a particular keypoint label versus another keypoint label for example). In the example shown, the resizing operation is a bilinear resizing operation; however, in other examples, it may also be other resizing operations known to one of ordinary skill in the art.

The output tensor of the fifth convolutional layer 467 is provided to both a sixth convolutional layer 468 and the eighth convolutional layer 470. The sixth convolutional layer 468 may have kernel size of 5×5, stride of 1, filter size of 32 and may be followed by corresponding BN and ReLU operations to generate a tensor of [1B, 400H, 640W, 32C]. The output tensor of the eighth convolutional layer 470 based on the fifth convolutional layer 467 may then be downsized by a ½ resizing operation to generate a second ½ channel.

The output tensor of the sixth convolutional layer 468 is provided to both a seventh convolutional layer 469 and the eighth convolutional layer 470. The seventh convolutional layer 469 may have kernel size of 5×5, stride of 1, and filter size of 16, and may be followed by corresponding BN and ReLU operations to generate a tensor of [1B, 400H, 640W, 16C]. The output tensor of the eighth convolutional layer 470 based on the sixth convolutional layer 468 may then be downsized by a ¾ resizing operation to generate a third ¾ channel.

Finally, the output tensor the seventh convolutional layer 469 is provided to the eighth convolutional layer 470. The output tensor of the eighth convolutional layer 470 based on the seventh convolutional layer 469 may then be provided to a 1 resizing operation to generate a fourth 1 channel.

The first, second, third and fourth channels may then each be independently inputted into a ninth convolutional layer 471 which may have kernel size of 1×1, stride of 1 and filter size of 3 to generate an output tensor of [1B, 400H, 640W, 4C]. The respective output tensors of the ninth convolutional layer 471 based on the first, second and third channels may then be upsized based on the previous corresponding downsizing operations, and the upsized first, second and third channels may then be summed with the fourth channel to generate an output tensor of [1B, 400H, 640W, 4C] representing the keypoint labels and the keypoint coordinates for the subset of four images or frames. In the example shown, each of the four channels of the final tensor of the keypoint identifier model 451 may correspond to one of the keypoint labels "tooth top", "tooth bottom", "shroud left", and "shroud right". In examples including the keypoint labels "shroud bottom" and "shroud top", parameters of the various layers of the keypoint identifier model 451 may be modified to arrive at a final tensor having six or seven channels for example.

Activity Classification Codes

Figure 15A:
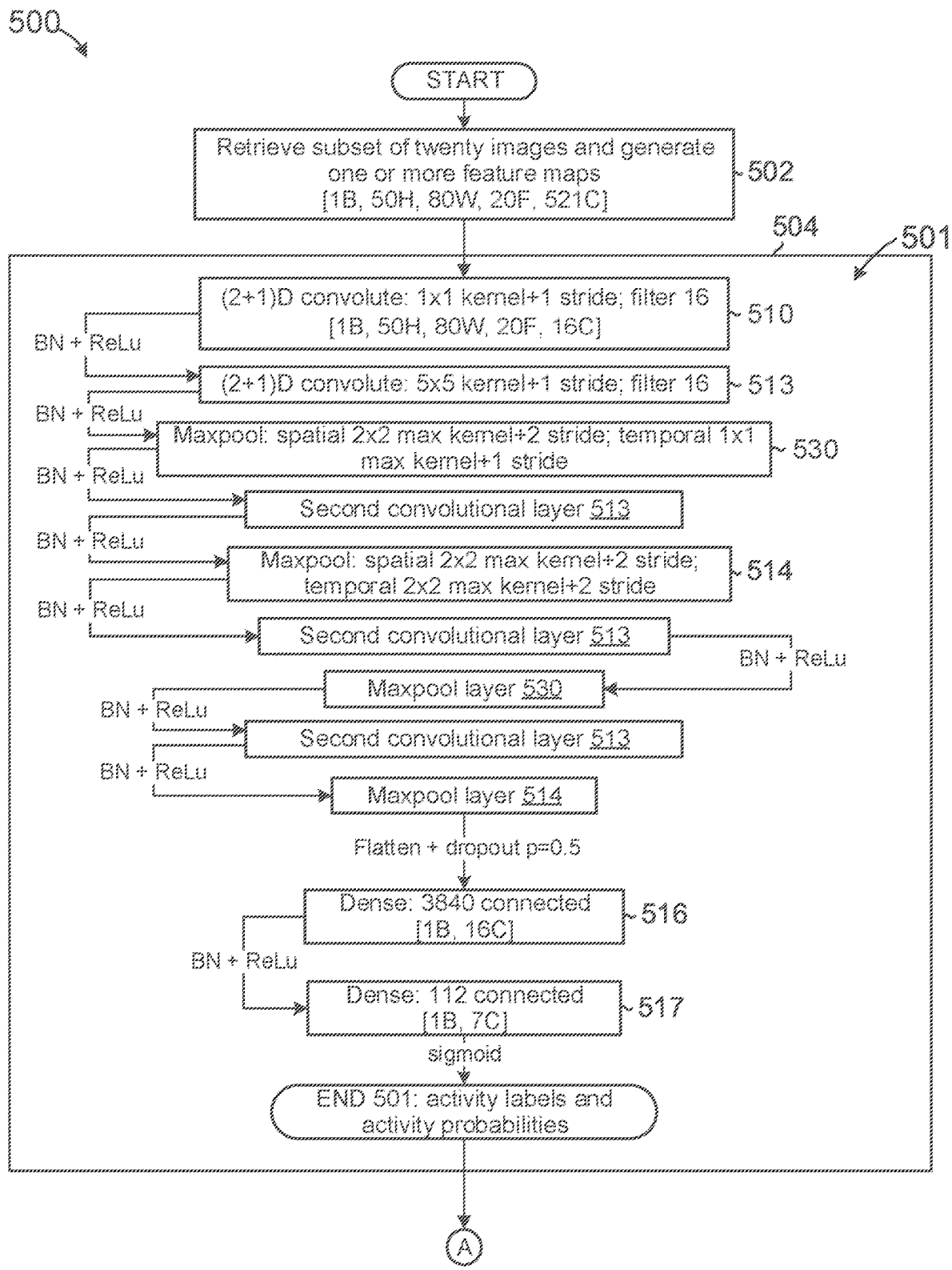
FIGS. 15A and 15B are process flowcharts showing blocks of code for directing the processor circuit of FIG. 10 to perform activity classification in accordance with one example.
Figure 15B:
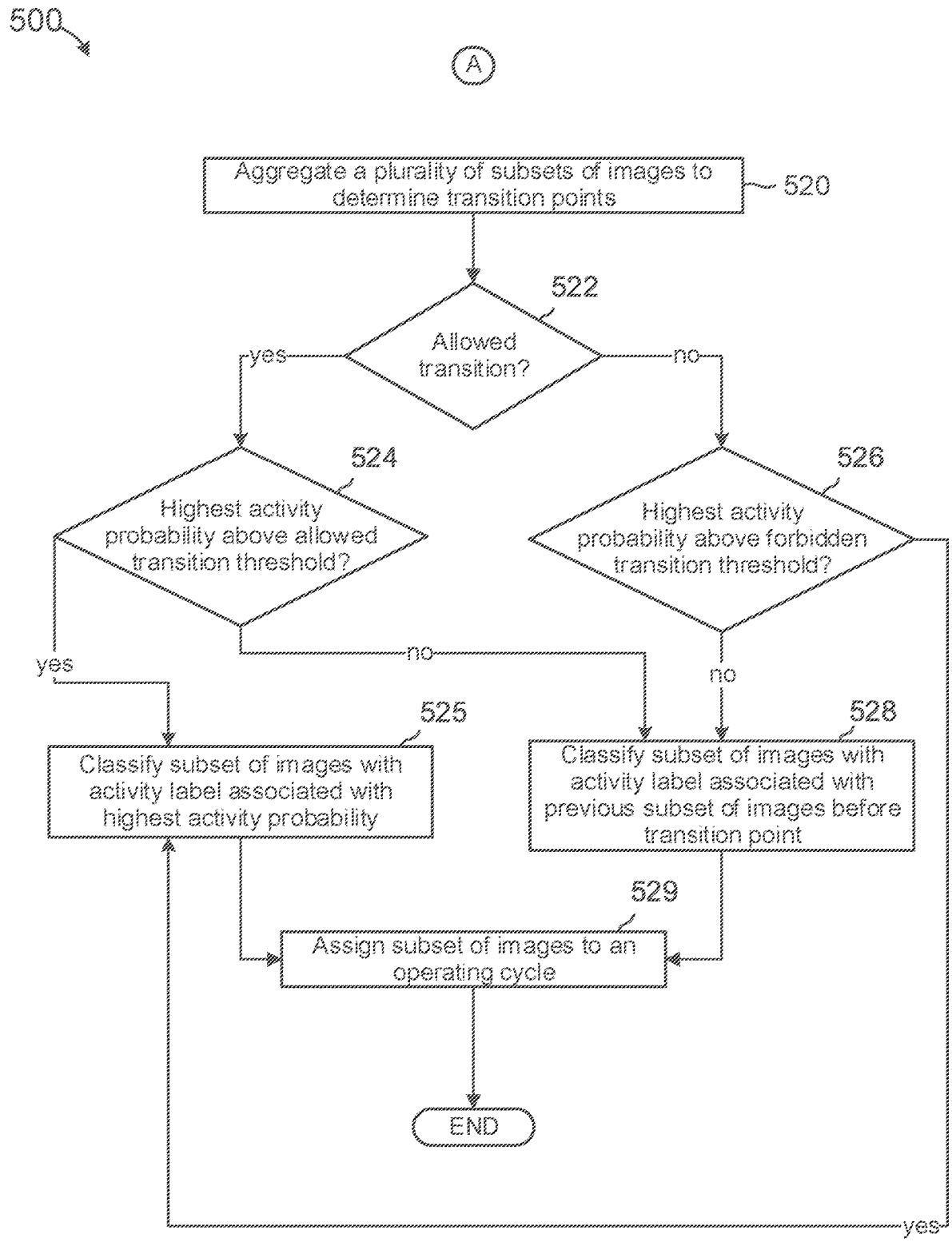

After the feature extraction codes 400 generate the feature maps for the images of the received sequential images or the frames of the received video (and in some examples, after the keypoint identification codes 450 generate the keypoint labels and keypoint coordinates for subsets of the images or frames), the processor 300 may initiate activity classification codes stored in the program memory 304, an example of which is shown generally at 500 in FIGS. 15A and 15B. The activity classification codes 500 include codes for determining which stage of the operating cycle of the mining shovel 102 should be associated with a particular subset of images or frames.

In the example shown in FIGS. 15A and 15B, activity classification codes 500 begin at block 502, which may include codes directing the processor 302 to retrieve a subset of images or frames captured over a period of time. For example, the activity classification codes 500 may direct the processor 302 to sample 20 sequential images or frames captured at twenty sequential points in time $t_1$, $t_2$, $t_3$ [ . . . ] $t_{20}$. Alternatively, the activity classification codes 500 may direct the processor 302 to sample anywhere between 2 and 200 sequential images or frames correspondingly captured at between 2 and 200 sequential points in time.

The activity classification codes 500 then continue to block 504, which may include codes directing the processor 302 to output activity labels representing different stages of the operating cycle to be associated with the subset of images or frames. For example, block 504 may direct processor 302 to input the feature maps (generated by the feature extraction codes 400) corresponding to the subset of images or frames into an activity classifier model 501 configured to output activity probabilities that the subset of images or frames corresponds to particular activity labels. In some examples, the activity classification codes 500 may also direct processor 302 to input the keypoint coordinates and the keypoint labels of the subset of images or frames (generated by the keypoint identification codes 450) into the activity classifier model 501. The activity labels outputted by the activity classifier model 501 may include, without limitation, "background", "excavate", "swing full", "dump truck", "dump no truck", "swing empty", and "idle" for example. In some examples, the activity labels may also include "maintenance".

The activity label "excavate" may be associated with images or frames corresponding to the field-of-view 184 of the image capture system 180 while the mining shovel 102 is in the excavate stage (shown in FIGS. 1, 2 and 3; an example of which is shown in FIG. 8A). In certain examples, the activity labels may also include "engage substage", "excavate substage" and "release substage" for example. The activity label "engage substage" may be associated with images or frames corresponding to the field-of-view 184 while the mining shovel 102 is in the engage substage (shown in FIG. 1). The activity label "excavate substage" may be associated with images or frames corresponding to the field-of-view 184 while the mining shovel 102 is in the excavate substage (shown in FIG. 2). The activity label "release substage" may be associated with images or frames corresponding to the field-of-view 184 while the mining shovel 102 is in the release substage (shown in FIG. 3).

The activity label "swing full" may be associated with frames or images corresponding to the field-of-view 184 while the mining shovel 102 is in the swing full stage (generally transition from FIG. 4 to FIG. 5; an example of which is shown in FIG. 8B), while the activity label "swing empty" may be associated with frames or images corresponding to the field-of-view 184 while the mining shovel 102 is in the swing empty stage (generally transition from FIG. 6 to FIG. 7; an example of which is shown in FIG. 8D).

The activity label "dump truck" may be associated with images or frames corresponding to the field-of-view 184 while the mining shovel 102 is in the dump stage where the desired dumping location is the truck bed 171 of the haul truck 170 (shown in FIG. 5; an example of which is shown in FIG. 8C), whereas the activity label "dump truck empty" may be associated with images or frames corresponding the field-of-view 184 while the mining shovel 102 is in the dump stage where the desired dump location is not the truck bed 171.

The activity label "idle" may be associated with images or frames corresponding to the field-of-view 184 while the mining shovel 102 is in the idle stage, where it is not performing any specific activities which form a specific stage of the operating cycle of the mining shovel 102 or where the mining shovel 102 is not moving. The activity label "maintenance" may be associated with images or frames corresponding to the field-of-view 184 while the mining shovel 102 is in a maintenance location. The activity label "background" may be associated with images or frames corresponding to the field-of-view 184 which cannot be categorized as any of the other above labels by the activity classifier model 501.

The activity probability outputted by the activity classifier model 501 may include a percentage for each of the activity labels, where the total percentage equals 1, such as [0, 0, 0.95, 0.02, 0.03, 0, 0] corresponding to the activity labels ["background", "excavate", "swing empty", "dump truck", "dump no truck", "idle", "swing full"] for example.

The activity classifier model 501 may be trained with the RBG values of each pixel of training images or frames, where the training images or frames are further ground annotated with at least the activity labels "background", "excavate", "swing full", "dump truck", "dump no truck", "swing empty", and "idle". In examples including the activity labels "engage substage", "excavate substage", "release substage", and "maintenance", the training images or frames may also be ground annotated with these activity labels as well. The above RBG values and activity ground annotations are then inputted into the feature extraction codes 400 to generate one or more feature maps (an output tensor [1B, 50H, 80W, 512C]). The feature maps are inputted into a neural network of the activity classifier model 501 to iteratively generate and optimize coefficients which enable the neural network to generate corresponding activity probabilities of the activity labels based on an input including the feature maps of the subset of images and frames (and based on an initial input of the RBG values of pixels of the subset of images or frames). As described above, in some examples, the keypoint coordinates and the keypoint labels of each image or frame (generated by the keypoint identification codes 450) may also be used by the activity classifier model 501 to generate the activity probabilities of the activity labels. In other examples, the activity classifier model 501 may also be trained to generate the activity probabilities of the activity labels based on alternative or additional inputs, such as the depth value of each pixel or displacement of common features across the subset of images or frames. In such examples, the training images or frames may also be labelled with the keypoint labels and the keypoint coordinates, the depth values and/or the displacement values. In some examples, the activity classifier model 501 may originally derive from and be adapted from an existing spatial temporal activity classification model, such as the system described in Du TRAN et al., *A Closer Look at Spatiotemporal Convolutions for Action Recognition*, arXiv:1711.11248v3 [cs.CV] (2018), incorporated by reference herein. The activity classifier model 501 may be trained on the server 312 and locally stored in the storage memory 306.

Still referring FIG. 15A, in the illustrated example, the activity classifier model 501 includes a first (2+1)D convolutional layer 510 which operates directly on the feature maps of the subset of 20 images or frame generated by the feature extraction codes 400 and may perform an initial spatial 2D convolution on each of the 20 images or frames with spatial kernel size of 1×1, stride of 1, and filter size of 16, and may then perform a temporal 1D convolution on the combination of the 20 images or frames, again with temporal kernel size of 1×1, stride of 1 and filter size of 16, but other configurations are possible. The (2+1)D convolution may be followed by corresponding BN and ReLu operations as described above to generate a tensor of [1B, 50H, 80W, 20F, 16C].

The output tensor of the first convolutional layer 510 is inputted into a second (2+1)D convolutional layer 513, which may also perform initial spatial 2D convolution with a spatial kernel size of 5×5, stride of 1 and filter size of 16, and then a temporal 1D with a temporal kernel size of 5×5, stride of 1 and filter size of 16, and may be followed by corresponding BN and ReLu operations. The output tensor of first iteration of the second convolutional layer 513 is provided to a first 3D maxpooling layer 530 which may have spatial pool kernel of 2×2 and stride of 2 and temporal pool kernel of 1×1 and stride of 1. The output tensor of the first maxpooling layer 530 may be provided back to the second convolutional layer 513 to repeat the second convolutional layer 513. The output of the second iteration of the second convolutional layer 513 is provided to a second 3D maxpooling layer 514 which may have spatial pool kernel of 2×2 and stride of 2, and temporal pool kernel of 2×2 and stride of 2. The output of the second maxpooling layer 514 is then provided back to the second convolutional layer 513 to repeat the second convolutional layer 513, the maxpool layer 530, the second convolutional layer 513 and the second maxpool layer 514. In other examples, the combination of the second convolutional layer 513, the first maxpooling layer 530, the second convolutional layer 513 and the second maxpooling layer 514 may be repeated a fewer or a greater number of times. The final iteration of the second maxpooling layer 514 may generate a tensor of [1B, 3H, 5W, 1F, 16C].

The output tensor of the final iteration of the second maxpooling layer 514 is then subjected to dropout of p=0.5 and flatten operations. The dropout operation reduces association between data and may drop all associations below the dropout cutoff, while the flatten operation further flattens the output tensor of the maxpooling layer 514 from 3D to 1D (transforms tensor to [1B, 240C]) to allow it to be inputted into first and second dense layers 516 and 517.

The flattened and dropped tensor output is provided to the first dense layer 516 which may have 16 channels (corresponding to 3840 connected edges) and may be followed by a corresponding ReLu operation as described above to generate a tensor of [1B, 16C]. The output tensor of the first dense layer 516 is provided to a second dense layer 517 which may have 7 channels (corresponding to 112 connected edges) and maybe followed by a sigmoid operation to generate the activity probabilities for the activity labels. The sigmoid operation is similar to the ReLu operation, and operates as an activation function for the output tensor of the second dense layer 517. In the example shown, each of the seven channels of the final tensor of the activity classifier model 501 may correspond to one of the activity labels "background", "excavate", "swing empty", "dump truck", "double no truck", "idle", and "swing full". In examples including the activity label "maintenance", the parameters the various layers of the activity classifier model 501 be modified to arrive at a final tensor having eight channels for example.

Referring now to FIG. 15B, the activity classification codes 500 then continue to block 520, which may include codes directing the processor 302 to aggregate subsets of the 20 images or frames to generate a plurality of subsets of images or frames each labelled with activity probabilities for the activity labels. For example, block 520 may direct the processor 302 to sequentially concatenate subset of images or frames based on time stamps. Block 520 may also direct the processor 302 to determine transition points where the highest activity probabilities for the activity labels change. For example, for five sequential subsets of 20 images or frames, the activity probabilities may be [0, 0, 0.95, 0.02, 0.03, 0, 0], [0, 0, 0.8, 0.1, 0.1, 0, 0], [0, 0, 0.9, 0.05, 0.05, 0, 0], [0, 0.6, 0, 0.2, 0.2, 0, 0] and [0, 0.8, 0.2, 0.1, 0.1, 0] respectively (based on ["background", "excavate", "swing empty", "dump truck", "dump no truck", "idle", "swing full"]). The processor 302 may determine, based on the activity probabilities, that the first three subsets are presumptively to be categorized as "swing empty" while the latter two subsets are presumptively to be categorized as "excavate" and that the transition point is between the third and fourth subsets from "swing empty" to "excavate".

The activity classification codes 500 then continue to block 522, which may include codes directing the processor 302 to determine whether the transition point identifies an allowed transition. Allowed transitions may include the following:
 (a) transition from "swing full" to "dump truck"/"dump no truck"/"idle";
 (b) transition from "dump truck" or "dump no truck" to "swing empty"/"idle";
 (c) transition from "swing empty" to "excavate"/"idle";
 (d) transition from "excavate" to "swing full"/"idle";
 (e) transition from "idle" to "swing full"/"dump truck"/"dump no truck"/"excavate"/"background"; and
 (f) transition from "background" to "swing full"/"dump truck"/"dump no truck"/"excavate"/"idle".

The allowed transitions may be different for different types of operating cycles of the heavy equipment. For example, for the bench cleaning subcycle which includes only (1) the excavate stage and (2) the dump stage described above, the allowed transitions may include (a) transition from "excavate" to "dump" and (b) transition from "dump" to "excavate", and may not include the transition from "swing full" to "excavate" or the transition from "swing empty" to "excavate".

If the transition point identifies an allowed transition, the activity classification codes continue to block 524, which includes codes directing the processor 302 to determine whether the highest activity probability is above an allowed transition threshold. In the example shown, the allowed transition threshold may be 0.4; however, in other embodiments, the allowed transition threshold may range between 0.2 and 0.75 for example.

If at block 524, the processor 302 determines that the highest activity probability is above the allowed transition threshold, the activity classification codes 500 then continue to block 525, which may include codes directing the processor 302 to classify the subset of images or frames after the transition point (and before a next transition point) as the activity label associated with that highest activity probability. For example, for a transition point from "swing empty to "excavate", blocks 524 and 525 may direct the processor 302 to classify a subset of images or frames having the activity probabilities [0, 0.6, 0, 0.2, 0.2, 0, 0] (based on based on ["background", "excavate", "swing empty", "dump truck", "dump no truck", "idle", "swing full" ]), as "excavate".

The activity classification codes 500 then continue to block 529, which include codes directing the processor 302 to assign the subset of images or frames classified with the activity label to a particular operating cycle. Based on a normal operating cycle of the mining shovel 102, each operating cycle may include a plurality of subsets of images or frames labelled with "excavate", followed by a plurality of subsets of images or frames labelled with "swing full", followed by a plurality of subsets of images or frames labelled with "dump truck" or "dump no truck" and finally followed by a plurality of subsets of images or frames labelled with "swing empty", before another operating cycle is initiated with another plurality of subsets of images labelled with "excavate". Thus, block 529 may direct the processor 302 to identify each operating cycle by determining transition points to "excavate", where all images and frames falling before a transition point to "excavate" may be assigned to a previous operating cycle and all images and frames falling after the transition point may be assigned to a current operating cycle. The processor 302 may also assign a common operating cycle identifier to all subsets of images or frames which fall within a single operating cycle. The activity classification codes 500 then end.

If at block 524, the processor 302 determines that the highest activity probability is not above the allowed transition threshold, the activity classification codes 500 then continue to block 528, which may include codes directing the processor 302 to classify the subset of images or frames after the transition point (and before a next transition point) as the activity label associated with the subset of images or frames from before the transition point. For example, for a transition point from "swing empty" to "excavate", blocks 524 and 528 may direct the processor 302 to identify a subset of images or frames having the activity probabilities [0.2, 0.3, 0, 0.2, 0.2, 0, 0] (based on based on ["background", "excavate", "swing empty", "dump truck", "dump no truck", "idle", "swing full" ]), as "swing empty" rather than "excavate". The activity classification codes 500 then continue to block 529 as described above.

However, if at block 522, the processor 302 does not identify an allowed transition, the activity classification codes 500 continue to block 526, which may include codes directing the processor 302 to determine whether the highest activity probability is above a forbidden transition threshold. In the example shown, the forbidden transition threshold may be 0.8; however, in other embodiments, the allowed transition threshold may range between 0.6 and 0.95 for example. Generally, the forbidden transition threshold is higher than the allowed transition threshold as the allowed transitions correspond to ordinary transitions in an operating cycle of the mining shovel 102, while forbidden transitions may correspond to unusual transitions during the operating cycle. As such, the activity classification codes 500 may require more higher probabilities from the activity classifier model 501 to allow the forbidden transitions when compared to the allowed transitions.

If at block 526, the processor 302 determines that the highest activity probability is above the forbidden transition threshold, the activity classification codes 500 then continue to block 525 as described above. For example, for a transition point from "excavate" to "dump truck", blocks 526 and 525 may direct the processor 302 to identify a subset of images or frames having the activity probabilities [0, 0.1, 0, 0, 0.9, 0, 0] (based on based on ["background", "excavate", "swing empty", "dump truck", "dump no truck", "idle", "swing full" ]), as "dump truck".

If at block 526, the processor 302 determines that the highest activity probability is not above the forbidden transition threshold, the activity classification codes 500 then continue to block 528 as described above. For example, for a transition point from "excavate" to "dump truck", blocks 526 and 528 may direct the processor 302 to identify a subset of images or frames having the activity probabilities [0, 0.4, 0, 0, 0.6, 0, 0] (based on based on ["background", "excavate", "swing empty", "dump truck", "dump no truck", "idle", "swing full" ]), as "excavate" rather than "dump truck".

Feature Segmentation Codes

Figure 16:
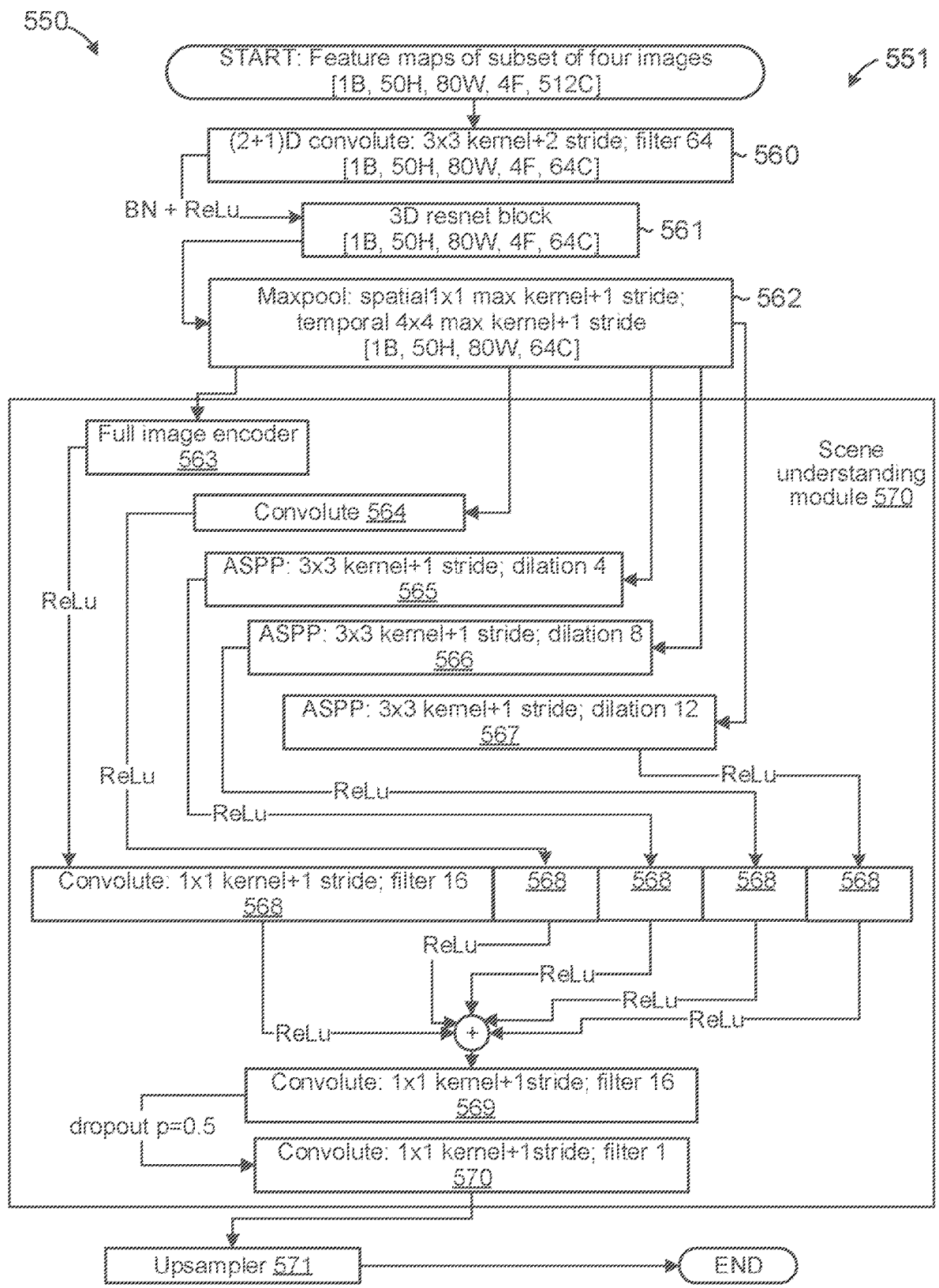
FIG. 16 is a process flowchart showing blocks of code for directing the processor circuit of FIG. 10 to perform feature segmentation in accordance with one example.

After the feature extraction codes 400 generate the feature maps for the images of the received sequential images or the frames of the received video (and in some examples, after the keypoint identification codes 450 generate the keypoint labels and keypoint coordinates for subsets of the images or frames), the processor circuit 300 may initiate feature segmentation codes stored in the program memory 304, an example of which is shown generally at 550 in FIG. 16. The feature segmentation codes 550 include codes for providing identifying and classifying specific features in each image or frame to generate feature segmentations operable to be used for subsequent status analysis functions described below.

In the example shown in FIG. 16, feature segmentation codes 550 may direct the processor 302 to retrieve a subset of images or frames captured over a period of time. For example, the feature segmentation codes 550 may direct the processor 302 to sample four sequential images or frames captured at four sequential points in time $t_1$, $t_2$, $t_3$ and $t_4$. Alternatively, the feature segmentation codes 550 may direct the processor 302 to sample between 2 and 200 sequential images or frames correspondingly captured at between 2 and 200 sequential points in time. The feature segmentation codes 550 may then direct processor 302 to input the feature maps (generated by the feature extraction codes 400) corresponding to the subset of images or frames into a feature segmenter model 551 configured to output feature labels for pixels of that subset of images or frames. In some examples, the feature segmentation codes 550 may also direct the processor 302 to input the keypoint coordinates and the keypoint labels of the subset of images or frames (generated by the keypoint identification codes 450) into the feature segmenter model 551. The feature labels outputted by the feature segmenter model 551 may include, without limitation, "teeth", "shroud", and "load". In some examples, the feature labels may also include "mine face". A plurality of pixels having a common feature label are generally segmentations associated with that feature, such as a "teeth" segmentation or a "load" segmentation for example.

Figure 17:
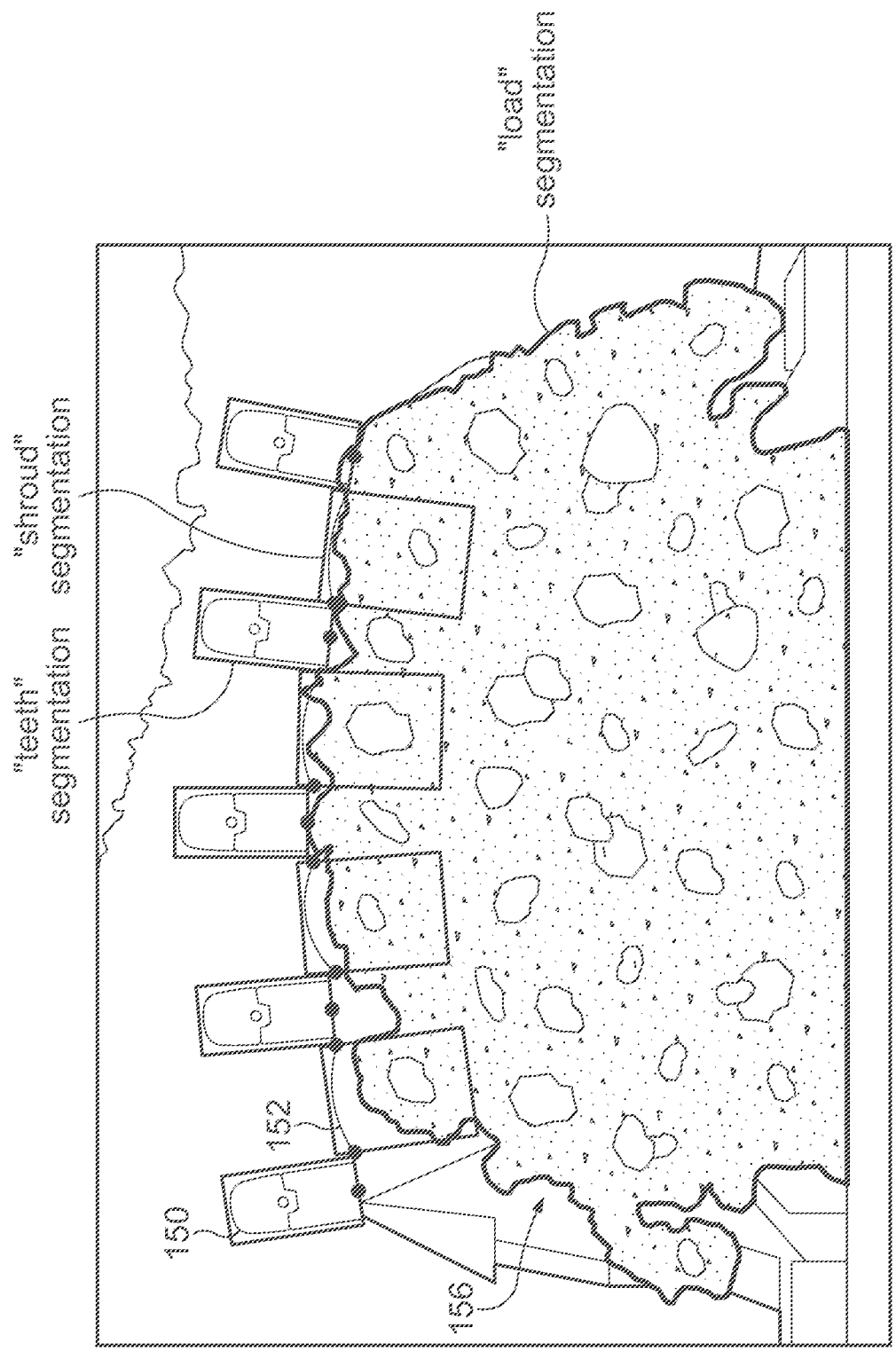
FIG. 17 is a schematic representation of feature segmentations identified by the feature segmentation codes of FIG. 16 in accordance with one example.

The feature label "teeth" (or the "teeth" segmentation) may generally be associated with pixels corresponding to portions of the teeth 150 of the operating implement 126 visible in the image or frame. An example of a "tooth" segmentation is shown in FIG. 17. In some examples, the feature label "teeth" may be divided into unique feature labels associated with individual tooth of the teeth 150, such as "tooth 1", "tooth 2", "tooth 3" [ . . . ] up to "tooth n", where n is the number of teeth making up the plurality of teeth 150.

The feature label "shroud" (or the "shroud" segmentation) may generally be associated with pixels corresponding to portions of the shrouds 152 of the operating implement 126 visible in the image or frame. An example of a "shroud" segmentation is shown in FIG. 17. Similar to the feature label "teeth", in some examples, the feature label "shroud" may be divided into unique feature labels associated with individual shrouds of the shrouds 152, such as "shroud 1", "shroud 2", "shroud 3" [ . . . ] up to "shroud m", where m is the number of shrouds making up the plurality of shrouds 152.

The feature label "load" (or the "load" segmentation) may generally be associated with pixels corresponding to portions of the load 156 within the load container 154 which are visible in the image or frame. An example of a "load"

segmentation is shown in FIG. 17. The feature label "mine face" (or the "mine face" segmentation) may generally be associated with pixels corresponding to portions of the mine face 114 which are visible in the image or frame.

The feature segmenter model 551 may be trained with the RBG values of each pixels of training images or frames, where pixels of the training images or frames are further feature ground annotated with at least the feature labels "teeth", "shroud", and "load", (and optionally "mine face"). The above RBG values and segmentation ground annotations are inputted into the feature extraction codes 400 to generate one or more feature maps (output tensors of [1B, 50H, 80W, 512C]). The feature maps are then inputted into a neural network of the feature segmenter model 551 to iteratively generate and optimize coefficients which enable the neural network to generate corresponding feature labels for different subsets of images or frames based on an input including the feature maps of the subset of images or frames (and based on an initial input of the RBG values of pixels of the subset of images or frames). As described above, in some examples, the keypoint coordinates and the keypoint labels associated with the subset of image or frame (generated by the keypoint identification codes 450) may also used by the feature segmenter model 551 to generate the feature labels. In some other examples, the feature segmenter model 551 may also generated the feature labels based on alternative or additional inputs, such as the depth value of each pixel or displacement of common features across the subset of images or frames. In such examples, the training images or frames may also be ground annotated with the keypoint labels and the keypoint coordinates, the depth values or the displacement values. In some examples, the feature segmenter model 551 may originally derive from and be adapted from an existing spatial temporal feature segmenter model, such as the system described in Huan F U et al., *Deep Ordinal Regression Network for Monocular Depth Estimation*, arXiv:1806.02446v1 [cs.CV] (2018), which is incorporated herein by reference. The feature segmenter model 551 may be trained on the server 312 and locally stored in the storage memory 306.

Still referring FIG. 16, in the illustrated example, the feature segmenter model 551 includes a first (2+1)D convolutional layer 560 which operates directly on the feature maps of the subset of four images or frames generated by the feature extraction codes. The first convolutional layer 560 may perform an initial spatial 2D convolution on each of the four images with spatial kernel size of 1×1, stride of 1, and filter size of 16, and then may perform a temporal 1D convolution on the combination of the four images with a temporal kernel size of 1×1, stride of 1 and filter size of 16, but other configurations are possible. The (2+1)D convolution is followed by corresponding BN and ReLu operations as described above to generate a tensor of [1B, 50H, 80W, 4F, 512C].

The output tensor of the first convolutional layer 560 is inputted into a 3D resnet block 561, which may be similar to the 3D resnet block 461 of the keypoint identifier model 451 (shown in FIG. 13A) to generate a tensor of [1B, 50H, 80W, 4F, 64C]. The output tensor of the 3D resnet block 561 is inputted into a maxpooling layer 562 to combine the four images or frames and drop the dimensionality of the tensor from 4D to 3D ([B, H, W, C], dropping the frame F parameter). The maxpooling layer 562 may have a spatial pool kernel size of 1×1 and stride of 1, and temporal pool kernel size of 4×4 and stride of 1, and may be followed by corresponding BN and ReLU operations to generate a tensor of [1B, 50H, 80W, 64C].

The output tensor of the maxpooling layer 562 is provided to a scene understanding module 580 which may include a full image encoder 563, a second convolutional layer 564, a first atrous spatial pyramid pooling (ASPP) layer 565, a second ASPP layer 566, a third ASPP layer 567, a third convolutional layer 568, a fourth convolutional layer 569, a fifth convolutional layer 570, and an upsampling layer 571. The full image encoder 563 and the second convolutional layer 564 may be similar to the full image encoder and convolutional layers described in Huan F U et al., *Deep Ordinal Regression Network for Monocular Depth Estimation*, arXiv:1806.02446v1 [cs.CV] (2018), again incorporated herein by reference. The first ASPP layer 565 may have kernel size of 3×3, stride of 1 and dilation of 4. The second ASPP layer 566 may have kernel size of 3×3, stride of 1 and dilation of 8. The third ASPP 567 layer may have kernel size of 3×3, stride of 1 and dilation of 8. The output tensor of the maxpooling layer 562 is inputted into each of the full image encoder 563, the second convolutional layer 564, and the first, second and third ASPP layers 565, 566 and 567 and may be followed by respective ReLu operations as described above. The corresponding output tensor of each of the full image encoder 563, the second convolutional layer 564, and the first to third ASPP layers 565, 566 and 567 based on the maxpooling layer 562 are inputted into the third convolutional layer 568 which may have kernel size of 1×1, stride of 1, and filter size of 16, and may be followed by corresponding ReLU operations. The corresponding output tensors of the third convolutional layer 568 based on each of the full image encoder 563, the second convolutional layer 564, and the first to third ASPP layers 565, 566 and 567 may then be summed. The summed output tensor is inputted into the fourth convolutional layer 569 which may have kernel size of 1×1, stride of 1 and filter size of 16 and may be followed by ReLu operations. The output tensor of the fourth convolutional layer 569 may be subject to a dropout operation p=0.5 before it is inputted into a fifth convolutional layer 570 which may have kernel size of 1×1, stride of 1 and filter size of 1. The output tensor of the fifth convolutional layer 570 may be inputted into an upsampling layer 571 to generate channels the feature labels associated with pixels of the subset of four images or frames. The upsampling layer 571 may increase the height and width of the output tensor of the fifth convolutional layer 570, and may include bilinear upsampling for example or one or more learnable upsampling layers which upsamples the output tensor back to an original size of the subset of images or frames for example. The output tensor of the upsampling layer 571 may include a channel corresponding to each of the feature labels "teeth", "shroud", "load" and optionally "mine face" in some embodiments.

Status Analysis Codes

Figure 18:
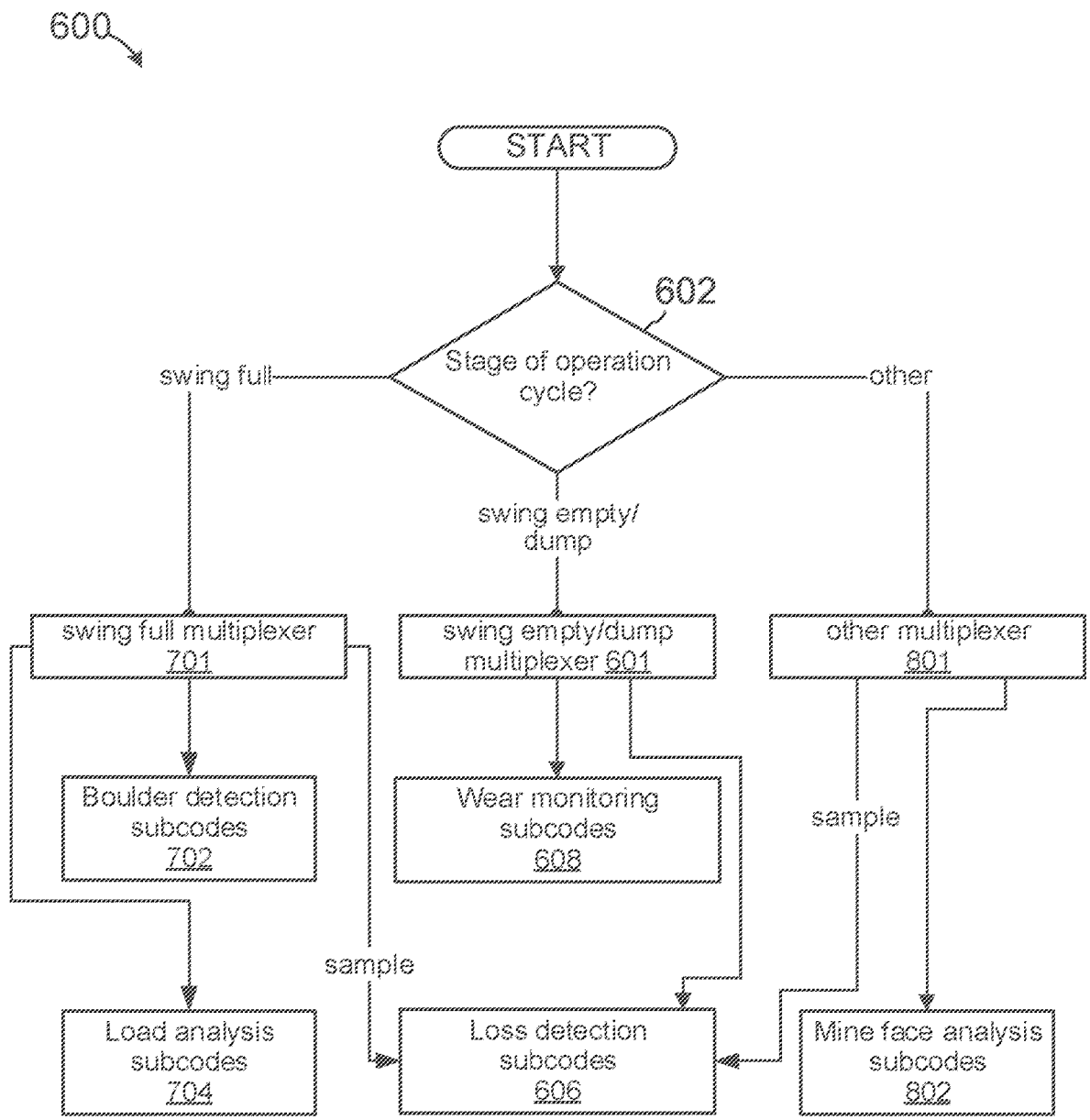
FIG. 18 is a process flowchart showing blocks of code for directing the processor circuit of FIG. 10 to perform status analysis in accordance with one example.

After the keypoint identification codes 450 generate the keypoint labels and keypoint coordinates, the activity classification codes 500 generate the activity probabilities for the activity labels and the feature segmentation codes 550 generate feature labels for the received sequential images and/or the received video, the processor circuit 300 may initiate status analysis codes stored in the program memory 304, an example of which is shown generally at 600 in FIG. 18. The status analysis codes 600 generally include codes for assessing the status of different features identified by the feature segmentation codes 550 based a stage of the operating cycle of the mining shovel 102 identified by the activity classification codes 500.

Referring to FIG. 18, the status analysis codes 600 begin at block 602, which may include codes directing the processor 302 to determine whether a particular image or frame within a sequence of frames or images represents the field-of-view 184 of the image capture system 180 while the mining shovel 102 is in the swing empty stage or the dump stage (generally where there is no load 156 in the load container 154, and the teeth 150, the shrouds 152 and the lip 160 can be analyzed), or in the swing full stage (generally where there is a load 156 in the load container 154 and the load 156 can be analyzed), or in another stage (such as an excavate stage where the mine face 114 can be analyzed). For example, block 602 may direct the processor 302 to retrieve the activity label associated with each particular image or frame generated by block 525 or 528 of the activity classification codes 500 (shown in FIG. 15). If the retrieved activity label for the image or frame is "swing empty", "dump truck" or "dump no truck", the processor 302 may determine that the particular image or frame corresponds to the field-of-view 184 while the mining shovel 102 is in corresponding swing empty stage or dump stage. In contrast, if the retrieved activity label is "swing full", the processor 302 may determine that the particular image or frame corresponds to the field-of-view 184 while the mining shovel 102 is in the swing full stage. Finally, if the retrieved activity label is "excavate", "idle" or "background", then the processor 302 may determine that the particular image or frame corresponds to the field-of-view 184 while the mining shovel 102 is in another stage.

Swing Empty/Dump Multiplexer

If at block 602, the status analysis codes 600 determines that a particular image or frame represents the field-of-view 184 while the mining shovel 102 is in the swing empty stage or the dump stage, the status analysis codes 600 continues to a swing empty/dump multiplexer 601. The swing empty/dump multiplexer 601 generally functions to determine when and how often to initiate one or more of loss detection subcodes 606 and wear monitoring subcodes 608 while the mining shovel 102 is in either the swing empty stage or the dump stage.

The loss detection and wear monitoring subcodes 606 and 608 generally include codes directing the processor 302 to analyze and monitor wear to the various components of the operating implement 126. More specifically, the loss detection subcodes 606 generally include codes directing the processor 302 to analyze the plurality of teeth 150 and/or the plurality of shrouds 152 of the operating implement 126 to determine whether any of the teeth 150 or any of the shrouds 152 are missing. For example, during the operating cycle of the mining shovel 102, one or more of the teeth 150 or the shrouds 152 may become detached and fall into the load 156 or the mine face 114. A detached tooth or shroud in the load 156 can cause damage to comminution equipment during later processing of the load 156. Additionally, operating implements 126 having a missing tooth can be less effective at excavating the mine face 114 or the earthen material pile, while a missing shroud 152 can result in rapid damage to the lip 160.

The wear monitoring subcodes 608 generally include codes directing the processor 302 to analyze the plurality of teeth 150 and/or the plurality of shrouds 152 of the operating implement 126 to determine change in length of the teeth 150 and/or the shrouds 152 over time (such as over one operating cycle or over multiple operating cycles). During the operating cycle of the mining shovel 102, the teeth 150 and the shrouds 152 become worn due to continued contact with the mine face 114. Monitoring wear patterns of the teeth 150 and the shrouds 152 can allow operators to know when to replace the teeth 150 and the shrouds 152. The wear patterns can also be correlated with the identity of a particular operator and/or the composition of a particular mine face 114 or earthen material pile.

In this regard, the loss detection subcodes 606 may be a more important and more critical function than the wear monitoring subcodes 608, as a detached tooth or shroud can cause damage to downstream equipment, can decrease the efficacy of excavation and may need to be addressed in a current operating cycle. In contrast, wear to a tooth or shroud may be monitored and addressed at a later operating cycle. Due to the importance of the loss detection subcodes 606, the swing empty/dump multiplexer 601 may run loss detection on 100% of the images or frames received during a particular swing empty stage and on 100% of the images or frames received during a particular dump stage of the operating cycle. In other examples, the swing empty/dump multiplexer 601 may run loss detection on between 10% and 100% of the images or frames received during a particular swing empty stage and on between 10% and 100% of the images or frames received during a particular dump stage, depending on processing power of the processor 302 and prior knowledge such as a type of heavy equipment and a composition of the load 156 and/or the mine face 114. For example, if the load 156 includes viscous material which easily adheres to components of the operating implement 126, the swing empty/dump multiplexer 601 may run loss detection on less than 70% of the images or frames received during the dump stage as the teeth 150 and the shrouds 152 may still be obscured by the load 156 in a majority of the images or frames received during the dump stage, but on closer to 100% of the images or frames received during the swing empty stage as the load 156 should be completely be absent.

The swing empty/dump multiplexer 601 may run the wear monitoring subcodes 608 depending on the remaining processing power of the processor 302, and may run wear monitoring on 100% of the images or frames received during a particular swing empty stage only and on 0% the images or frames received during a particular dump stage. In this regard, wear monitoring during the swing empty stage may be more accurate than wear monitoring during the dump stage. During the dump stage, portions of the load 156 in the load container 154 and movement of the openable bottom wall 162 may interfere with detection of keypoints of the operating implement 126. However, during the swing empty stage, there is no load 156 remaining in the load container 154 and no movement of the bottom wall 162 to interfere with detection of keypoints. However, in other examples, the swing empty/dump multiplexer 601 may run the wear monitoring on between 0% to 100% of the images or frames received during a particular dump stage and/or on between 10% and 100% of the images or frames received during a particular swing empty stage, depending on processing power of the processor 302, and prior knowledge such as the type of heavy equipment and the composition of the load 156 and/or the mine face 114.

Loss Detection Subcodes

If the swing empty/dump multiplexer 601 determines that the processor 302 should initiate the loss detection subcodes 606 for a particular image or frame received during a swing empty stage or a dump stage, an example implementation of the loss detection subcodes 606 using a neural network is described in commonly owned PCT patent publication no. WO2019227194A1 entitled METHOD, APPARATUS AND SYSTEM FOR MONITORING A CONDITION ASSOCIATED WITH OPERATING HEAVY EQUIPMENT SUCH AS A MINING SHOVEL OR EXCAVATOR filed on Jun. 1, 2018 and incorporated herein by reference. Another example of the loss detection subcodes 606 is generally shown in FIG. 19, although other configurations are possible.

Figure 19:
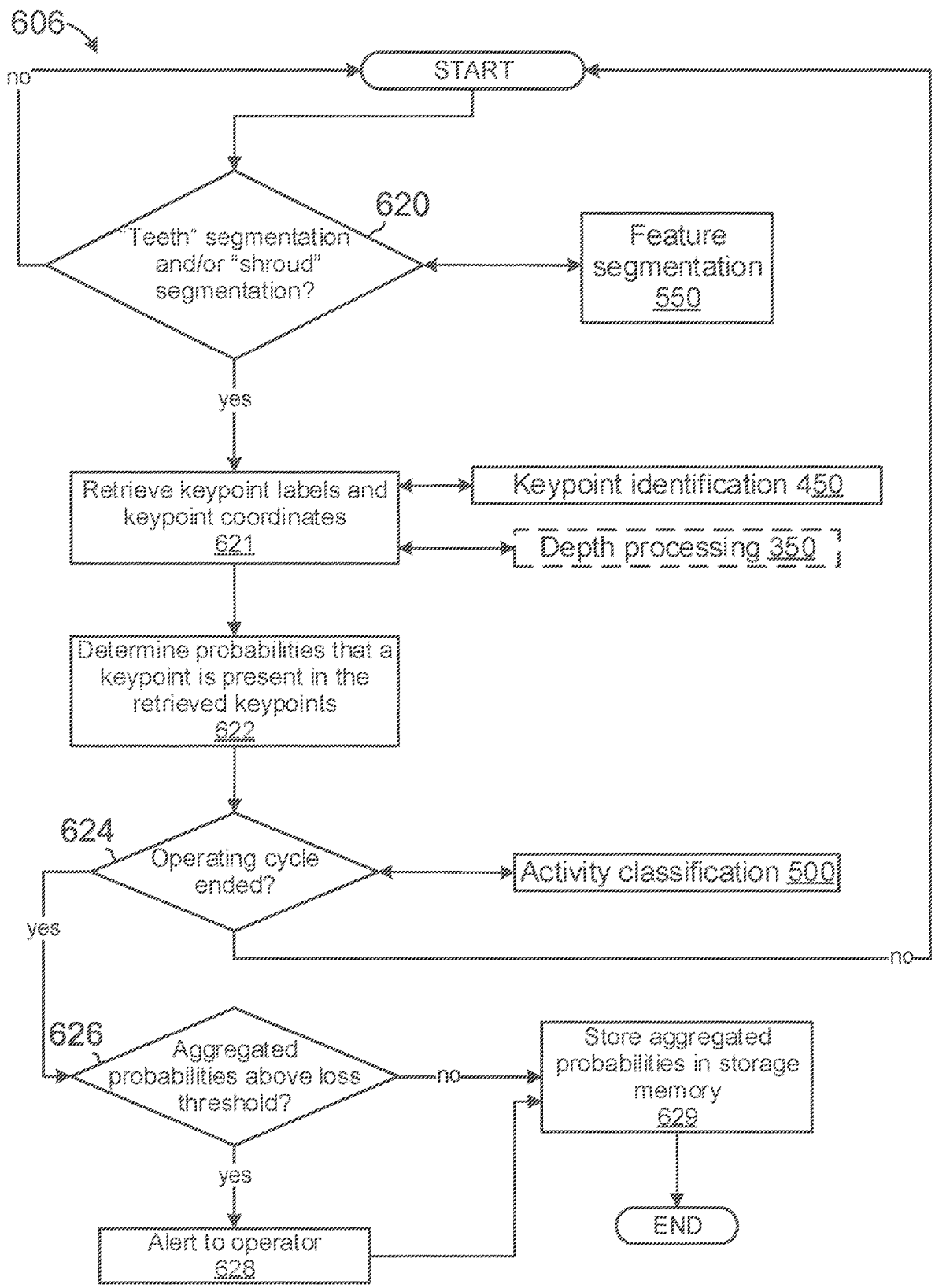
FIG. 19 is a process flowchart showing blocks of code for directing the processor circuit of FIG. 10 to perform loss detection subcodes of the status analysis codes of FIG. 18 in accordance with one example.

In the example shown in FIG. 19, the loss detection subcodes 606 begin at block 620, which may include codes directing the processor 302 to determine whether a particular image or frame includes portions corresponding to the plurality of teeth 150 and/or portions corresponding to the plurality of shrouds 152. For example, block 620 may direct the processor 302 may retrieve the feature labels of the pixels of the image or frame generated by the feature segmentation codes 550 and determine whether any of the pixels are classified with a "teeth" feature label (namely, the "teeth" segmentation) and/or the "shroud" feature label (namely, the "shroud" segmentation). The processor 302 may then determine that a particular image or frame which has more than a threshold number of pixels labelled with the "teeth" feature label or the "shroud" feature label includes a portion corresponding to the teeth 150 or the shrouds 152, and that a particular image or frame which has less than the threshold number of pixels labelled with the "teeth" feature label or the "shroud" feature label does not include a portion corresponding to the teeth 150 or the shrouds 152.

If at block 620, the processor 302 determines that a particular image or frame does not include any portions corresponding to the teeth 150 or any portions corresponding to the shrouds 152, the loss detection subcodes 606 may direct the processor 302 to reinitiate the loss detection subcodes 606 for a subsequent image or frame or may end, depending on instructions of the swing empty/dump multiplexer 601. This can continue until the processor 302 identifies an image or frame which does include a portion corresponding to the teeth 150 and/or a portion corresponding to the shrouds 152, at which point the loss detection subcodes 606 continue to block 621.

Block 621 may include codes directing the processor 302 to retrieve the keypoint labels and keypoint coordinates generated by the keypoint identification codes 450 for that image or frame. For example, in examples where the keypoint labels are common to the teeth 150 and the shrouds 152 (such as "tooth top" and "tooth bottom"; or "shroud left" and "shroud right" for example), block 621 may direct the processor 302 may retrieve each of the common keypoints. Additionally or alternatively, in embodiments where the keypoint labels are divided into unique keypoint labels associated with individual ones of the teeth 150 and individual ones of the shrouds 152 (such as "tooth top n", where n corresponds to the number of teeth making up the plurality of teeth 150; or "shroud left m" where m corresponds to the number of shrouds making up the plurality of shrouds 152 for example), the processor 302 may retrieve each of the unique keypoints. Block 620 may also direct the processor 302 to 2D normalize the keypoint coordinates associated with the retrieved keypoint labels. For example, the processor 302 may retrieve the depth values generated by the depth processing codes 350 which are associated with the pixels corresponding to the keypoint coordinates to 2D normalize the keypoint coordinates.

The loss detection subcodes 606 then continue to block 622, which may include codes directing the processor 302 to determine probabilities of whether any of the keypoints are missing from the retrieved keypoints. In examples where the keypoint labels are common to the teeth 150 and the shrouds 152, the processor 302 may determine whether any of the common keypoints are missing by comparing the retrieved keypoint labels and 2D normalized keypoint coordinates with a keypoint reference. The keypoint reference may correspond to ground truth coordinates of every keypoint of the operating implement 126 (such as every keypoint shown in FIG. 14 for example) in a 2D image or frame. The keypoint reference may include a combined keypoint reference for the teeth 150 and the shroud 152, or may include a teeth keypoint reference for the teeth 150 (including the "tooth top" and "tooth bottom" keypoint labels for example) and a separate shroud keypoint reference for the shroud 152 (including the "shroud left", "shroud right", "shroud top" and "shroud bottom" keypoint labels). The comparison to the keypoint reference may generate a probability that a particular keypoint is missing from the retrieved keypoints, and may be performed by inputting the RBG values of an image or frame, and keypoint labels and keypoint coordinates into a missing keypoint model 611 configured to generate probabilities that each keypoint of the keypoint reference is present in that image or frame in a manner similar to that described in commonly owned PCT patent publication no. WO2019227194A1 entitled METHOD, APPARATUS AND SYSTEM FOR MONITORING A CONDITION ASSOCIATED WITH OPERATING HEAVY EQUIPMENT SUCH AS A MINING SHOVEL OR EXCAVATOR filed on Jun. 1, 2018 and incorporated herein by reference.

For example, comparison of retrieved teeth keypoints to a teeth keypoint reference may generate [0.9, 0.9, 0.8, 0.9, 0.9, 0.2] (corresponding to reference keypoints [tooth top a, tooth bottom a, tooth top b, tooth bottom b, tooth top c, tooth top c]), indicating that a "tooth top" keypoint may not be present for teeth c. Similarly, a comparison of retrieved shroud keypoints to a shroud reference keypoints may generate [0.1, 0.2, 0.3, 0.9, 0.8, 0.9] (corresponding to reference keypoints [shroud left a, shroud right a, shroud top a, shroud bottom a, shroud left b, shroud right b, shroud top b, shroud bottom b]) indicating that the "shroud left", "shroud right", "shroud top", and "shroud bottom" keypoints may not be present for shroud a.

Additionally or alternatively, in examples where the keypoint labels are unique keypoint labels, block 622 may direct the processor 302 to determine whether any of the unique keypoints are missing. The processor 302 may also generate probabilities corresponding to present unique keypoints, such as [1, 1, 1, 1, 1, 0] (corresponding to unique keypoint labels ["tooth top 1", "tooth bottom 1", "tooth top 2", "tooth bottom 2", "tooth top 3", "tooth top 3"]), indicating that the "tooth top 3" keypoint may not be present. Similarly, the processor 302 may also generate [0, 0, 0, 1, 1, 1] (corresponding to unique keypoint labels ["shroud left 1", "shroud right 1", "shroud top 1", "shroud bottom 1", "shroud left 2", "shroud right 2", "shroud top 2", "shroud bottom 2"]), indicating that the "shroud left 1", "shroud right 1", "shroud top 1", and "shroud bottom 1" keypoints may not be present.

The loss detection subcodes 606 then continue to block 624, which may include codes directing the processor 302 to store the determined probabilities of present keypoints for the image or frame in a buffer and determine whether a particular operating cycle of the mining shovel 102 has ended. For example, the processor 302 may retrieve the operating identifier for that image or frame generated by block 529 of the activity classification codes 500 and determine that a particular operating cycle has ended when the operating identifier changes. Additionally or alternatively, the processor 302 may retrieve the activity labels for that image or frame generated by blocks 525 and 528 of the activity classification codes 500 and determine that particular operating cycle has ended by determining a transition point to the "excavate" activity label.

If at block 624, the processor 302 determines that a particular operating cycle has not ended, the loss detection subcodes 606 may direct the processor 302 to reinitiate the loss detection subcodes 606 for a subsequent image or frame of that operating cycle or may end, depending on instructions of the swing empty/dump multiplexer 601. This can continue until the processor 302 identifies an image or frame which corresponds to the end of the particular operating cycle of the mining shovel 102, at which point the loss detection subcodes 606 continue to block 626.

Block 626 may include codes directing the processor 302 to aggregate probabilities of present keypoints for each image or frame in the particular operating cycle and determine whether the aggregated probabilities are above or below a loss threshold. Aggregating the probabilities of present keypoints over an operating cycle may increase a confidence level of identifying present versus missing keypoints. The aggregation may involve the processor 302 summing and averaging each probability for each keypoint of the images or frames of the particular operating cycle. For example, for a first image and second image of a single operating cycle for which block 622 generated probabilities of present teeth keypoints of [0.9, 0.9, 0.8, 0.9, 0.9, 0.2] and [1.0, 0.7, 0.7, 0.8, 0.9, 0.8] (corresponding to reference keypoints [tooth top a, tooth bottom a, tooth top b, tooth bottom b, tooth top c, tooth top c]), block 626 may direct the processor 302 to generate aggregated probabilities of [0.95, 0.8, 0.75, 0.85, 0.9, 0.5]. Probabilities below the loss threshold may represent a keypoint which is likely missing. In some examples, the loss threshold may be 0.35; however, in other examples, the loss threshold may range between 0.1 and 0.5 and may depend on prior knowledge such as the type of heavy equipment and composition of the load 156 for example. For example, for loads 156 which are viscous and have a tendency to adhere to components of the operating implement 126, the loss threshold may be higher than 0.35 as visibility of the keypoints may be reduced in the images or frames.

If at block 626, the processor 302 determines that one of the aggregated probabilities of present keypoints for the particular operating cycle is below the loss threshold, the loss detection subcodes 606 may then continue to block 627, which may include codes directing the processor 302 to generate an alert for the operator of the mining shovel 102, such as by sending an alert message to the computer system 314 via the I/O interface 308 for example. The loss detection subcodes 606 then continue to block 629, which may include codes directing the processor 302 to store the aggregated probabilities of present keypoints in the storage memory 306. The stored aggregated probabilities may then be uploaded to the server 312 for subsequent analysis. The loss detection subcodes 606 then end.

If at block 626, the processor 302 determines that none of the aggregated probabilities of a missing keypoints for particular operating cycle is below the loss threshold, the loss detection subcodes 606 may then continue to directly to block 629 as described above.

Wear Monitoring Subcodes

If the swing empty/dump multiplexer 601 determines that the processor 302 should initiate the wear monitoring subcodes 608 for a particular image or frame received during a swing empty stage or a dump stage, an example of the wear monitoring subcodes 608 using a neural network is described in commonly owned PCT patent publication no. WO2019227194A1 entitled METHOD, APPARATUS AND SYSTEM FOR MONITORING A CONDITION ASSOCIATED WITH OPERATING HEAVY EQUIPMENT SUCH AS A MINING SHOVEL OR EXCAVATOR filed on Jun. 1, 2018 and incorporated herein by reference. Another example of the wear monitoring subcodes 608 is generally shown in FIG. 20, although other configurations are possible.

Figure 20:
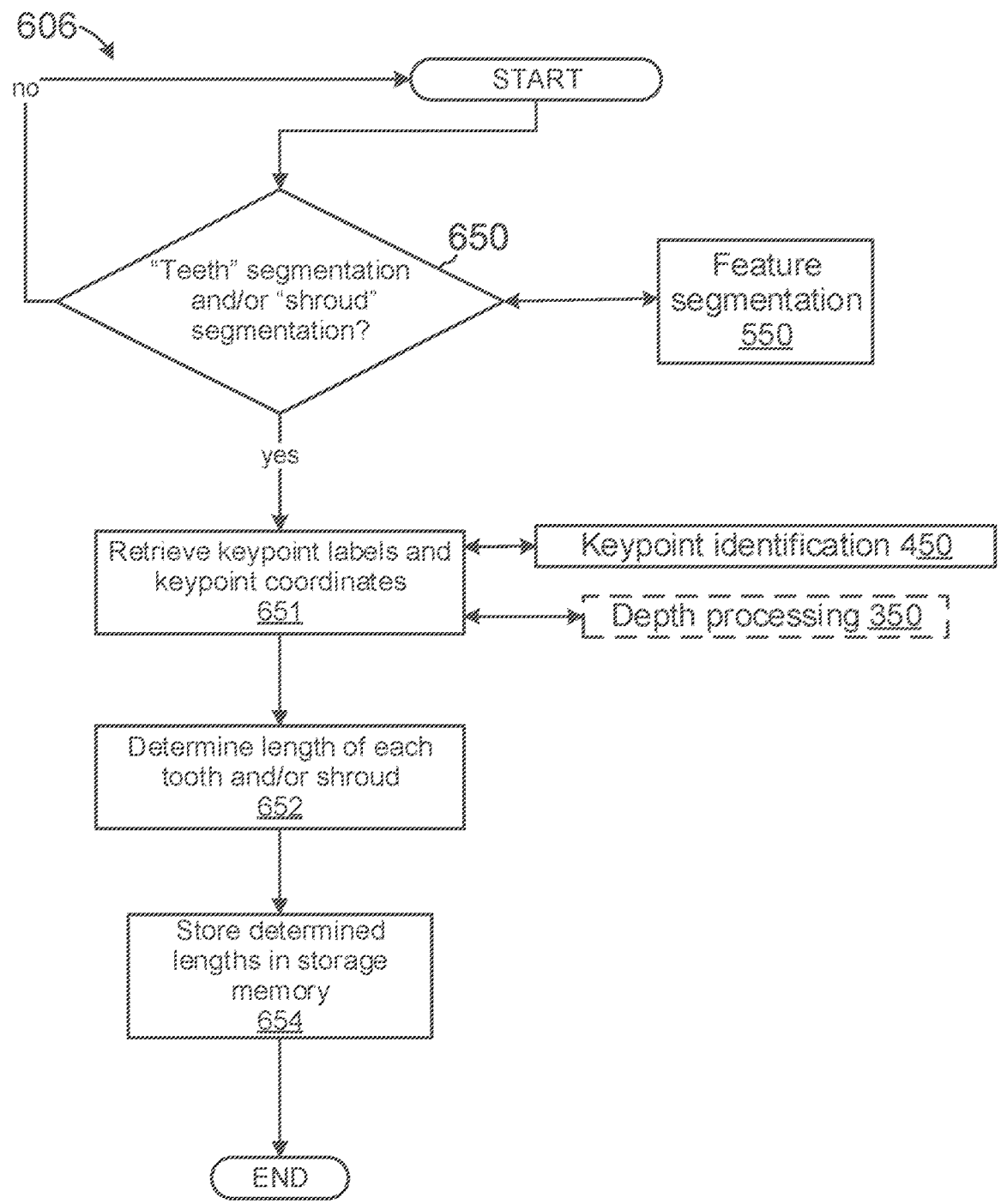
FIG. 20 is a process flowchart showing blocks of code for directing the processor circuit of FIG. 10 to perform wear monitoring subcodes of the status analysis codes of FIG. 18 in accordance with one example.

In the example shown in FIG. 20, the wear monitoring subcodes 608 begin at block 650, which may include codes directing the processor 302 to determine whether a particular image or frame includes portions corresponding to the plurality of teeth 150 and/or portions corresponding to the plurality of shrouds 152, and may be similar to block 620 of the loss detection subcodes 606. If at block 650, the processor 302 determines that a particular image or frame does not include any portions corresponding to the teeth 150 or any portions corresponding to the shrouds 152, the wear monitoring subcodes 608 may direct the processor 302 to reinitiate the wear monitoring subcodes 608 for a subsequent image or frame or may end, depending on instructions of the swing empty/dump multiplexer 601. This can continue until the processor 302 identifies an image or frame which does include a portion corresponding to the teeth 150 and/or a portion corresponding to the shrouds 152, at which point the wear monitoring subcodes 608 continue to block 651.

Block 651 may include codes directing the processor 302 to retrieve the keypoint labels and keypoint coordinates generated by the keypoint identification codes 450 for that image or frame, and may be similar to block 621 of the loss detection subcodes 606. Block 651 may also include codes directing the processor 302 to 2D normalize the keypoint coordinates associated with the retrieved keypoint labels, and may again be similar to block 621 of the loss detection subcodes 606.

The wear monitoring subcodes 608 then continue to block 652, which may include codes directing the processor 302 to process the "teeth" segmentations and/or the "shroud" segmentations and the retrieved keypoint labels and keypoint coordinates to determine a length of each tooth of the plurality of teeth 150 and/or a length of each shroud of the plurality of shrouds 152. For example, block 652 also direct the processor 302 to calculate a distance between the 2D normalized keypoint coordinates of one or more keypoint labels to determine a length of the teeth 150 and/or the shrouds 152. More specifically, the processor 302 may determine a length of a tooth in one particular image or frame by calculating a distance between the 2D normalized keypoint coordinates of closest adjacent "tooth top", to "tooth bottom", "shroud left" and "shroud right" keypoint labels. The processor 302 may also determine a length of a shroud in one particular image or frame by calculating a distance between the 2D normalize keypoint coordinates of closest adjacent "shroud left", "shroud right", "shroud top", and "shroud bottom" keypoint labels. The processor 302 may then determine the identity of the tooth of the teeth 150 and/or the identity of shroud of the shrouds 152 to correspond to the determined lengths by counting the number of lengths determined or by using the x coordinates of the keypoint coordinates used for the length determination. Alternatively or additionally, the processor 302 may compare the keypoint coordinates to the keypoint reference corresponding to ground truth coordinates of every keypoint of the operating implement 126 in a manner similar to block 622 of the loss detection subcodes 606 to determine the identity of the tooth and/or the shroud.

The wear monitoring subcodes 608 then continue to block 654, which may include codes directing the processor 302 to store the determined lengths of each tooth of the plurality of teeth 150 and/or each shroud of the plurality of shrouds 152 for a particular image or frame in the storage memory 306.

The stored lengths may then be uploaded to the server 312 for subsequent analysis. The wear monitoring subcodes 608 then end.

Swing Full Multiplexer

Referring back to FIG. 18, if at block 602, the status analysis codes 600 determines that a particular image or frame represents the field-of-view 184 while the mining shovel 102 is in the swing full stage, the status analysis codes 600 continue to a swing full multiplexer 701. The swing full multiplexer 701 generally functions to determine when and how often to initiate one or more of boulder detection subcodes 702, load analysis subcodes 704 and the loss detection subcodes 606 while the mining shovel 102 is in the swing full stage.

The boulder detection and load analysis subcodes 702 and 704 generally include codes directing the processor 302 to analyze and monitor the load 156 within the load container 154. More specifically, the boulder detection subcodes 702 generally include codes directing the processor 302 to analyze the load 156 to determine whether there are any large boulders within the load 156. Large boulders may can cause damage to the haul truck 170 and comminution equipment during later processing of the load 156. Large boulders may also be a safety concern to any operators in the haul truck 170 during the dump stage.

The load analysis subcodes 704 generally include codes directing the processor 302 to analyze images or frames including the load 156 to determine whether there are appropriate images or frames to be sent to the server 312 for subsequent analysis of the load 156. For example, the server 312 may perform fragmentation analysis of the load 156 to generate metrics on the size and composition of the load 156, which can aid in subsequent downstream processing of the load 156 and also aid in determining what techniques or heavy equipment should be used during the excavate stage to more efficiently excavate the load 156 from the mine face 114. Examples of such fragmentation analysis are described in commonly owned PCT patent publication WO2017100903A1 entitled METHOD AND APPARATUS FOR IDENTIFYING FRAGMENTED MATERIAL PORTIONS WITHIN AN IMAGE filed on Dec. 13, 2016 and incorporated herein by reference. However, fragmentation analysis can be computationally intensive, and may be performed on the server 312 to reserve computing resources of the processor circuit 300 for other critical functions, such as the loss detection subcodes 606 or the boulder detection subcodes 702 for example.

In this regard, the boulder detection subcodes 702 may be a more important and more critical function than the load analysis subcodes 702, as a boulder in the load 156 can represent an immediate safety concern, cause damage to downstream equipment and may require immediate action in a current operating cycle. However, the boulder detection subcodes 702 may be more computationally intensive than image or frame selection required of the load analysis subcodes 704. Due to the importance but the computational cost of the boulder detection subcodes 702, the swing full multiplexer 701 may run boulder detection on 50% of the images or frames received during a particular swing full stage. In other examples, the swing full multiplexer 701 may run boulder detection on between 25% to 100% of the images or frames received during a particular swing empty stage, depending on processing power of the processor 302, segmentation feature labels received from the feature segmentation codes 550 and prior knowledge such as the type of heavy equipment and the composition of the load 156. For example, if the type of heavy equipment is one with a relatively short swing full stage (i.e. a quick swing), the swing full multiplexer 701 may run the boulder detection subcodes 702 on closer to 100% of the images or frames received during that short swing full stage to ensure that any boulders within the load 156 are detected.

As described above, the load analysis subcodes 704 performed by the embedded processor circuit 300 to select a particular image or frame may require little computational resources. The swing full multiplexer 701 may run the load analysis subcodes 704 depending on the remaining processing power of the processor 302, and may run load analysis on 50% of the images or frames received during a particular swing full stage. However, in other examples, the swing full multiplexer 701 may run the load analysis on between 25% and 75% of the images or frames received during a particular swing full stage.

Additionally, due to the importance of the loss detection subcodes 606, the swing full multiplexer 701 may also run loss detection on 10% to 50% of the images or frames received during a particular swing full stage. In this regard, the swing full multiplexer 701 may also run the portion of loss detection subcodes 606 applicable to the teeth 150 versus applicable to the shroud 152 differently on the images or frames received during the swing full stage. For example, due to the presence of the load 156 during the swing full stage, the load 156 may obscure a large portion of the shrouds 152, but obscure only a small portion of the teeth 150. The load 156 may thus render loss detection of shrouds 152 unreliable but have little effect on loss detection of teeth 150. The swing full multiplexer 701 may run the portion of the loss detection subcodes 606 applicable to the teeth 150 on 50% of the images or frames received during a particular swing full stage, but may run the portion of the loss detection subcodes 606 applicable to the shrouds 152 on only 10% of the images or frames received during a particular swing full stage. However, in other examples, the swing full multiplexer 701 may run loss detection on one or more of the teeth 150 or the shrouds 152 on between 5% and 75% of the images or frames received during a particular swing full stage, depending on processing power of the processor 302 and prior knowledge of such as type of heavy equipment and the composition of the load 156 and/or the mine face 114. Alternatively or additionally, the swing full multiplexer 701 may also sample the images or frames received during particular swing full stage at set intervals, such as every five seconds, every 10 seconds, every 30 seconds and every 60 seconds for example, and run loss detection on the sampled images or frames.

Boulder Detection Subcodes

If the swing full multiplexer 701 determines that the processor 302 should initiate the boulder detection subcodes 702, an example implementation of the boulder detection subcodes 702 using a neural network is described in commonly owned PCT patent publication no. WO2019227194A1 entitled METHOD, APPARATUS AND SYSTEM FOR MONITORING A CONDITION ASSOCIATED WITH OPERATING HEAVY EQUIPMENT SUCH AS A MINING SHOVEL OR EXCAVATOR filed on Jun. 1, 2018 and incorporated herein by reference. Another example of the boulder detection subcodes 702 is generally shown in FIG. 21, although other configurations are possible.

Figure 21:
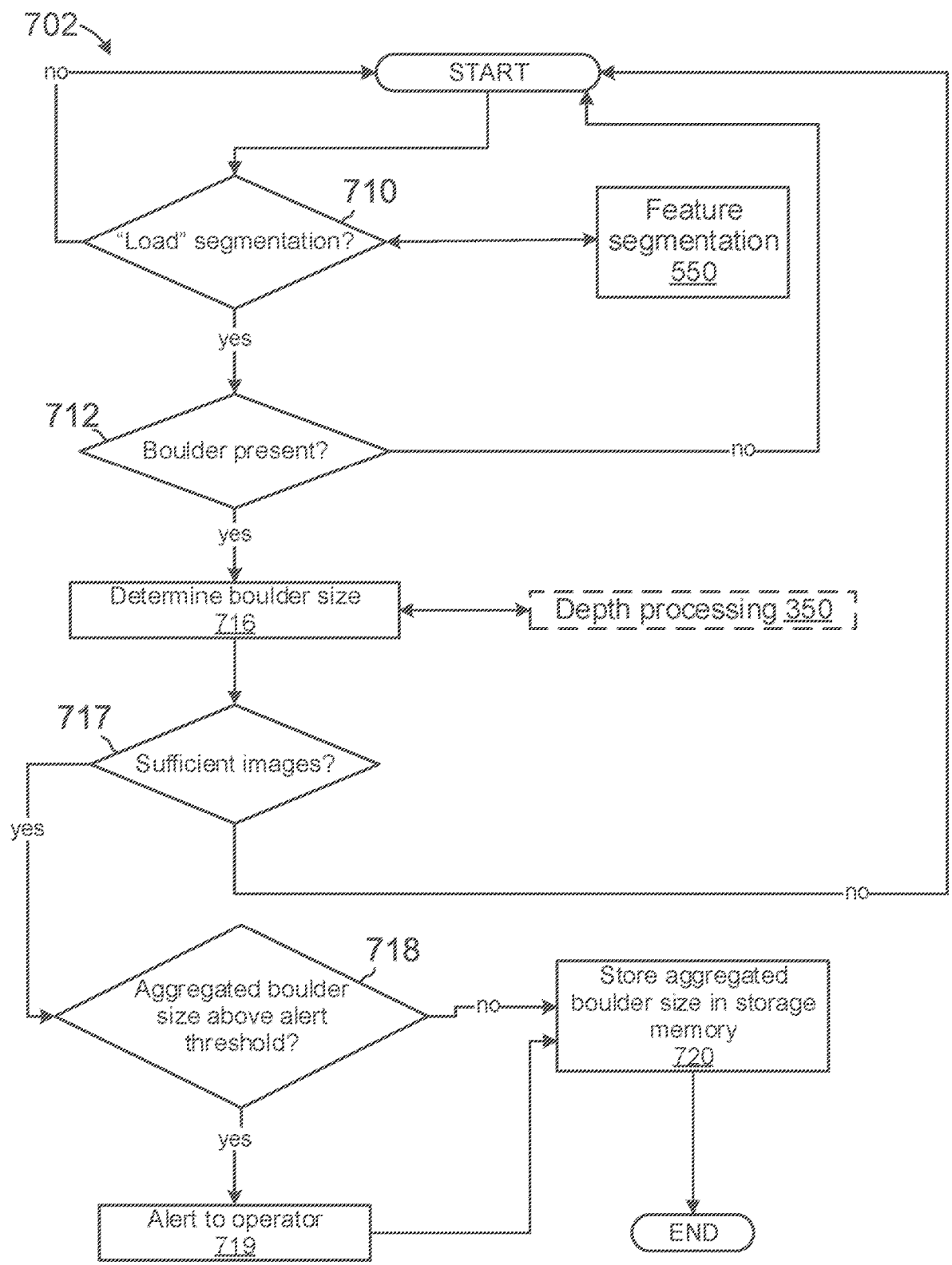
FIG. 21 is a process flowchart showing blocks of code for directing the processor circuit of FIG. 10 to perform boulder detection subcodes of the status analysis codes of FIG. 18 in accordance with one example.

In the example shown in FIG. 21, the boulder detection subcodes 702 begin at block 710, which may include codes directing the processor 302 to determine whether a particular image or frame includes portions corresponding to the load 156. For example, block 710 may direct the processor 302 to retrieve the feature labels of the pixels of the image or frame generated by the feature segmentation codes 550 and determine whether any of the pixels are classified with a "load" label (namely, the "load" segmentation). The processor 302 may determine that a particular image or frame which has more than a threshold number of pixels labelled with the "load" feature label includes a portion corresponding to the load 156, and that a particular image or frame which has less than the threshold number of pixels labelled with the "load" feature label does not include a portion corresponding to the load 156.

If at block 710, the processor 302 determines that a particular image or frame does not include any portions corresponding to the load 156, the boulder detection subcodes 702 may direct the processor 302 to reinitiate the boulder detection subcodes 702 for a subsequent image or frame or to end, depending on instructions from the swing full multiplexer 701. This can continue until the processor 302 identifies a particular image or frame which does include a portion corresponding to the load 156, at which point the boulder detection subcodes 702 continue to block 712.

Block 712 may include codes directing the processor 302 to process the image or frame to determine whether the image or frame includes a boulder. For example, block 712 may direct the processor 302 to input the RBG values of each pixel of the image or frame into a boulder detection model 715 configured to output one or more sets of boulder bounding box coordinates representing a presence of one or more boulders in that image or frame, or output no boulder bounding box coordinates representing an absence of a boulder in that image or frame. The boulder bounding box coordinates may include top right and bottom left corners of boulder bounding boxes, such as [x1, y1, x2, y2] for example.

The boulder detection model 715 may be trained with RBG values of training images or frames captured by the image capture system 180 during the swing full stage which are further ground annotated with top right and bottom left corners of bounding boxes of boulders which are present or no ground annotations if boulders are absent. The above RBG values and corresponding boulder ground annotations are inputted into a neural network of the boulder detection model 715 to iteratively generate and optimize coefficients which enable the neural network to determine whether boulders are present in the load 156 and a bounding box of the boulder based on the input of RBG values of images or frames. The boulder detection model 715 may originally derive from and be adapted from an existing object detection model, such as the You Only Look Once (YOLO) real-time object detection model for example. The boulder detection model 715 may be trained on the server 312 and the trained boulder detection model 715 may be locally stored in the storage memory 306.

If at block 712, the processor 302 determines that no boulders are present in the image or frame, such as based on the boulder detection model 715 not outputting any boulder bounding box coordinates for example, the boulder detection subcodes 702 may direct the processor 302 to reinitiate the boulder detection subcodes 702 for a subsequent image or frame, or may end depending on instructions of the swing full multiplexer 701. This can continue until the processor 302 determines that a boulder is present in a particular frame or image, such as based on the boulder detection model 715 outputting one or more sets of boulder bounding box coordinates for example, at which point the boulder detection subcodes 702 continue to block 716.

Block 716 may include codes directing the processor 302 to determine a size of each boulder identified at block 712. For example, block 716 may direct the processor 302 to use the depth value associated with the pixels of the image or frame generated by the depth processing codes 350 to 2D normalize the boulder bounding box coordinates outputted by the boulder detection model 715 to determine 2D normalized bounding box coordinates. The processor 302 may then determine a boulder size of each boulder by determining a distance between the x coordinates (boulder width) and the y coordinates (boulder height) of the 2D normalized boulder bounding box of each boulder for example, and may output both a boulder height and a boulder width for each boulder.

The loss detection subcodes 606 then continue to block 717, which may include codes directing the processor 302 to store the determined boulder size(s) for the image or frame in a buffer and determine whether a sufficient number of images or frames have been analyzed to generate aggregate boulder size(s). In the example shown, a sufficient number of images or frames may include five images or frames collected during a particular swing full stage; however, in other examples, the sufficient number of images or frames may include anywhere between two to 15 images or frames for example.

If at block 717, the processor 302 determines that an insufficient number of images or frames have been analyzed, the boulder detection subcodes 702 may direct the processor 302 to reinitiate the boulder detection subcodes 702 for a subsequent image or frame. This can continue until the processor 302 determines that a sufficient number of images or frames have been analyzed, at which point the boulder detection subcodes 702 continue to block 718.

Block 718 may include codes directing the processor 302 to aggregate the determined boulder size for each boulder based on the multiple images and frames, and determine whether the aggregated boulder size(s) are above or below a boulder threshold. Aggregating the determined size of boulders over multiple images or frames may increase a confidence level of identified boulders and identified boulder sizes. The aggregation may involve the processor 302 summing and averaging each determined size of a particular boulder over the five images of frames. For example, for first to fifth images for which block 716 determined the size of a particular boulder to be H1.6m×W1.4m, H1.7m×W1.3m, H1.2m×W1.1m, H1.4m×W1.4m, and H1.7m×W1.5m respectively, block 717 may direct the processor 302 to generate an aggregated boulder size for that particular boulder of H1.52m×W1.34m. This aggregation may be repeated for each boulder identified in the five images. Boulder sizes below the boulder threshold may not represent a safety concern or may not cause any damage to downstream processing equipment. In some examples, the boulder threshold is a width or a height of 1.2m; however, in other examples, the boulder threshold may range between a width or a height of 0.2m and 3.0m.

If at block 718, the processor 302 determines that one aggregated boulder size is above the boulder threshold in width and/or height, the boulder detection subcodes 702 then continue to block 719, which may include codes directing the processor 306 generate an alert for the operator of the mining shovel 102, such as by sending an alert message to the computer system 314 via the I/O interface 308 for example. In certain examples, block 719 may only direct the processor 302 to generate a single alert during a single operating cycle and not to repeat alerts during a single operating cycle. The boulder detection subcodes 702 then continue to block 720, which may include codes directing the processor 302 to store the aggregated boulder size(s) in the storage memory 306. The stored aggregated boulder size(s) may then be uploaded to the server 312 for subsequent analysis. The boulder detection subcodes 702 then end.

If at block 718, the processor 302 determines that no aggregated boulder size is above the boulder threshold in width or height, the boulder detection subcodes 702 may then continue directly to block 720 as described above.

Load Analysis Subcodes

Figure 22:
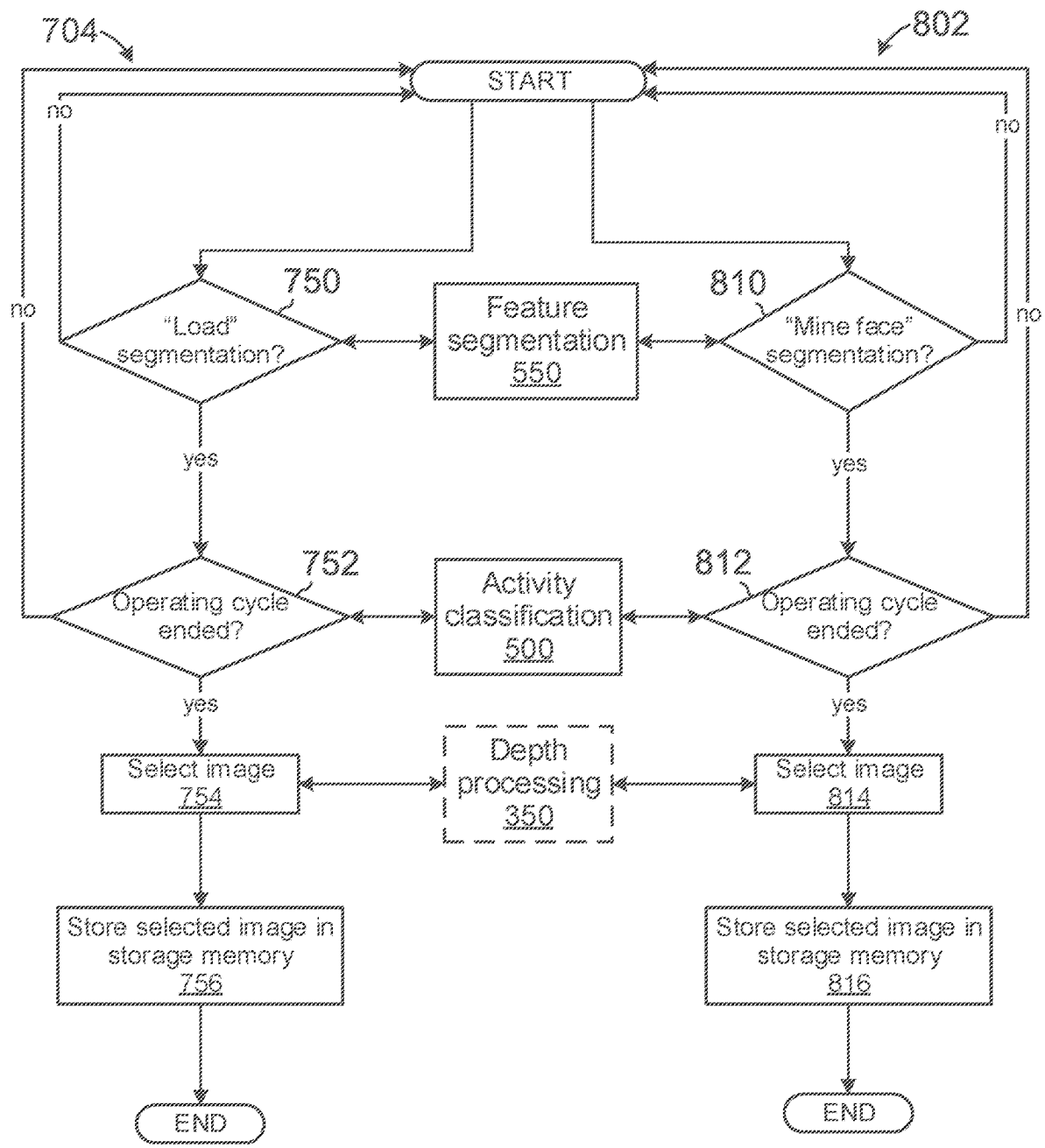
FIG. 22 is a process flowchart showing blocks of code for directing the processor circuit of FIG. 10 to perform load analysis subcodes and mine face analysis subcodes of the status analysis codes of FIG. 18 in accordance with one example.

If the swing full multiplexer 701 determines that the processor 302 should initiate the load analysis subcodes 704, an example implementation of the load analysis subcodes 704 is generally shown in FIG. 22, although other configurations are possible.

In the example shown in FIG. 22, the load analysis subcodes 704 begin at block 750, which may include codes directing the processor 302 to determine whether a particular image or frame includes portions corresponding to the load 156, and may be similar to block 710 of the boulder detection subcodes 702. If at block 750, the processor 302 determines that a particular image or frame does not include any portions corresponding to the load 156, the load analysis subcodes 704 may direct the processor 302 to reinitiate the load analysis subcodes 704 for a subsequent image or frame or may end, depending on instructions from the swing full multiplexer 701. This can continue the processor 302 identifies a particular image or frame which does include a portion corresponding to the load 156, at which point the load analysis subcodes 704 continue to block 752.

Block 752 may include codes directing the processor 302 to store the retrieved "load" segmentations in a buffer and determine whether a particular operating cycle of the mining shovel 102 has ended, and may be similar to block 624 of the loss detection subcodes 606. If at block 752, the processor 302 determines that a particular operating cycle has not ended, the load analysis subcodes 704 may direct the processor 302 to reinitiate the load analysis subcodes 704 for a subsequent image or frame of that operating cycle or may end, depending on instructions of the swing full multiplexer 701. This can continue until the processor 302 identifies an image or frame which corresponds to the end of the particular operating cycle, at which point the load analysis subcodes 704 may continue to block 754.

Block 754 may include codes directing the processor 302 to select a largest "load" segmentation from the "load" segmentations stored in the buffer. For example, the processor 302 may use the depth value associated with the pixels of the image or frame generated by the depth processing codes 350 to 2D normalize the pixels of each image or frame stored in the buffer, and then determine which 2D normalized image or frame has the largest number of pixels labelled with the "load" feature label. In some other embodiments, block 754 may also include codes directing the processor 302 to select a clearest "load" segmentation from the "load" segmentations stored in the buffer. For example, the processor 302 may also determine which 2D normalized image or frame has a largest percentage of the "load" segmentation where edge pixels between two particles of the load 156 may be distinguished.

The load analysis subcodes 704 then continue to block 756, which may include codes directing the processor 302 to store the selected image or frame in the storage memory 306. The stored selected image or frame may then be uploaded to the server 312 for subsequent analysis. The load analysis subcodes 704 then end. As described above, the server 312 may perform fragmentation analysis on the selected image or frame to generate fragmentation results such as size distribution graphs, size range statistics, and composition of material for the load 156.

Other Multiplexer

Referring back to FIG. 18, if at block 602, the status analysis codes 600 determines that a particular image or frame represents the field-of-view 184 while the mining shovel 102 is in another stage (such as the excavate stage or the idle stage for example), the status analysis codes 600 may continue to an other multiplexer 801. The other multiplexer 801 generally functions to determine when and how often to initiate one or more of mine face analysis subcodes 802 and the loss detection subcodes 606 while the mining shovel 102 is in either the excavate stage or the idle stage.

The mine face analysis subcodes 802 generally include codes directing the processor 302 to analyze and monitor the mine face 114. More specifically, the mine face analysis subcodes 802 generally include codes directing the processor 302 to analyze images or frames including the mine face 114 to determine whether there are appropriate images or frames to be sent to the server 312 for subsequent analysis of the mine face 114. The server 312 may perform fragmentation analysis of the mine face 114 to generate metrics on the size and composition of the mine face 114, which can aid in subsequent downstream processing of loads 156 excavated from the mine face 114 and also aid in determining what techniques should be used during the excavate stage to more efficiently excavate the mine face 114. Examples of such fragmentation analysis are described in commonly owned PCT patent publication WO2017100903A1 entitled METHOD AND APPARATUS FOR IDENTIFYING FRAGMENTED MATERIAL PORTIONS WITHIN AN IMAGE filed on Dec. 13, 2016 and incorporated herein by reference. The server 312 may also model the mine face 114 to determine contours of the mine face 114 after a particular excavate stage. However, such subsequent analysis of the mine face 114 can be computationally intensive, and may be performed on the server 312 to reserve computing resources of the processor circuit 300 for other critical functions, such as the loss detection subcodes 606 or the boulder detection subcodes 702 for example.

In this regard, the mine face analysis subcodes 704 performed by the embedded processor circuit 300 to select a particular image or frame for subsequent analysis may require little computational resources. However, analyzing the mine face 114 may be of lower importance for controlling a current operating cycle. The other multiplexer 801 may thus run the mine face analysis subcodes 802 on 50% of the images or frames received during a particular excavate stage and/or on 50% of the images or frames received during a particular idle stage. However, in other examples, the other multiplexer 801 may run mine face analysis on between 50% to 100% of the images or frames received during a particular excavate stage or on between 50% to 100% of the images or frames received during a particular idle stage.

Additionally, due to the importance of the loss detection subcodes 606, the other multiplexer 801 may also run loss detection on 0% of the images or frames received during a particular excavate stage and on 50% of the images or frames received during a particular idle stage. In this regard, during an excavate stage, the teeth 150 and the shrouds 152 will likely be substantially obscured by the earthen material on the mine face 114, whereas during an idle stage, there is a possibility that the teeth 150 in the shrouds 152 are visible. However, in other examples, the other multiplexer 801 may run loss detection of one or more of the teeth 150 or the shrouds 152 on between 5% and 75% of the images or frames received during a particular excavate stage and on between 5% and 75% of the images or frames received during a particular idle stage. Alternatively or additionally, the other multiplexer 801 may also sample the images or frames received during particular excavate stage or idle stage at set intervals, such as every five seconds, every 10 seconds, every 30 seconds and every 60 seconds for example, and run loss detection on the sampled images or frames.

Mine Face Analysis

If the other multiplexer 801 determines that the processor 302 should initiate the mine face analysis subcodes 802, an example implementation of the mine face analysis subcodes 802 is generally shown in FIG. 22, although other configurations are possible.

In the example shown in FIG. 22, the mine face analysis subcodes 802 begin at block 810, which may include codes directing the processor 302 to determine whether a particular image or frame includes portions corresponding to the mine face 114. For example, block 810 may direct the processor 302 to retrieve the feature labels of the pixels of the image or frame generated by the feature segmentation codes 550 and determine whether any of the pixels are classified with a "mine face" label (namely, the "mine face" segmentation). The processor 302 may then determine that a particular image or frame which has more than a threshold number of pixels labelled with the "mine face" feature label includes a portion corresponding to the mine face 114, and that a particular image or frame which has less than the threshold number of pixels labelled with the "mine face" feature label does not include a portion corresponding to the mine face 114.

If at block 810, the processor 302 determines that a particular image or frame does not include any portions corresponding to the mine face 114, the mine face analysis subcodes 802 may direct the processor 302 to reinitiate the mine face analysis subcodes 802 for a subsequent image or frame or may end, depending on instructions from the other multiplexer 801. This can continue until the processor 302 identifies a particular image or frame which does include a portion corresponding to the mine face 114, at which point the mine face analysis subcodes 802 continue to block 812.

Block 812 may include codes directing the processor 302 to store the retrieved "mine face" segmentations in a buffer and determine whether a particular operating cycle of the mining shovel 102 has ended, and may be similar to block 624 of the loss detection subcodes 606 and block 752 of the load analysis subcodes 704. If at block 812, the processor 302 determines that a particular operating cycle has not ended, the mine face analysis subcodes 802 may direct the processor 302 to reinitiate the mine face analysis subcodes 802 for a subsequent image or frame of that operating cycle or may end, depending on instructions of the other multiplexer 801. This can continue until the processor 302 identifies an image or frame which corresponds to the end of the particular operating cycle of the mining shovel 102, at which point the mine face analysis subcodes 802 may continue to block 814.

Block 814 may include codes directing the processor 302 to select a largest and/or a clearest "mine face" segmentation from the "mine face" segmentations stored in the buffer, and may be similar to block 754 of the load analysis subcodes 704.

The mine face analysis subcodes 802 then continue to block 816, which may include codes directing the processor 302 to store the selected image or frame in the storage memory 306. The stored selected image or frame may then be uploaded to the server 312 for subsequent analysis. The mine face analysis subcodes 802 then end. As described above, the server 312 may perform fragmentation analysis on the selected image or frame to generate fragmentation results such as size distribution graphs, size range statistics, and composition of material for the mine face 114. The server 312 may also perform additional modeling analysis on the selected image or frame.

Metric Aggregation Codes

After the activity classification codes 500 generate the activity labels and the status analysis codes 600 generate analysis of different components of the operating implement 126, the load 156 and the mine face 114, the processor circuit 300 may also initiate metric aggregation codes 900 stored in the program memory 304. The metric aggregation codes 900 generally include codes directing the processor 302 or a processor of the server 312 to aggregate different metrics associated with different stages of the operating cycle to identify trends over multiple operating cycles or trends associated with a common stage (e.g. excavate stages, swing full stages, dump stages, swing empty stages, etc.) of multiple operating cycles. In this regard, a "common" stage of multiple operating cycles refers to the same stage over multiple operating cycles. For example, one operating cycle may include one excavate stage and one swing full stage, and the excavate stages of a plurality of operating cycles may be common excavate stages, while the swing full stages of multiple operating cycles may be common swing full stages. One example aggregated metric may be duration of different common stages over multiple operating cycles, such as an average or median amount of time for an excavate stage or a dump stage for example. Another example aggregated metric may be wear of the plurality of teeth 150 or the plurality of shrouds 152 over each operating cycle and over a plurality of operating cycles. The aggregated metrics can be correlated with an identity of an operator, a composition of the load 156 and a composition of a particular mine face 114.

For example, the metric aggregation codes 900 may include codes directing the processor 302 to aggregate the images or frames received over one operating cycle to determine a length of time for different stages of that operating cycle. For example, the metric aggregation codes 900 may direct the processor 302 to retrieve a series of sequential images or frames having a same activity label and belonging to a same stage (such as between two transition points) in a single operating cycle and determine a number of frames classified with that same activity label. As a more specific example, a series of 200 images or frames retrieved at $t_0$ to $t_{200}$ may be classified with the "excavate" label by the activity classification codes 500. The metric aggregation codes 900 may direct the processor 302 to determine the amount of time corresponding to this series of 200 images based on the FPS rate of the image capture system 180 or the FPS rate of the images or videos which are analyzed by the processor circuit 300. For example, if images or video are captured at 3 FPS, the series of 200 images and generally correspond to 66.7 seconds, indicating that the excavate stage of that particular operating cycle was approximately 66.7 seconds. This can allow the processor 302 to determine an amount of time spent performing each stage of each operating cycle.

The metric aggregation codes 900 may also include codes directing the processor 302 to aggregate the length of times for a common stage of multiple operating cycles to determine trends associated with that common stage. For example, the metric aggregation codes 900 may direct the processor 302 to aggregate lengths of time determined for the excavate stages of multiple operating cycles or aggregate the lengths of time determined for dump stages of multiple operating cycles. This can allow the processor 302 to determine trends associated with performing a particular common stage, such as an average amount of time spent in excavate stages over multiple operating cycles and an average amount of time spent in dump stages over multiple operating cycles for example.

The metric aggregation codes 900 may also include codes directing the processor 302 to aggregate length of the plurality of teeth 150 and/or the plurality of shrouds 152 to determine wear trends during a single operating cycle. For example, the metric aggregation codes 900 may direct the processor 302 to retrieve the determined length generated by block 654 of the wear monitoring subcodes 608 collected over one stage (such as over a particular swing empty stage or over a particular dump stage) of one operating cycle, and graph the lengths to generate a wear trend line for that one operating cycle.

The metric aggregation codes 900 may also include codes directing the processor 302 to aggregate the lengths of the teeth 150 and/or the shrouds 152 over multiple operating cycles. For example, the metric aggregation codes 900 may direct the processor 302 to aggregate the lengths determined during the swing empty stages of multiple operating cycles. This can allow the processor 302 to graph the lengths to generate a wear trend line over multiple operating cycles. This can also allow the processor 302 determine when a particular tooth or shroud has been changed, such as by a sharp increase in the length rather than a gradual decrease in the length.

Generally, the examples described above enable a processor circuit 300 to determine a current stage of an operating cycle of a heavy equipment (such as the mining shovel 102 or the hydraulic face shovel 950) based on images or frames captured by an image capture system (such as the image capture system 180 or the image capture system 180') mounted to the heavy equipment. The examples above also enable the processor circuit 300 to perform a series of different monitoring analysis on operating implements of the heavy equipment, loads carried by the heavy equipment, and/or a mine face currently being operated on by the heavy equipment, using the same images or frames captured by the image capture system. Additionally, to streamline the various different monitoring analysis (such as the loss detection 606, the wear monitoring subcodes 608, the boulder detection subcodes 702, the load analysis subcodes 704 and the mine face analysis subcodes 802 subcodes for example) being performed by the processor circuit 300, the monitoring analysis performed by the processor circuit 300 may be varied depending on the current stage of the operating cycle of the heavy equipment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, or within less than 0.01% of the stated value.

While specific examples have been described and illustrated, such examples should be considered illustrative only and not as limiting the disclosed examples as construed in accordance with the accompanying claims.

The invention claimed is:

1. A method for monitoring operations of heavy equipment having an operating implement configured to excavate a load from a mine face, the method comprising:
    capturing a plurality of images during an operating cycle of the heavy equipment;
    processing the plurality of images through an activity classifier model implemented on a processor circuit, the activity classifier model including a neural network having been configured and trained for generating an activity label based on a sequence of images in the plurality of images and the probability that the activity is an allowed transition from a previous activity, the activity label associating the sequence of images with at least one stage of a plurality of stages making up the operating cycle; and
    performing at least one analysis using the sequence of images associated with the at least one stage, the at least one analysis including an analysis of the operating implement, an analysis of the load, and/or an analysis of the mine face.

2. The method of claim 1 further comprising processing the plurality of images through a feature segmenter model implemented on the processor circuit, the feature segmenter model including a neural network having been configured and trained for generating segmentations for the plurality of images.

3. The method of claim 2 wherein the segmentations comprise at least an operating implement segmentation corresponding to the operating implement, a load segmentation corresponding to the load and/or a mine face segmentation corresponding to the mine face.

4. The method of claim 3 wherein the at least one stage of the plurality of stages includes an excavate stage, and performing the at least one analysis includes:
    performing the analysis of the mine face using a sequence of images associated with the excavate stage.

5. The method of claim 4 wherein performing the analysis of the mine face includes performing a mine face analysis on the mine face segmentation of the sequence of images associated with the excavate stage to select one or more images of the sequence of images associated with the excavate storage to transmit to a server.

6. The method of claim 3 wherein the at least one stage of the plurality of stages includes a swing empty stage or a dump stage, and performing the at least one analysis includes:
    performing the analysis of the operating implement using a sequence of images associated with the swing empty stage or the dump stage.

7. The method of claim 6 wherein performing the analysis of the operating implement includes one or more of:
    performing loss detection on the operating implement segmentation of the sequence of images associated with the swing empty stage or the dump stage to determine whether a portion of at least one tooth and/or at least one shroud of the operating implement is missing; and/or
    performing wear monitoring on the operating implement segmentation of the sequence of images associated with the swing empty stage or the dump stage to determine a length of the at least one tooth and/or a length of the at least one shroud.

8. The method of claim 7 wherein:
- performing the loss detection comprises performing the loss detection on a first percentage of the sequence of images associated with the swing empty stage or the dump stage in response to commands from a swing empty/dump multiplexer; and
- performing the wear monitoring comprises performing the wear monitoring on a second percentage of the sequence of images associated with the swing empty stage or the dump stage in response to commands from the swing empty/dump multiplexer.

9. The method of claim 3 wherein the at least one stage of the plurality of stages includes a swing full stage of the operating cycle, and performing the at least one analysis includes:
- performing the analysis of the load using a sequence of images associated with the swing full stage.

10. The method of claim 9 wherein performing the analysis of the load includes one or more of:
- performing load analysis on the load segmentation of the sequence of images associated with the swing full stage to select one or more images of the sequence of images associated with the swing full stage to transmit to a server; and
- performing boulder detection on the load segmentation of the sequence of images associated with the swing full stage to determine whether any boulders are present within the load.

11. The method of claim 10 wherein:
- performing the load analysis comprises performing the load analysis on a first percentage of the sequence of images associated with the swing full stage in response to commands from a swing full multiplexer; and
- performing the boulder detection comprises performing the boulder detection on a second percentage of the sequence of images associated with the swing full stage in response to commands from the swing full multiplexer.

12. The method of claim 1 further including processing the plurality of images through a keypoint identifier model implemented on the processor circuit, the keypoint identifier model including a neural network having been configured and trained for identifying a plurality of keypoints of the operating implement and generating a keypoint label and keypoint coordinates for each keypoint of the plurality of keypoints.

13. The method of claim 1 further comprising:
- aggregating results of the at least one analysis performed using the sequence of images associated with the at least one stage over a plurality of operating cycles; and
- generating at least one aggregated metric characterizing the at least one stage over the plurality of operating cycles based on the aggregated results of the at least one analysis.

14. The method of claim 13 wherein the at least one stage includes an excavate stage, and the at least one aggregated metric characterizes an average length of time spent excavating the mine face in the excavate stage over the plurality of operating cycles.

15. The method of claim 13 wherein the at least one stage includes a dump stage, and the at least one aggregated metric characterizes an average length of time for loading a haul truck during the dump stage over the plurality of operating cycles.

16. The method of claim 13 wherein the at least one aggregated metric characterizes wear of the operating implement over the plurality of operating cycles.

17. A computer system comprising at least one processor of a processor circuit, the at least one processor configured to at least:
- process a plurality of images captured during an operating cycle of a heavy equipment through an activity classifier model implemented on the processor circuit, the activity classifier model including a neural network having been configured and trained for generating an activity label based on a sequence of images in the plurality of images and the probability that the activity is an allowed transition from a previous activity, the activity label associating the sequence of images with at least one stage of a plurality of stages making up the operating cycle; and
- perform at least one analysis using the sequence of images associated with the at least one stage, the at least one analysis including an analysis of an operating implement of the heavy equipment, an analysis of a load excavated from a mine face by the heavy equipment, and/or an analysis of the mine face.

18. The computer system of claim 17 wherein the at least one stage includes a swing empty stage or a dump stage, wherein performing the at least one analysis comprises performing the analysis of the operating implement based on a sequence of images associated with the swing empty stage or the dump stage, and wherein the at least one processor is configured to perform the analysis of the operating implement by being configured to at least:
- perform loss detection on an operating implement segmentation to determine whether a portion of at least one tooth and/or at least one shroud of the operating implement is missing, the operating implement segmentation representing the operating implement in the sequence of images associated with the swing empty stage or the dump stage, and/or
- perform wear monitoring on the operating implement segmentation to determine a length of the at least one tooth and/or the at least one shroud.

19. The computer system of claim 17 wherein the at least one stage includes a swing full stage, wherein performing the at least one analysis comprises performing the analysis of the load based on a sequence of images associated with the swing full stage, wherein the at least one processor is configured to perform the analysis of the load by being configured to at least:
- perform load analysis on a load segmentation to select one or more images of the sequence of images associated with the swing full stage to transmit to a server, the load segmentation representing the load in the sequence of images associated with the swing full stage, and/or
- perform boulder detection on the load segmentation to determine whether any boulders are present within the load.

* * * * *